(12) United States Patent
Nomura et al.

(10) Patent No.: US 12,729,773 B2
(45) Date of Patent: Sep. 8, 2026

(54) VALVE DEVICE

(71) Applicant: DENSO CORPORATION, Kariya-city (JP)

(72) Inventors: Ryo Nomura, Kariya-city (JP); Takuya Hamada, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 42 days.

(21) Appl. No.: 19/029,320

(22) Filed: Jan. 17, 2025

(65) Prior Publication Data

US 2025/0164019 A1 May 22, 2025

Related U.S. Application Data

(63) Continuation of application No. PCT/JP2023/032558, filed on Sep. 6, 2023.

(30) Foreign Application Priority Data

Sep. 14, 2022 (JP) ................................ 2022-146167

(51) Int. Cl.
*F16K 11/074* (2006.01)

(52) U.S. Cl.
CPC ................................ *F16K 11/074* (2013.01)

(58) Field of Classification Search
CPC . F16K 11/074; F16K 11/0743; F16K 11/0856
See application file for complete search history.

(56) References Cited

U.S. PATENT DOCUMENTS 2,837,115 A * 6/1958 Bancroft ............... F16K 11/074 137/865
3,561,479 A * 2/1971 Archer .................... F15B 13/04 137/625.21
4,478,248 A * 10/1984 DeVall ..................... B25D 9/22 91/40
8,459,302 B2 * 6/2013 Pederson ............. F16K 11/074 137/625.46
9,874,284 B2 1/2018 Bachofer
11,767,922 B2 * 9/2023 Bohnenstengel ....... F16K 11/22 251/304
2022/0034562 A1 2/2022 Makihara et al.

FOREIGN PATENT DOCUMENTS

WO WO-2022220078 A1 * 10/2022 ............. F25B 41/26

OTHER PUBLICATIONS

Machine English translation of WO-2022220078-A1 (Year: 2026).*

* cited by examiner

*Primary Examiner* — Hailey K. Do
(74) *Attorney, Agent, or Firm* — Nixon & Vanderhye P.C.

(57) ABSTRACT

A valve device includes a shaft, a housing defining a flow passage and having a plurality of openings, and a first movable disk and a second movable disk being rotatable. The plurality of openings includes one-side openings and other-side openings. The housing includes a one-side partition wall partitioning the flow passage into a plurality of one-side flow passages and an other-side partition wall partitioning the flow passage into a plurality of other-side flow passages. The first movable disk is rotated to switch a one-side flow passage communicating with a first through-hole. The second movable disk is rotated to switch an other-side flow passage communicating with a second through-hole.

12 Claims, 29 Drawing Sheets

CL
6132
6131
61, 613
80
70
61, 611
30
35
263
21
20
34
32
22
252
31
DRa2
DRa
DRa1
28
Fo3
1121
112
1122
1123
Fi2
114

162
1124
Fo2
112
1124
152
163
Fi2
1124
Fo3
Fo1
1124
DRc
161

262
20
24
23
24
263
252
24
24
DRc
261
22

FIRST OPERATION MODE
SECOND OPERATION MODE
THIRD OPERATION MODE
UPPER STA-TION-ARY DISK
LOWER STA-TION-ARY DISK
40
42
43
453
464
465
466
54
55
20
22
23
252
261
262
263
34
35

FIG. 20

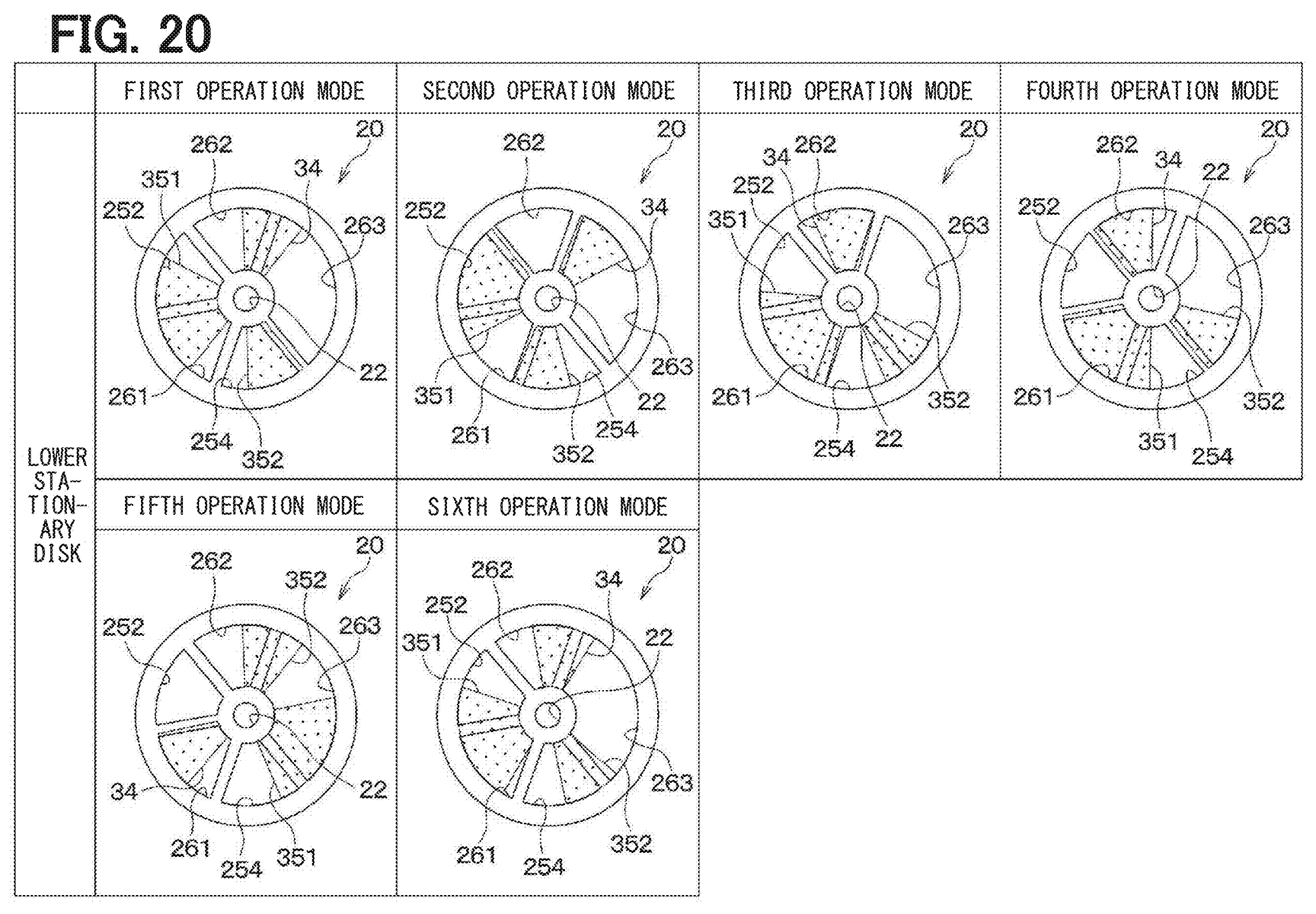

LOWER STA- TION- ARY DISK

FIRST OPERATION MODE 20 22 34 252 254 261 262 263 351 352

SECOND OPERATION MODE 20 22 34 252 254 261 262 263 351 352

THIRD OPERATION MODE 20 22 34 252 254 261 262 263 351 352

FOURTH OPERATION MODE 20 22 34 252 254 261 262 263 351 352

FIFTH OPERATION MODE 20 22 34 252 254 261 262 263 351 352

SIXTH OPERATION MODE 20 22 34 252 254 261 262 263 351 352

FIG. 25

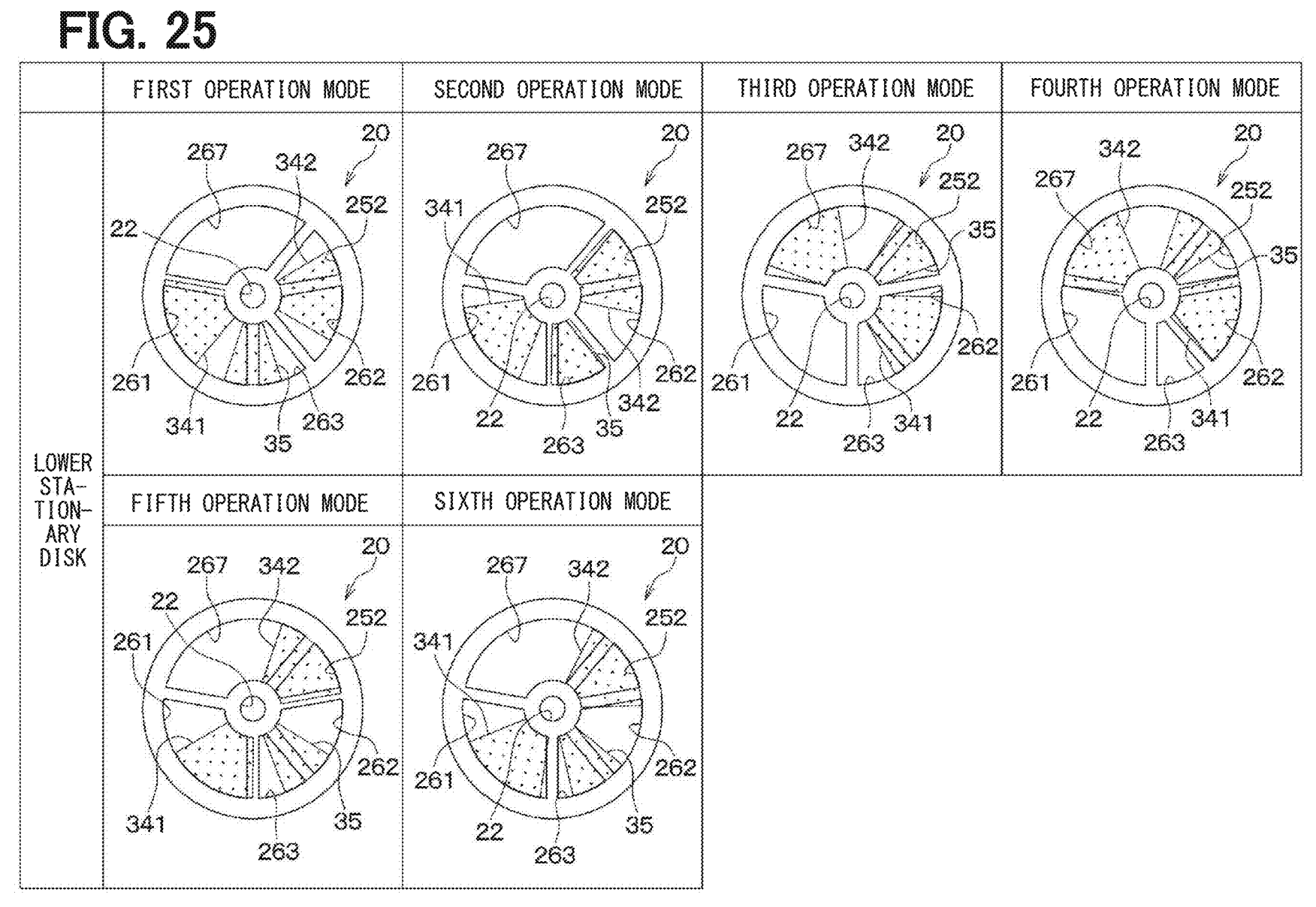

LOWER STATIONARY DISK

FIRST OPERATION MODE

SECOND OPERATION MODE

THIRD OPERATION MODE

FOURTH OPERATION MODE

FIFTH OPERATION MODE

SIXTH OPERATION MODE

1
CL
DRc
60
61
10
166
Fa, Fo6
12
121
Fa, Fo5
1111
1221
122
113
1222
1211
DRa2
54
55
151
50
111
DRa
75
F, Fc
85
90
DRa1
613
11
80
30
70
34
35
31
Fb, Fo3
Fb, Fi2
163
1121
112
152
DRr

VALVE DEVICE

CROSS REFERENCE TO RELATED APPLICATION

The present application is a continuation application of International Patent Application No. PCT/JP2023/032558 filed on Sep. 6, 2023, which designated the U.S. and claims the benefit of priority from Japanese Patent Application No. 2022-146167 filed on Sep. 14, 2022. The entire disclosures of all of the above applications are incorporated herein by reference.

TECHNICAL FIELD

The present disclosure relates to a valve device.

BACKGROUND

Conventionally, there is known a valve device that switches a flow passage through which a fluid flows. The valve device includes a cylindrical housing that defines flow passages through which the fluid flows, and that has three openings, and two sealing disk units that are disposed apart from each other inside the housing, and that open and close the three openings.

SUMMARY

An object of the present disclosure is to provide a valve device in which the number of openings through which a fluid can flow in and out can be increased while an increase in the number of components and an increase in a size of a housing can be reduced.

A valve device according to an aspect of the present disclosure includes a shaft extending along an axial direction, a housing defining a flow passage through which a fluid flows, and a first movable disk and a second movable disk provided to be aligned with each other in the axial direction while being spaced apart from each other inside the flow passage to divide the flow passage in the axial direction. The shaft is configured to rotate about a predetermined axis, and the housing has a plurality of openings each of which communicates with the flow passage and functions as at least one of an inlet through which the fluid flows into the flow passage or an outlet through which the fluid flows out from the flow passage. The first movable disk and the second movable disk are configured to rotate along with rotation of the shaft. In the valve device, the plurality of openings includes a plurality of one-side openings provided on one side in the axial direction with respect to the first movable disk, and a plurality of other-side openings formed on an other side in the axial direction with respect to the second movable disk. The housing includes a one-side partition wall partitioning the flow passage on the one side in the axial direction with respect to the first movable disk into a plurality of one-side flow passages communicating with the plurality of one-side openings, and an other-side partition wall partitioning the flow passage on the other side in the axial direction with respect to the second movable disk into a plurality of other-side flow passages communicating with the plurality of other-side openings. Furthermore, the first movable disk has a first through-hole penetrating through the first movable disk in the axial direction, and the first movable disk is configured to switch a flow passage, within the plurality of one-side flow passages, communicating with the plurality of other-side flow passages, by being caused to rotate along with the rotation of the shaft. In addition, the second movable disk has a second through-hole penetrating through the second movable disk in the axial direction, and the second movable disk is configured to switch a flow passage, within the plurality of other-side flow passages, communicating with the second through-hole, by being caused to rotate along with the rotation of the shaft.

BRIEF DESCRIPTION OF DRAWINGS

The above and other objects, features and advantages of the present disclosure will become more apparent from the following detailed description made with reference to the accompanying drawings. In the drawings:

FIG. 20 is a diagram for explaining operation modes of the valve device according to the second embodiment;

FIG. 25 is a diagram for explaining operation modes of the valve device according to the third embodiment;

DESCRIPTION OF EMBODIMENTS

Figure 1:
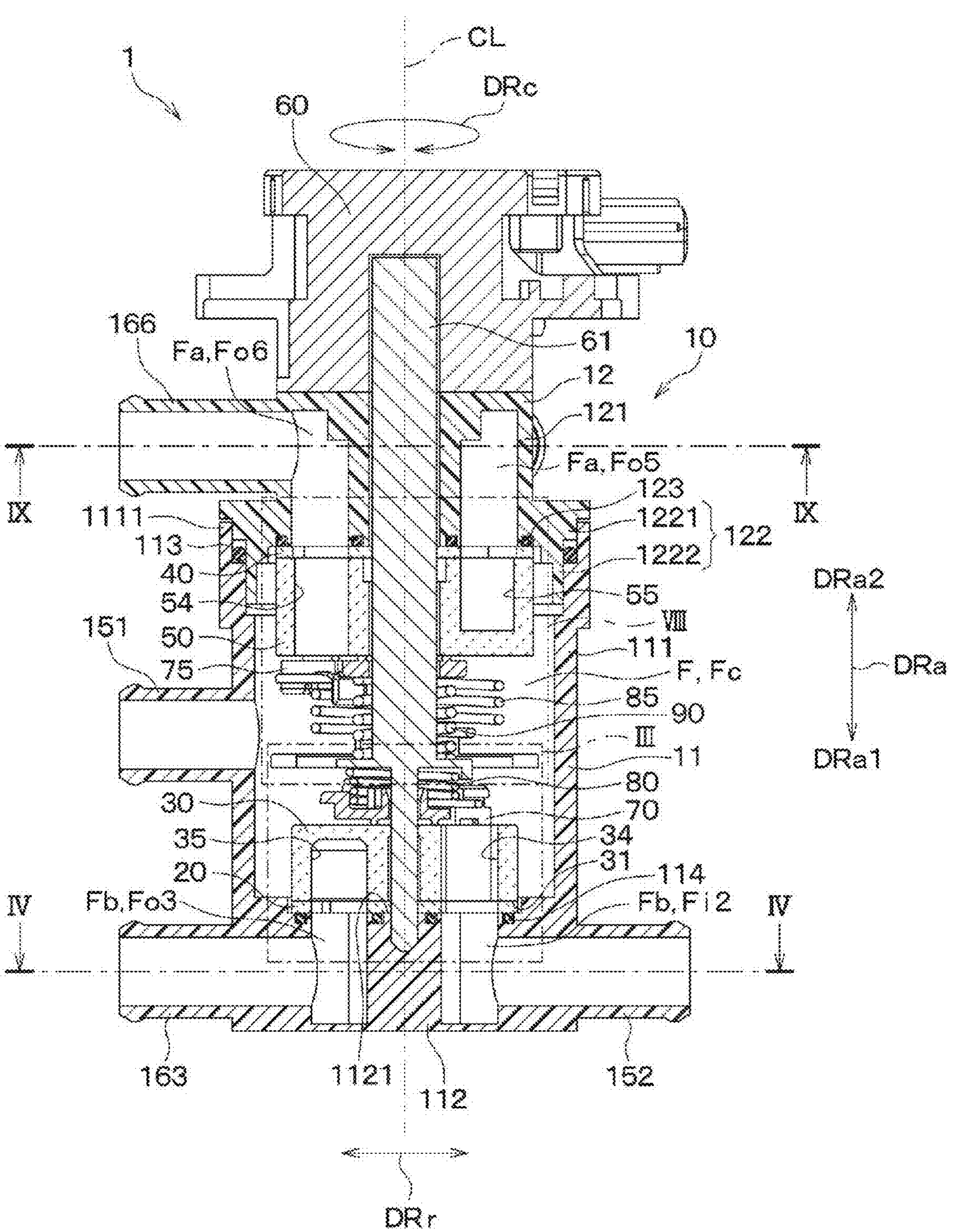
FIG. 1 is a cross-sectional view of a valve device according to a first embodiment.

In a valve device of an example, three openings, that is, a first opening, a second opening, and a third opening, may be formed in this order while the first opening, the second opening, and the third opening are axially apart from each other on an outer peripheral portion of a cylindrical housing. In the valve device, one of two sealing disk units is disposed between the first opening and the second opening of the three openings, and the other one of the two sealing disk units is disposed between the second opening and the third opening of the three openings. With this configuration, flow passages inside the housing are partitioned into three chambers by the two sealing disk units. On each of the three chambers, a corresponding single one of the openings is provided.

Each of the two sealing disk units includes a fixed (stationary) sealing disk and rotatable sealing disks. The fixed sealing disk and the rotatable sealing disk are formed with cutouts for allowing the fluid to flow therethrough. When the sealing disks are caused to rotate and the respective cutouts of the fixed sealing disk and the sealing disk overlap each other, the fluid can pass through the sealing disk unit.

The valve device of the above example switches openings through which the fluid flows in and out, by changing the rotational positions of the sealing disks to switch the chamber that the fluid flows in and out among the three chambers. Thus, the valve device can switch the flow passage of the fluid flowing into the valve device.

The inventors of the present application have studied a valve device that can switch still more flow passages by increasing the number of openings through which a fluid can flow in and out. However, in the case of a configuration in which a single opening is provided in each of chambers partitioned by sealing disk units as in the valve device of the above example, the number of switchable flow passages is determined by the number of chambers partitioned by the sealing disk units. This consequence is obtained because the chambers partitioned by the sealing disk units and the openings have a one-to-one correspondence.

Therefore, in order to increase the number of openings, the number of chambers partitioned by the sealing disk units is required to be increased, and the axial size of a housing is required to be increased. This configuration leads to a cause of an increase in the number of components of the valve device, and further leads to a cause of an increase in the size of the housing.

In view of the above issues, a valve device according to an aspect of the present disclosure includes a shaft extending along an axial direction, a housing defining a flow passage through which a fluid flows, and a first movable disk and a second movable disk provided to be aligned with each other in the axial direction while being spaced apart from each other inside the flow passage to divide the flow passage in the axial direction. The shaft is configured to rotate about a predetermined axis, and the housing has a plurality of openings each of which communicates with the flow passage and functions as at least one of an inlet through which the fluid flows into the flow passage or an outlet through which the fluid flows out from the flow passage. The first movable disk and the second movable disk are configured to rotate along with rotation of the shaft. In the valve device, the plurality of openings includes a plurality of one-side openings provided on one side in the axial direction with respect to the first movable disk, and a plurality of other-side openings formed on an other side in the axial direction with respect to the second movable disk. The housing includes a one-side partition wall partitioning the flow passage on the one side in the axial direction with respect to the first movable disk into a plurality of one-side flow passages communicating with the plurality of one-side openings, and an other-side partition wall partitioning the flow passage on the other side in the axial direction with respect to the second movable disk into a plurality of other-side flow passages communicating with the plurality of other-side openings. Furthermore, the first movable disk has a first through-hole penetrating through the first movable disk in the axial direction, and the first movable disk is configured to switch a flow passage, within the plurality of one-side flow passages, communicating with the plurality of other-side flow passages, by being caused to rotate along with the rotation of the shaft. In addition, the second movable disk has a second through-hole penetrating through the second movable disk in the axial direction, and the second movable disk is configured to switch a flow passage, within the plurality of other-side flow passages, communicating with the second through-hole, by being caused to rotate along with the rotation of the shaft.

According to this configuration of the valve device, the inlet through which the fluid flows into the flow passage or the outlet through which the fluid flows out from the flow passage can be switched to any of the plurality of one-side openings, by rotating the first movable disk to switch the one-side flow passage communicating with the first through-hole. The inlet through which the fluid flows into the flow passage or the outlet through which the fluid flows out from the flow passage can be switched to any of the plurality of other-side openings, by rotating the second movable disk to switch the other-side flow passage communicating with the second through-hole. According to such a configuration of the valve device, even when the number of movable disks is two, the number of openings through which the fluid flows in and out can be increased without increasing the size of the housing in the axial direction.

Hereinafter, embodiments of the present disclosure will be described with reference to the drawings. In the following embodiments, parts that are the same as or equivalent to those described in the preceding embodiment will be denoted by the same reference signs, and the description thereof may be omitted as appropriate. In the embodiments, in a case where only a part of constituent elements is described, the constituent elements described in the preceding embodiment can be applied to other parts of the constituent elements. In the following embodiments, the embodiments can be partially combined with each other even in a case where the combination is not particularly specified, provided that no obstacles occur in the combination.

First Embodiment

The present embodiment will be described with reference to FIGS. 1 to 13. A valve device 1 according to the present embodiment is applied to, for example, a fluid circulation system in which a fluid (in the present example, cooling water) that adjusts temperatures of a vehicle interior and a battery of an electric vehicle or a hybrid vehicle circulates. The fluid circulation system is a system that allows the cooling water to circulate through a vehicle traveling power source, a radiator, a vehicle-interior air-conditioning heater core, the battery, and the like. As the cooling water, for example, long life coolant (LLC) containing ethylene glycol is used. The valve device 1 is a device that, for example, switches a fluid passage of the cooling water flowing in the fluid circulation system, or adjusts a flow rate. In the present embodiment, the valve device 1 configured as a nine-way valve will be described as an example.

Figure 2:
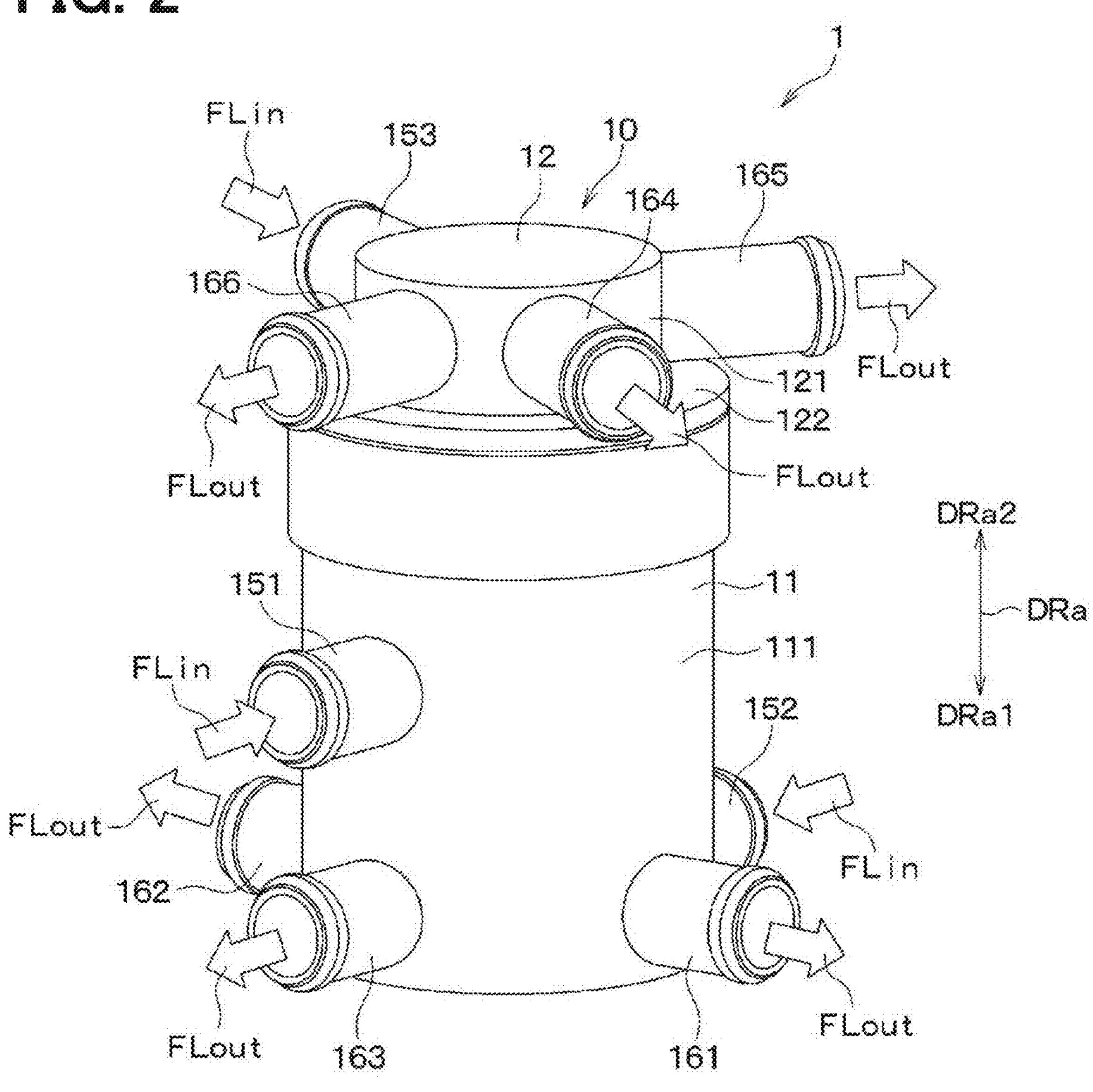
FIG. 2 is an external view of the valve device according to the first embodiment.

First, a configuration of the valve device 1 of the present embodiment will be described. As illustrated in FIGS. 1 and 2, the valve device 1 of the present embodiment includes a housing 10, a lower stationary disk 20, a lower movable disk 30, an upper stationary disk 40, an upper movable disk 50, a drive unit 60, a lower lever 70, and an upper lever 75. The valve device 1 further includes a lower torsion spring 80, an upper torsion spring 85, a compression spring 90, and the like. The valve device 1 of the present embodiment is configured as a disk valve in which the drive unit 60 rotates the lower movable disk 30 and the upper movable disk 50 integrally with a shaft 61 to be described later to switch the fluid passage of the cooling water flowing in the fluid circulation system.

The valve device 1 is configured to be able to switch operation mode of the valve device 1 in order to switch the fluid passage of the cooling water flowing in the fluid circulation system. The operation mode of the valve device 1 is switched by the drive unit 60.

The housing 10 forms an outer shell of the valve device 1, and defines a flow passage F through which the fluid flows thereinside. The housing 10 is a non-rotary member that does not rotate. Specifically, the housing 10 includes a bottomed cylindrical lower housing 11 and a bottomed cylindrical upper housing 12 connected to the opening side of the lower housing 11. The lower housing 11 and the upper housing 12 are formed, for example, by injection molding in which a resin material is poured into a mold and solidified into a desired shape.

As illustrated in FIG. 1, the shaft 61 is inserted from the lower housing 11 to the drive unit 60 across the upper housing 12, inside the housing 10. In the housing 10, the lower housing 11 and the upper housing 12 are arranged to be aligned with each other in a direction in which an axis CL of the shaft 61 extends. The housing 10 houses components such as the lower stationary disk 20, the lower movable disk 30, the upper stationary disk 40, and the upper movable disk 50. In the housing 10, the flow passage F formed thereinside is divided by these components.

Specifically, for example, the flow passage F inside the housing 10 is divided in the direction in which the axis CL of the shaft 61 extends, by the lower movable disk 30 and the upper movable disk 50 arranged to be aligned with each other while being spaced apart from each other inside the flow passage F.

Hereinafter, as illustrated in FIG. 1 and the like, various configurations and the like will be described, while a direction along the axis CL of the shaft 61 is defined as an axial direction DRa, a direction on one side in the axial direction DRa is defined as a lower direction DRa1, and a direction opposite to the lower direction DRa1 is defined as an upper direction DRa2. The lower direction DRa1 is a direction from the upper housing 12 side toward the lower housing 11 side in the axial direction DRa.

Various configurations and the like will be described, while a direction orthogonal to the axial direction DRa and radially extending from the axial direction DRa is defined as a radial direction DRr, and a direction centered on the axis CL and around the axis CL is defined as a circumferential direction DRc. The circumferential direction DRc is a rotation direction of the shaft 61 caused to rotate by a drive force supplied from the drive unit 60. In FIG. 2, the illustration of the drive unit 60 is omitted. The directions illustrated in FIG. 1 and the like are examples, and do not limit an installation state of the valve device 1 of the present disclosure.

In the flow passages F inside the housing 10, part on the lower direction DRa1 side with respect to the lower movable disk 30 is also referred to as a lower flow passage Fb, and part on the upper direction DRa2 side with respect to the upper movable disk 50 is also referred to as an upper flow passage Fa. In the flow passage F inside the housing 10, part between the lower movable disk 30 and the upper movable disk 50 is also referred to as a central flow passage Fc. That is, in the present embodiment, the flow passage F inside the housing 10 is divided into the lower flow passage Fb, the central flow passage Fc, and the upper flow passage Fa by the lower movable disk 30 and the upper movable disk 50.

The lower housing 11 has a bottomed cylindrical shape, and includes a lower side wall portion 111 surrounding the axis CL and a lower bottom wall portion 112 forming a bottom surface. The lower housing 11 defines part of the flow passage F defined by the housing 10. Specifically, for example, the lower housing 11 defines the central flow passage Fc and the lower flow passage Fb. The lower housing 11 is provided with two fluid inlet portions 151, 152 and three fluid outlet portions 161, 162, 163, each of which communicates with a corresponding one of the central flow passage Fc and the lower flow passage Fb, and through which the fluid flows.

The lower housing 11 houses a portion of the upper housing 12, and also houses the lower stationary disk 20, the lower movable disk 30, the upper stationary disk 40, the upper movable disk 50, the lower lever 70, the upper lever 75, the lower torsion spring 80, and the like. The lower housing 11 further houses the upper torsion spring 85, the compression spring 90, and the like. The lower housing 11 is formed as an integrally molded product in which the lower side wall portion 111 and the lower bottom wall portion 112 are integrally formed. As illustrated in FIG. 2, the two fluid inlet portions 151, 152 and the three fluid outlet portions 161, 162, 163 are connected to an outer peripheral portion of the lower housing 11.

The lower side wall portion 111 has a cylindrical shape surrounding the flow passage F in the circumferential direction DRc, and extends in the axial direction DRa. The lower side wall portion 111 includes an O-ring installation portion 1111 on which an O-ring 113 provided to seal a gap between the lower housing 11 and the upper housing 12 is disposed on the upper direction DRa2 side, which is the opening side. The O-ring installation portion 1111 is formed by increasing an inner diameter of an end of the lower side wall portion 111 on the upper direction DRa2 side as compared with other portions of the lower side wall portion 111. The O-ring 113 is disposed on the O-ring installation portion 1111. The lower bottom wall portion 112 is continuous with the lower direction DRa1 side of the lower side wall portion 111.

Although not illustrated, a receiving groove receiving a lower protrusion 23 of the lower stationary disk 20 to be described later is formed in an inner side of the lower side wall portion 111. The prevention of rotation of the lower stationary disk 20 may be achieved by, for example, an anti-rotation pin instead of the lower protrusion 23.

The two fluid inlet portions 151, 152 are inlet ports that function as inlets through which the fluid flows into the flow passage F inside the housing 10. The three fluid outlet portions 161, 162, 163 are outlet ports that function as outlets through which the fluid allowed to flow into the flow passage F inside the housing 10 flows out to the outside of the valve device 1.

As illustrated in FIG. 2, one of the two fluid inlet portions 151, 152 is provided on the lower direction DRa1 side of the lower housing 11, and the other one is provided on the upper direction DRa2 side of the lower housing 11. On the other hand, the three fluid outlet portions 161, 162, 163 are provided on the lower direction DRa1 side of the lower housing 11. The two fluid inlet portions 151, 152 and the three fluid outlet portions 161, 162, 163 each are formed of a tubular member that is formed to allow the fluid to flow therethrough.

In the following description, of the two fluid inlet portions 151, 152 provided in the lower housing 11, the fluid inlet portion on the upper direction DRa2 side is referred to as a first fluid inlet portion 151, and the fluid inlet portion on the lower direction DRa1 side is referred to as a second fluid inlet portion 152. The three fluid outlet portions 161, 162, 163 provided in the lower housing 11 are referred to as a first fluid outlet portion 161, a second fluid outlet portion 162, and a third fluid outlet portion 163, respectively.

The first fluid inlet portion 151 and the third fluid outlet portion 163 are provided to be aligned in the axial direction DRa. The second fluid inlet portion 152, the first fluid outlet portion 161, the second fluid outlet portion 162, and the third fluid outlet portion 163 are provided side by side at predetermined intervals along the circumferential direction DRc, in the outer peripheral portion of the lower housing 11. In the present embodiment, the second fluid inlet portion 152, the first fluid outlet portion 161, the third fluid outlet portion 163, and the second fluid outlet portion 162 are provided side by side in this order at intervals of about 90°. The second fluid inlet portion 152, the first fluid outlet portion 161, the second fluid outlet portion 162, and the third fluid outlet portion 163 are formed on the lower direction DRa1 side with respect to the lower stationary disk 20 and the lower movable disk 30, in the outer peripheral portion of the lower housing 11.

The first fluid inlet portion 151 communicates with the central flow passage Fc. The second fluid inlet portion 152, the first fluid outlet portion 161, the second fluid outlet portion 162, and the third fluid outlet portion 163 communicate with the lower flow passage Fb. The arrangement of the first fluid inlet portion 151, the second fluid inlet portion 152, the first fluid outlet portion 161, the second fluid outlet portion 162, and the third fluid outlet portion 163 is not limited to this example, and can be appropriately changed. The first fluid inlet portion 151, the second fluid inlet portion 152, the first fluid outlet portion 161, the second fluid outlet portion 162, and the third fluid outlet portion 163 in the present embodiment function as openings. The second fluid inlet portion 152, the first fluid outlet portion 161, the second fluid outlet portion 162, and the third fluid outlet portion 163 function as one-side openings.

Figure 3:
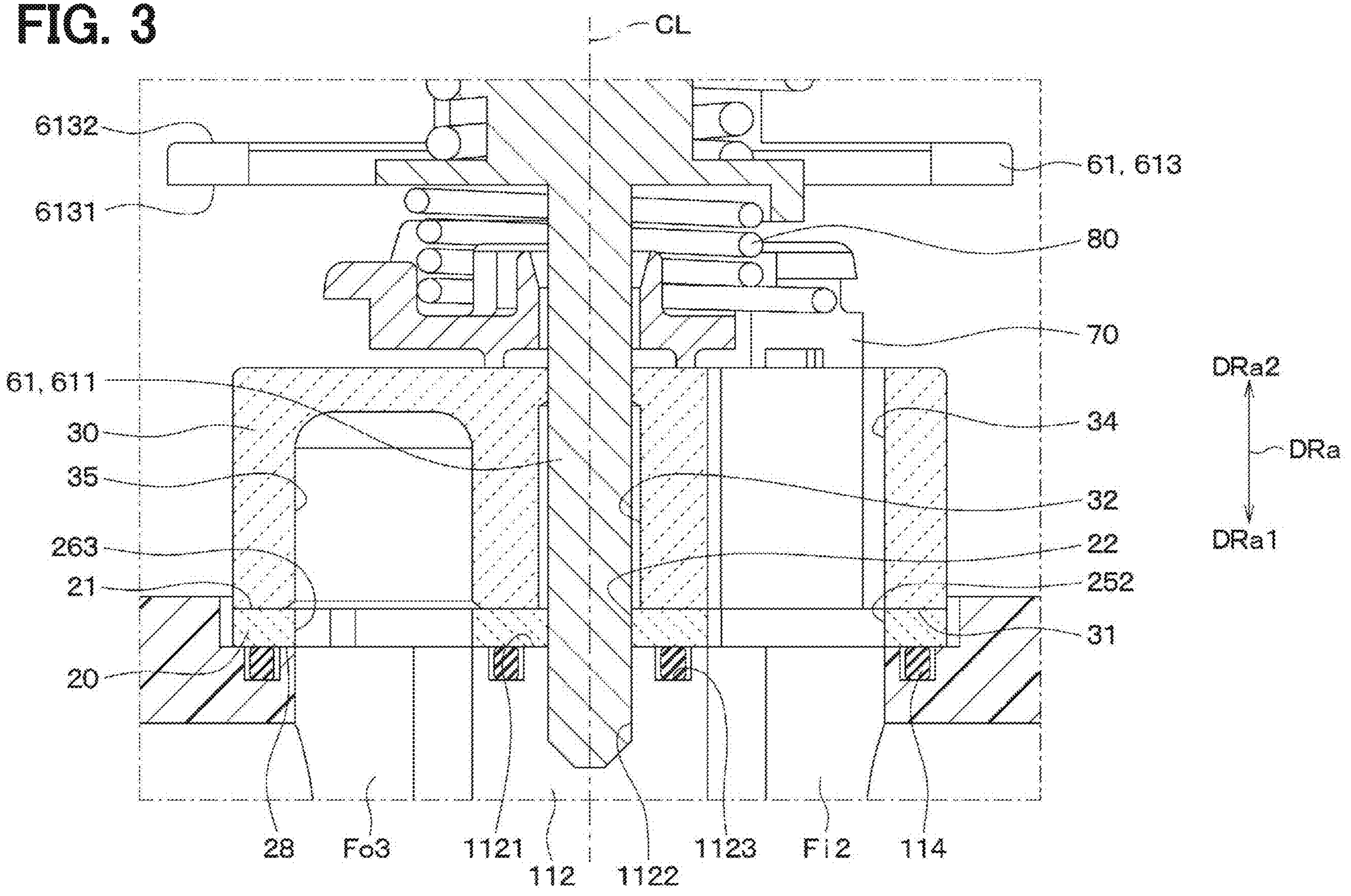
FIG. 3 is an enlarged view of part III of FIG. 1.

The lower bottom wall portion 112 is a portion on which the lower stationary disk 20 is installed, and is provided to support a portion on the lower direction DRa1 side of the shaft 61. As illustrated in FIG. 3, the lower bottom wall portion 112 includes a lower installation surface 1121 on which the lower stationary disk 20 is placed, on the upper direction DRa2 side. A lower bearing hole 1122 supporting the shaft 61 is formed in the lower bottom wall portion 112. The lower installation surface 1121 is formed with a lower gasket groove 1123 on which a lower gasket 114 sealing a gap between the lower stationary disk 20 and the lower installation surface 1121 is disposed.

The lower installation surface 1121 is formed to extend in a planar fashion along the radial direction DRr and the circumferential direction DRc. That is, the lower installation surface 1121 is orthogonal to the axial direction DRa, and is parallel to the radial direction DRr. The state in which the lower installation surface 1121 is orthogonal to the axial direction DRa does not mean a state in which the lower installation surface 1121 is orthogonal to the axial direction DRa in a strict sense, and includes a state in which the lower installation surface 1121 slightly deviates from the state orthogonal to the axial direction DRa due to a manufacturing error or the like.

The portion on the lower direction DRa1 side of the shaft 61 is fitted into the lower bearing hole 1122, whereby the shaft 61 is rotatably supported therein.

The lower gasket 114 is formed of, for example, a resiliently deformable rubber member, and is formed in, for example, an annular shape. Specifically, the lower gasket 114 is formed in a shape corresponding to the lower stationary disk 20, and has respective holes corresponding to four flow holes 252, 261, 262, 263 formed through the lower stationary disk 20 to be described later. The lower gasket 114 is fitted in the lower gasket groove 1123 between the lower stationary disk 20 and the lower installation surface 1121. In the present embodiment, the lower gasket 114 functions as a first seal member.

Figure 4:
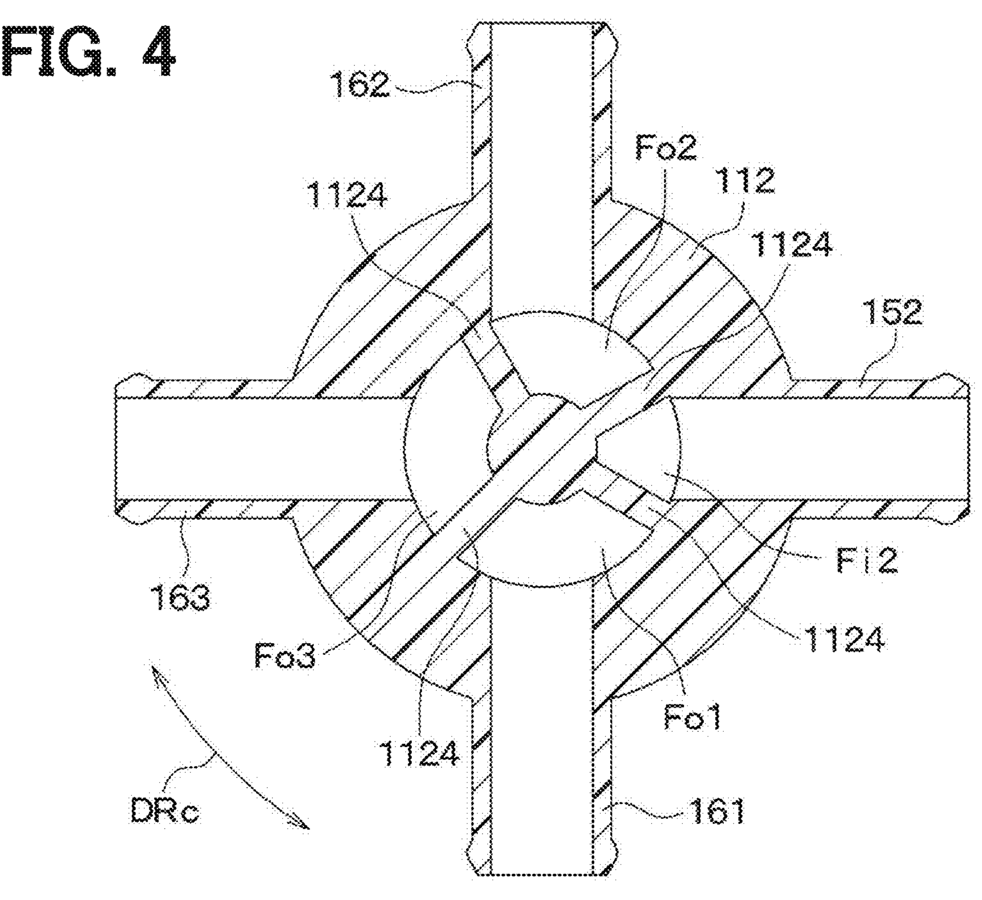
FIG. 4 is a cross-sectional view taken along line IV-IV of FIG. 1.

In the lower bottom wall portion 112, level differences are provided in accordance with the four flow holes 252, 261, 262, 263, which will be described later, of the lower stationary disk 20. That is, in the lower bottom wall portion 112, each of portions facing the four flow holes 252, 261, 262, 263, which will be described later, of the lower stationary disk 20 has a longer distance with respect to the upper housing 12 as compared with portions not facing the four flow holes 252, 261, 262, 263. With this configuration, as illustrated in FIGS. 1, 3, and 4, four flow passages Fi2, Fo1, Fo2, Fo3 are formed in the lower bottom wall portion 112.

Specifically, the lower bottom wall portion 112 is formed with a second inlet flow passage Fi2, a first outlet flow passage Fo1, a second outlet flow passage Fo2, and a third outlet flow passage Fo3 respectively communicating with the second fluid inlet portion 152, the first fluid outlet portion 161, the second fluid outlet portion 162, and the third fluid outlet portion 163. The second inlet flow passage Fi2, the first outlet flow passage Fo1, the second outlet flow passage Fo2, and the third outlet flow passage Fo3 are formed on the lower direction DRa1 side with respect to the lower stationary disk 20. The second inlet flow passage Fi2, the first outlet flow passage Fo1, the second outlet flow passage Fo2, and the third outlet flow passage Fo3 are partitioned by four lower partition walls 1124 provided in the lower bottom wall portion 112 of the lower housing 11.

In other words, in the flow passage F inside the housing 10, the lower flow passage Fb is partitioned into the second inlet flow passage Fi2, the first outlet flow passage Fo1, the second outlet flow passage Fo2, and the third outlet flow passage Fo3 by the four lower partition walls 1124. In the present embodiment, the second inlet flow passage Fi2, the second outlet flow passage Fo2, the third outlet flow passage Fo3, and the first outlet flow passage Fo1 are formed side by side in this order along the circumferential direction DRc.

The second inlet flow passage Fi2 is formed such that a cross section in a direction orthogonal to the axial direction DRa thereof has a substantially sector shape, and is formed such that a cross-sectional area orthogonal to the axial direction DRa thereof is different from each of respective cross-sectional areas orthogonal to the axial direction DRa of the first outlet flow passage Fo1, the second outlet flow passage Fo2, and the third outlet flow passage Fo3. Specifically, the second inlet flow passage Fi2 is formed such that the cross-sectional area orthogonal to the axial direction DRa is smaller than each of the respective cross-sectional areas orthogonal to the axial direction DRa of the first outlet flow passage Fo1, the second outlet flow passage Fo2, and the third outlet flow passage Fo3. Hereinafter, a cross-sectional area orthogonal to the axial direction DRa in each flow passage is also referred to as a flow passage cross-sectional area.

The second outlet flow passage Fo2 is formed such that a cross section in a direction orthogonal to the axial direction DRa thereof has a substantially sector shape, and is formed such that the flow passage cross-sectional area thereof is different from each of the respective flow passage cross-sectional areas of the first outlet flow passage Fo1 and the third outlet flow passage Fo3. Specifically, the second outlet flow passage Fo2 is formed such that the flow passage cross-sectional area thereof is smaller than each of the respective flow passage cross-sectional areas of the first outlet flow passage Fo1 and the third outlet flow passage Fo3.

The first outlet flow passage Fo1 and the third outlet flow passage Fo3 each are formed such that a cross section in a direction orthogonal to the axial direction DRa thereof has a substantially sector shape, and these flow passages are formed such that the respective flow passage cross-sectional areas have substantially the same size.

The thickness of each of the four lower partition walls 1124 is uniform over the radial direction DRr. The size of each of the four lower partition walls 1124 is uniform over the axial direction DRa.

The four lower partition walls 1124 are provided at respective positions corresponding to four lower partition portions 24, which will be described later, of the lower stationary disk 20. Ends of the four lower partition walls 1124 on the lower stationary disk 20 side are fixed in a state where each of respective orientations thereof coincides with a corresponding one of respective orientations of the four lower partition portions 24 of the lower stationary disk 20. Thus, the second inlet flow passage Fi2, the first outlet flow passage Fo1, the second outlet flow passage Fo2, and the third outlet flow passage Fo3 respectively communicate with the four flow holes 252, 261, 262, 263 of the lower stationary disk 20. In the present embodiment, the four lower partition walls 1124 function as one-side partition walls, and the second inlet flow passage Fi2, the first outlet flow passage Fo1, the second outlet flow passage Fo2, and the third outlet flow passage Fo3 partitioned by the four lower partition walls 1124 function as one-side flow passages.

As illustrated in FIG. 1, the lower stationary disk 20 is fixed inside the lower housing 11. Specifically, for example, as illustrated in FIGS. 1 and 3, the lower stationary disk 20 is disposed between the lower installation surface 1121 of the lower housing 11 and the lower movable disk 30. The lower stationary disk 20 is a seal member sealing a gap between the lower housing 11 and the lower movable disk 30. The lower stationary disk 20 is formed in a disk shape, and is disposed such that the central axis thereof coincides with the axis CL.

Figure 5:
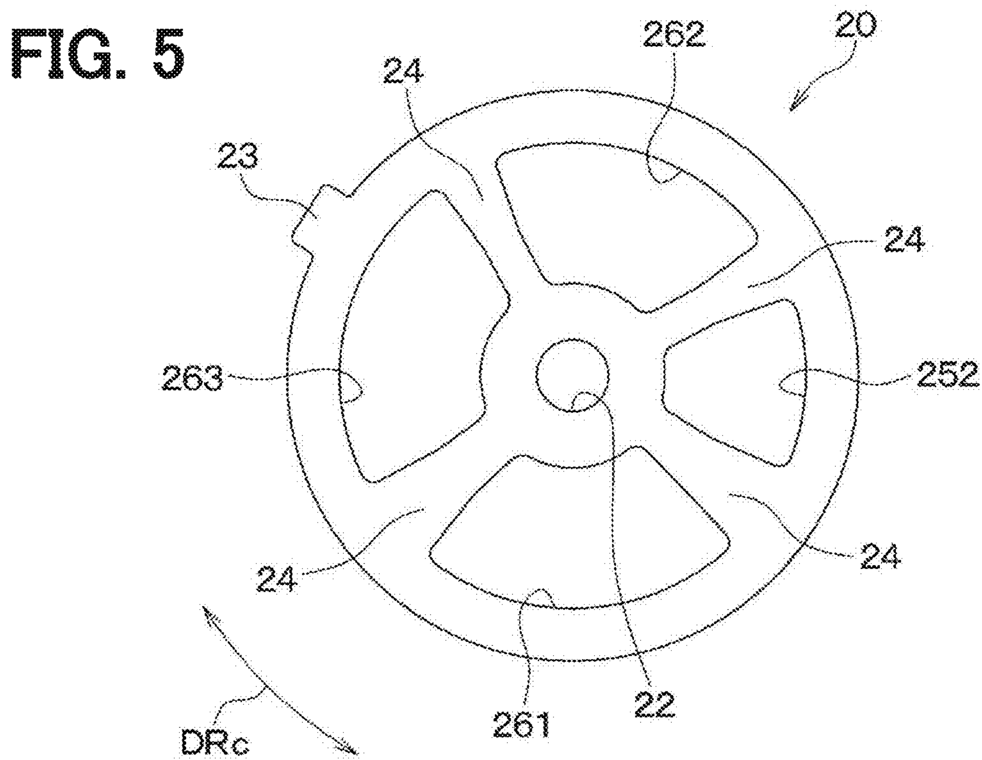
FIG. 5 is a top view of a lower stationary disk according to the first embodiment.

The lower stationary disk 20 includes a lower seal surface 21 in contact with the lower movable disk 30 and a lower support surface 28 in contact with the lower installation surface 1121. As illustrated in FIG. 5, the lower stationary disk 20 is formed with a lower stationary hole 22 through which the shaft 61 is inserted, substantially at the center thereof.

The lower seal surface 21 and the lower support surface 28 are formed to extend in a planar fashion along the radial direction DRr and the circumferential direction DRc. That is, the lower seal surface 21 and the lower support surface 28 are orthogonal to the axial direction DRa, and are parallel to the radial direction DRr. The state in which the lower seal surface 21 and the lower support surface 28 are orthogonal to the axial direction DRa does not mean a state in which the lower seal surface 21 is orthogonal to the axial direction DRa in a strict sense. The state in which the lower seal surface 21 and the lower support surface 28 are orthogonal to the axial direction DRa includes a state in which slight deviation is made from the state orthogonal to the axial direction DRa due to a manufacturing error or the like.

The lower stationary disk 20 is formed of a material having a smaller linear expansion coefficient, more excellent wear resistance, and a smaller friction coefficient as compared with the constituent material of the housing 10. For example, the lower stationary disk 20 is formed of a high-hardness material whose hardness is higher than the hardness of the housing 10. Specifically, the lower stationary disk 20 is formed by containing at least one of phenol, resin, or ceramic. The lower stationary disk 20 of the present embodiment is formed of ceramic.

In the lower stationary disk 20, only a portion forming the lower seal surface 21 on which the lower movable disk 30 slides may be formed of a material, such as ceramic, having a smaller linear expansion coefficient and more excellent wear resistance as compared with the constituent material of the housing 10. The lower stationary disk 20 may be formed by combining a plurality of constituent pieces.

The lower stationary disk 20 is provided not to relatively rotate in the circumferential direction DRc inside the flow passage F of the housing 10. Specifically, for example, as illustrated in FIG. 5, the lower stationary disk 20 includes the lower protrusion 23 protruding outward in the radial direction DRr. The lower stationary disk 20 is not rotatable in the circumferential direction DRc along with the rotation of the shaft 61 by fitting the lower protrusion 23 into the receiving groove (not illustrated) formed in the inner peripheral portion of the lower side wall portion 111.

The lower stationary disk 20 of the present embodiment has the four flow holes 252, 261, 262, 263 extending therethrough in the axial direction DRa, and has each of the four lower partition portions 24 provided between the corresponding ones of the four flow holes 252, 261, 262, 263. The four flow holes 252, 261, 262, 263 are formed through the lower stationary disk 20 in the axial direction DRa, and the fluid can pass through each of the four flow holes 252, 261, 262, 263. The four flow holes 252, 261, 262, 263 are arranged alternately with the four lower partition portions 24 in the circumferential direction DRc along the entire circumference of the lower stationary disk 20. The four flow holes 252, 261, 262, 263 each are formed such that a cross section in a direction orthogonal to the axial direction DRa thereof has a substantially sector shape. In the following description, the four flow holes 252, 261, 262, 263 are referred to as a second inlet flow hole 252, a first outlet flow hole 261, a second outlet flow hole 262, and a third outlet flow hole 263, respectively. In the present embodiment, the second inlet flow hole 252, the first outlet flow hole 261, the third outlet flow hole 263, and the second outlet flow hole 262 are provided side by side in this order along the circumferential direction DRc.

The second inlet flow hole 252, the first outlet flow hole 261, the second outlet flow hole 262, and the third outlet flow hole 263 respectively correspond to the second inlet flow passage Fi2, the first outlet flow passage Fo1, the second outlet flow passage Fo2, and the third outlet flow passage Fo3 in the lower flow passage Fb, on a one-to-one basis. Specifically, the second inlet flow hole 252 has a flow passage cross-sectional area corresponding to the flow passage cross-sectional area of the second inlet flow passage Fi2, and communicates with the second fluid inlet portion 152 via the second inlet flow passage Fi2. The first outlet flow hole 261 has a flow passage cross-sectional area corresponding to the flow passage cross-sectional area of the first outlet flow passage Fo1, and communicates with the first fluid outlet portion 161 via the first outlet flow passage Fo1. The second outlet flow hole 262 has a flow passage cross-sectional area corresponding to the flow passage cross-sectional area of the second outlet flow passage Fo2, and communicates with the second fluid outlet portion 162 via the second outlet flow passage Fo2. The third outlet flow hole 263 has a flow passage cross-sectional area corresponding to the flow passage cross-sectional area of the third outlet flow passage Fo3, and communicates with the third fluid outlet portion 163 via the third outlet flow passage Fo3. The second inlet flow hole 252, the first outlet flow hole 261, the second outlet flow hole 262, and the third outlet flow hole 263 in the present embodiment function as first flow passage holes.

Figure 6:
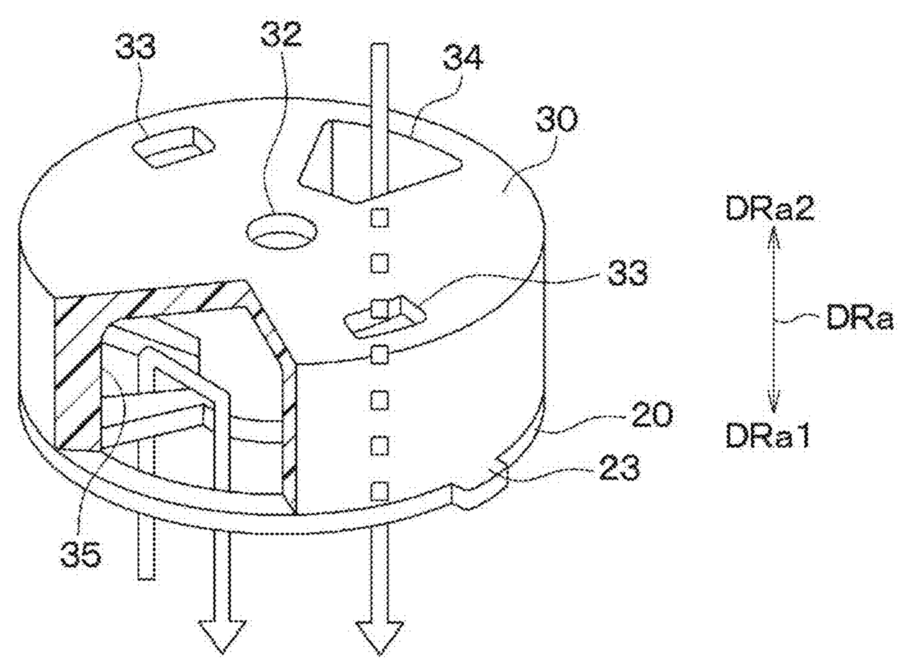
FIG. 6 is a partial cross-sectional view of a lower movable disk according to the first embodiment.

As illustrated in FIG. 3, the lower movable disk 30 is provided inside the lower housing 11, and is in surface contact with the lower seal surface 21 of the lower stationary disk 20. As illustrated in FIGS. 3 and 6, the lower movable disk 30 of the present embodiment is formed in a disk shape having an outer diameter substantially the same as the outer diameter of the lower stationary disk 20, and the lower movable disk 30 is disposed such that the central axis thereof coincides with the axis CL.

The lower movable disk 30 includes a lower sliding surface 31 that slides on the lower stationary disk 20. The lower movable disk 30 is formed with a lower movable hole 32 through which the shaft 61 is inserted, substantially at the center thereof, and is formed with two lower press-fitting grooves 33 to which the lower lever 70 to be described later is press-fitted.

The lower sliding surface 31 is formed to extend in a planar fashion along the radial direction DRr and the circumferential direction DRc. That is, the lower sliding surface 31 is orthogonal to the axial direction DRa, and is parallel to the radial direction DRr. The state in which the lower sliding surface 31 is orthogonal to the axial direction DRa does not mean a state in which the lower sliding surface 31 is orthogonal to the axial direction DRa in a strict sense, and includes a state in which the lower sliding surface 31 slightly deviates from the state orthogonal to the axial direction DRa due to a manufacturing error or the like.

Like the lower stationary disk 20, the lower movable disk 30 is formed of a material having a smaller linear expansion coefficient, more excellent wear resistance, and a smaller friction coefficient as compared with the constituent material of the housing 10. For example, the lower movable disk 30 is formed of a high-hardness material whose hardness is higher than the hardness of the housing 10. Specifically, the lower movable disk 30 is formed by containing at least one of phenol, resin, or ceramic. The lower movable disk 30 of the present embodiment is formed of ceramic, which is a material similar to the material of the lower stationary disk 20.

In the lower movable disk 30, only a portion forming the lower sliding surface 31 on which the lower stationary disk 20 slides may be formed of a material, such as ceramic, having a smaller linear expansion coefficient and more excellent wear resistance as compared with the constituent material of the housing 10. The lower movable disk 30 may be formed by combining a plurality of constituent pieces.

The lower movable disk 30 is formed such that the outer diameter thereof is smaller than the inner diameter of the lower housing 11, and is provided to be rotatable about the axis CL of the shaft 61. The lower movable disk 30 has one lower flow passage through-hole 34 extending through the lower movable disk 30 in the axial direction DRa, and one lower flow passage communication hole 35 not extending through the lower movable disk 30.

Figure 7:
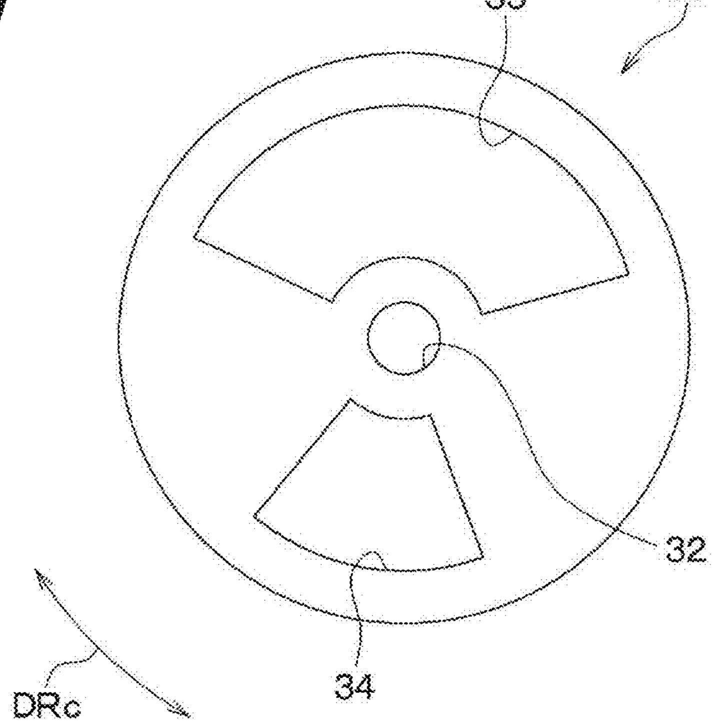
FIG. 7 is a bottom view of the lower movable disk according to the first embodiment.

As illustrated in FIG. 7, the lower flow passage through-hole 34 and the lower flow passage communication hole 35 each are formed such that a cross section in a direction orthogonal to the axial direction DRa thereof has a substantially sector shape. The lower flow passage through-hole 34 is formed such that the cross section in the direction orthogonal to the axial direction DRa thereof is smaller than the cross section in the direction orthogonal to the axial direction DRa of the lower flow passage communication hole 35. Specifically, for example, the lower flow passage through-hole 34 is formed such that the cross section in the direction orthogonal to the axial direction DRa thereof has a size that is ½ or less of the size of the cross section in the direction orthogonal to the axial direction DRa of the lower flow passage communication hole 35.

The lower flow passage through-hole 34 is formed through the lower movable disk 30, and is formed such that the fluid can pass therethrough. In the lower flow passage through-hole 34, the lower direction DRa1 side communicates with any of the second inlet flow hole 252, the first outlet flow hole 261, the second outlet flow hole 262, and the third outlet flow hole 263 of the lower stationary disk 20. In the lower flow passage through-hole 34, the upper direction DRa2 side communicates with the central flow passage Fc.

The lower flow passage through-hole 34 is formed to have a flow passage cross-sectional area slightly larger than the flow passage cross-sectional area of the second inlet flow hole 252 of the lower stationary disk 20, and has a size superimposable across the entire second inlet flow hole 252. On the other hand, the lower flow passage through-hole 34 is formed such that the flow passage cross-sectional area thereof is smaller than each of the respective flow passage cross-sectional areas of the first outlet flow hole 261, the second outlet flow hole 262, and the third outlet flow hole 263 of the lower stationary disk 20. The lower flow passage through-hole 34 has a size non-superimposable across each of respective entireties of the first outlet flow hole 261, the second outlet flow hole 262, and the third outlet flow hole 263.

The lower flow passage through-hole 34 is formed to be able to communicate with any one or two of the second inlet flow hole 252, the first outlet flow hole 261, the second outlet flow hole 262, and the third outlet flow hole 263 in accordance with the rotational position of the lower movable disk 30. Specifically, in a case where the lower flow passage through-hole 34 overlaps only any one of the second inlet flow hole 252, the first outlet flow hole 261, the second outlet flow hole 262, and the third outlet flow hole 263 in the axial direction DRa, the lower flow passage through-hole 34 communicates with only this overlapped flow hole. In a case where the lower flow passage through-hole 34 spans and overlaps two of the second inlet flow hole 252, the first outlet flow hole 261, the second outlet flow hole 262, and the third outlet flow hole 263 in the axial direction DRa, the lower flow passage through-hole 34 communicates with these two spanned flow holes.

In other words, the lower movable disk 30 has the lower flow passage through-hole 34 that communicates with at least one of the second inlet flow passage Fi2, the first outlet flow passage Fo1, the second outlet flow passage Fo2, or the third outlet flow passage Fo3 through the rotation of the lower movable disk 30 caused along with the rotation of the shaft 61.

The lower flow passage communication hole 35 is formed by recessing a portion of the lower sliding surface 31, which is on a side where sliding with respect to the lower stationary disk 20 is performed. That is, the lower flow passage communication hole 35 is formed without extending through the lower movable disk 30. The lower flow passage communication hole 35 is formed to have a flow passage cross-sectional area larger than each of the respective flow passage cross-sectional areas of the second inlet flow hole 252, the first outlet flow hole 261, the second outlet flow hole 262, and the third outlet flow hole 263. The lower flow passage communication hole 35 has a size superimposable across each of respective entireties of the second inlet flow hole 252, the first outlet flow hole 261, the second outlet flow hole 262, and the third outlet flow hole 263.

In the present embodiment, the lower flow passage communication hole 35 has a size concurrently superimposable on at least respective parts of any two or three of the second inlet flow hole 252, the first outlet flow hole 261, the second outlet flow hole 262, or the third outlet flow hole 263.

The lower flow passage communication hole 35 is formed to be able to allow any two or three of the second inlet flow hole 252, the first outlet flow hole 261, the second outlet flow hole 262, and the third outlet flow hole 263 to communicate with each other. Specifically, in a case where the lower flow passage communication hole 35 spans and overlaps any two of the second inlet flow hole 252, the first outlet flow hole 261, the second outlet flow hole 262, and the third outlet flow hole 263 in the axial direction DRa, the lower flow passage communication hole 35 allows these two spanned flow holes to communicate with each other. In a case where the lower flow passage communication hole 35 spans and overlaps any three of the second inlet flow hole 252, the first outlet flow hole 261, the second outlet flow hole 262, and the third outlet flow hole 263, the lower flow passage communication hole 35 allows these three spanned flow holes to communicate with each other. Thus, among the second inlet flow hole 252, the first outlet flow hole 261, the second outlet flow hole 262, and the third outlet flow hole 263, the flow holes communicating with each other via the lower flow passage communication hole 35 communicate with each other.

In other words, the lower movable disk 30 has the lower flow passage communication hole 35 that allows a plurality of ones of the second inlet flow passage Fi2, the first outlet flow passage Fo1, the second outlet flow passage Fo2, and the third outlet flow passage Fo3 to communicate with each other through the rotation of the lower movable disk 30 caused along with the rotation of the shaft 61.

Therefore, when the lower movable disk 30 is caused to rotate and then is caused to stop at a predetermined position, the lower flow passage through-hole 34 communicates with any one or two of the second inlet flow hole 252, the first outlet flow hole 261, the second outlet flow hole 262, and the third outlet flow hole 263. The lower flow passage through-hole 34 communicates with the flow passage(s) corresponding to the flow hole(s) with which the lower flow passage through-hole 34 communicates, among the second inlet flow passage Fi2, the first outlet flow passage Fo1, the second outlet flow passage Fo2, and the third outlet flow passage Fo3. As a result, the lower flow passage through-hole 34 allows communication between the central flow passage Fc and the flow passage(s) with which the lower flow passage through-hole 34 communicates, among the second inlet flow passage Fi2, the first outlet flow passage Fo1, the second outlet flow passage Fo2, and the third outlet flow passage Fo3.

When the lower movable disk 30 is caused to rotate and then is caused to stop at a predetermined position, the lower flow passage communication hole 35 allows any two or three of the second inlet flow hole 252, the first outlet flow hole 261, the second outlet flow hole 262, and the third outlet flow hole 263 to communicate with each other. The lower flow passage communication hole 35 communicates with the respective flow passages corresponding to the two or three flow holes with which the lower flow passage communication hole 35 communicates, among the second inlet flow passage Fi2, the first outlet flow passage Fo1, the second outlet flow passage Fo2, and the third outlet flow passage Fo3. As a result, the lower flow passage communication hole 35 allows the two or three flow passages with which the lower flow passage communication hole 35 communicates, among the second inlet flow passage Fi2, the first outlet flow passage Fo1, the second outlet flow passage Fo2, and the third outlet flow passage Fo3, to communicate with each other.

In the present embodiment, a rotational range of the lower movable disk 30 is determined in advance, and the lower flow passage through-hole 34 is configured to be able to communicate with any one or two of the first outlet flow hole 261, the second outlet flow hole 262, and the third outlet flow hole 263. The lower flow passage through-hole 34 is configured to be unable to communicate with the second inlet flow hole 252. That is, the lower flow passage through-hole 34 is configured to be unable to communicate with the second fluid inlet portion 152 via the second inlet flow passage Fi2.

The lower flow passage communication hole 35 communicates with the second inlet flow hole 252, and is configured to be able to communicate with at least one of the first outlet flow hole 261 or the second outlet flow hole 262. Thus, the lower flow passage communication hole 35 is configured to be able to allow the second inlet flow hole 252 to communicate with the first outlet flow hole 261 or the second outlet flow hole 262. The lower flow passage communication hole 35 is configured to be unable to communicate with the third outlet flow hole 263.

In the present embodiment, the lower stationary disk 20 functions as a first stationary disk, and the lower movable disk 30 functions as a first movable disk.

The upper housing 12 is a member capping the opening side of the lower housing 11. As illustrated in FIGS. 1 and 2, the upper housing 12 has a bottomed cylindrical shape, and includes an upper bottom wall portion 121 forming a bottom surface and a lid portion 122 capping the lower housing 11. The upper housing 12 defines part of the flow passage F defined by the housing 10. Specifically, for example, the upper housing 12 defines the upper flow passage Fa. The upper housing 12 is provided with one fluid inlet portion 153 and three fluid outlet portions 164, 165, 166, which communicate with the upper flow passage Fa, and through which the fluid flows.

The upper housing 12 houses the upper stationary disk 40, and also houses a portion of the upper movable disk 50. The upper bottom wall portion 121 and the lid portion 122 are formed as an integrally molded product in which the upper bottom wall portion 121 and the lid portion 122 are integrally formed.

The upper bottom wall portion 121 has a cylindrical shape surrounding the upper flow passage Fa in the circumferential direction DRc, and extends in the axial direction DRa. The upper bottom wall portion 121 is formed to have an outer diameter smaller than the outer diameter of the lower side wall portion 111. The lid portion 122 is continuous with the lower direction DRa1 side of the upper bottom wall portion 121. The one fluid inlet portion 153 and the three fluid outlet portions 164, 165, 166 are connected to an outer peripheral portion of the upper bottom wall portion 121.

The one fluid inlet portion 153 is an inlet port that functions as an inlet through which the fluid flows into the flow passage F inside the housing 10. The three fluid outlet portions 164, 165, 166 are outlet ports that function as outlets through which the fluid allowed to flow into the flow passage F inside the housing 10 flows out to the outside of the valve device 1.

The one fluid inlet portion 153 and the three fluid outlet portions 164, 165, 166 each are formed of a tubular member that is formed to allow the fluid to flow therethrough. In the following description, the one fluid inlet portion 153 provided in the upper housing 12 is referred to as a third fluid inlet portion 153, and the three fluid outlet portions 164, 165, 166 provided in the upper housing 12 are referred to as a fourth fluid outlet portion 164, a fifth fluid outlet portion 165, and a sixth fluid outlet portion 166, respectively.

As illustrated in FIG. 2, the sixth fluid outlet portion 166 is provided to be aligned in the axial direction DRa with the first fluid inlet portion 151 and the third fluid outlet portion 163 provided in the lower housing 11. The third fluid inlet portion 153, the fourth fluid outlet portion 164, the fifth fluid outlet portion 165, and the sixth fluid outlet portion 166 are provided side by side at predetermined intervals along the circumferential direction DRc, in an outer peripheral portion of the upper housing 12. In the present embodiment, the third fluid inlet portion 153, the fifth fluid outlet portion 165, the fourth fluid outlet portion 164, and the sixth fluid outlet portion 166 are provided side by side in this order at unequal intervals. The third fluid inlet portion 153, the fifth fluid outlet portion 165, the fourth fluid outlet portion 164, and the sixth fluid outlet portion 166 are formed on the upper direction DRa2 side with respect to the upper stationary disk 40 and the upper movable disk 50, in the outer peripheral portion of the upper housing 12.

The third fluid inlet portion 153, the fourth fluid outlet portion 164, the fifth fluid outlet portion 165, and the sixth fluid outlet portion 166 communicate with the upper flow passage Fa. The arrangement of the third fluid inlet portion 153, the fourth fluid outlet portion 164, the fifth fluid outlet portion 165, and the sixth fluid outlet portion 166 is not limited to this example, and can be appropriately changed. The third fluid inlet portion 153, the fourth fluid outlet portion 164, the fifth fluid outlet portion 165, and the sixth fluid outlet portion 166 in the present embodiment are openings, and function as other-side openings.

The lid portion 122 is a member capping the opening of the lower housing 11 by being fitted to the opening side of the lower housing 11. The lid portion 122 includes a plate portion 1221 and a rib portion 1222. The plate portion 1221 is formed in an annular shape extending outward in the radial direction DRr from an outer peripheral surface of the upper bottom wall portion 121. The plate portion 1221 has an outer diameter that increases stepwise from the lower direction DRa1 side toward the upper direction DRa2 side.

The rib portion 1222 is a portion of the lid portion 122, fitted to the opening side of the lower housing 11. The rib portion 1222 has a cylindrical shape and is formed to have an outer diameter smaller than the inner diameter of the lower side wall portion 111, and is formed to be fittable from the opening side of the lower housing 11.

The rib portion 1222 is provided to protrude from a surface of the plate portion 1221 on the lower direction DRa1 side toward the lower direction DRa1. The upper stationary disk 40 faces an inner peripheral surface of the rib portion 1222. The O-ring 113 is sandwiched between an inner peripheral surface of the lower housing 11 and an outer peripheral surface of the rib portion 1222 of the upper housing 12. The O-ring 113 is formed of urethane rubber, which is an annular resilient body, and is configured to be resiliently deformable by being compressed when being sandwiched between the lower side wall portion 111 and the rib portion 1222.

Although not illustrated, a receiving groove receiving an upper protrusion 43 of the upper stationary disk 40 to be described later is formed in an inner side of the rib portion 1222. The prevention of rotation of the upper stationary disk 40 may be achieved by, for example, an anti-rotation pin instead of the upper protrusion 43.

Figure 8:
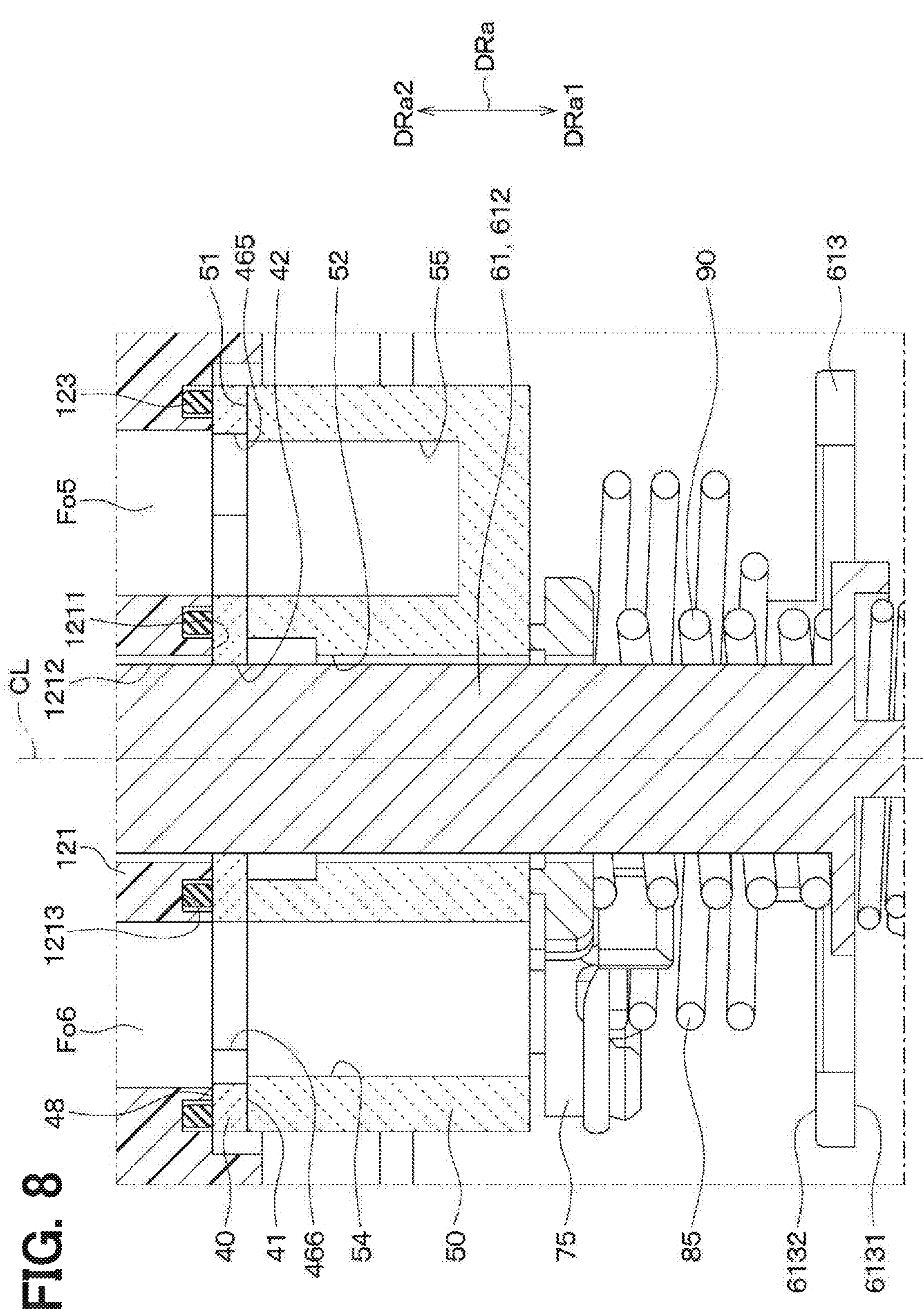
FIG. 8 is an enlarged view of part VIII of FIG. 1.

The upper bottom wall portion 121 is a portion on which the upper stationary disk 40 is installed, and that supports a portion on the upper direction DRa2 side of the shaft 61. As illustrated in FIG. 8, the upper bottom wall portion 121 includes an upper installation surface 1211 on which the upper stationary disk 40 is placed, on the lower direction DRa1 side. An upper bearing hole 1212 supporting the shaft 61 is formed in the upper bottom wall portion 121. The upper installation surface 1211 is provided with an upper gasket groove 1213 on which an upper gasket 123 sealing a gap between the upper stationary disk 40 and the upper installation surface 1211 is disposed.

The upper installation surface 1211 is formed to extend in a planar fashion along the radial direction DRr and the circumferential direction DRc. That is, the upper installation surface 1211 is orthogonal to the axial direction DRa, and is parallel to the radial direction DRr. The state in which the upper installation surface 1211 is orthogonal to the axial direction DRa does not mean a state in which the upper installation surface 1211 is orthogonal to the axial direction DRa in a strict sense, and includes a state in which the upper installation surface 1211 slightly deviates from the state orthogonal to the axial direction DRa due to a manufacturing error or the like.

The portion on the upper direction DRa2 side of the shaft 61 is fitted into the upper bearing hole 1212, whereby the shaft 61 is rotatably supported therein.

The upper gasket 123 is formed of, for example, a resiliently deformable rubber member, and is formed in, for example, an annular shape. Specifically, the upper gasket 123 is formed in a shape corresponding to the upper stationary disk 40, and has respective holes corresponding to four flow holes 453, 464, 465, 466 formed through the upper stationary disk 40 to be described later. The upper gasket 123 is fitted in the upper gasket groove 1213 between the upper stationary disk 40 and the upper installation surface 1211. In the present embodiment, the upper gasket 123 functions as a second seal member.

Figure 9:
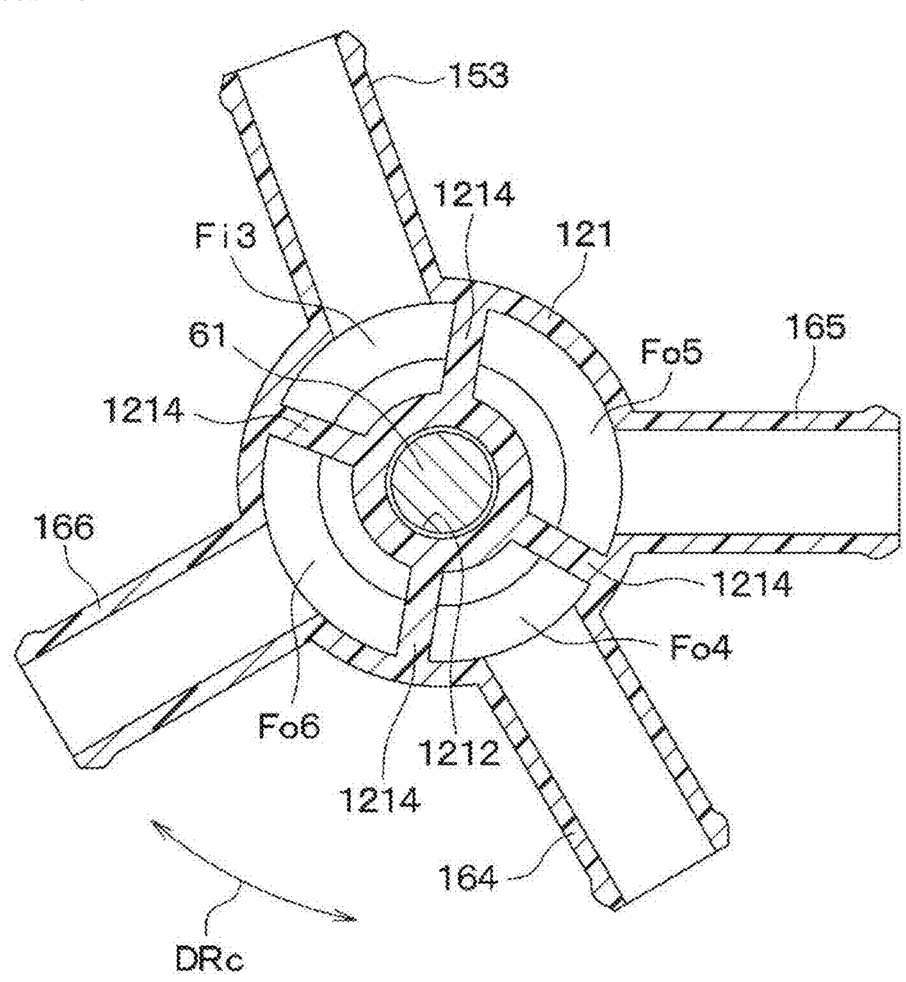
FIG. 9 is a cross-sectional view taken along line IX-IX of FIG. 1.

In the upper bottom wall portion 121, level differences are provided in accordance with the four flow holes 453, 464, 465, 466, which will be described later, of the upper stationary disk 40. That is, in the upper bottom wall portion 121, each of portions facing the four flow holes 453, 464, 465, 466, which will be described later, of the upper stationary disk 40 has a longer distance with respect to the lower housing 11 as compared with portions not facing the four flow holes 453, 464, 465, 466. With this configuration, as illustrated in FIGS. 1, 8, and 9, four flow passages Fi3, Fo4, Fo5, Fo6 are formed in the upper bottom wall portion 121.

Specifically, the upper bottom wall portion 121 is formed with a third inlet flow passage Fi3, a fourth outlet flow passage Fo4, a fifth outlet flow passage Fo5, and a sixth outlet flow passage Fo6 respectively communicating with the third fluid inlet portion 153, the fourth fluid outlet portion 164, the fifth fluid outlet portion 165, and the sixth fluid outlet portion 166. The third inlet flow passage Fi3, the fourth outlet flow passage Fo4, the fifth outlet flow passage Fo5, and the sixth outlet flow passage Fo6 are formed on the upper direction DRa2 side with respect to the upper stationary disk 40. The third inlet flow passage Fi3, the fourth outlet flow passage Fo4, the fifth outlet flow passage Fo5, and the sixth outlet flow passage Fo6 are partitioned by four upper partition walls 1214 provided in the upper bottom wall portion 121 of the upper housing 12.

In other words, in the flow passage F inside the housing 10, the upper flow passage Fa is partitioned into the third inlet flow passage Fi3, the fourth outlet flow passage Fo4, the fifth outlet flow passage Fo5, and the sixth outlet flow passage Fo6 by the four upper partition walls 1214. In the present embodiment, the third inlet flow passage Fi3, the sixth outlet flow passage Fo6, the fourth outlet flow passage Fo4, and the fifth outlet flow passage Fo5 are formed side by side in this order along the circumferential direction DRc.

The third inlet flow passage Fi3, the fourth outlet flow passage Fo4, the fifth outlet flow passage Fo5, and the sixth outlet flow passage Fo6 each are formed such that a cross section in a direction orthogonal to the axial direction DRa thereof has a substantially sector shape, and these flow passages are formed such that respective flow passage cross-sectional areas thereof are different from each other. Specifically, the fourth outlet flow passage Fo4, the third inlet flow passage Fi3, the sixth outlet flow passage Fo6, and the fifth outlet flow passage Fo5 are formed such that the respective flow passage cross-sectional areas thereof are increased in this order.

As illustrated in FIG. 9, the thickness of each of the four upper partition walls 1214 is uniform over the radial direction DRr. The size of each of the four upper partition walls 1214 is uniform over the axial direction DRa.

The four upper partition walls 1214 are provided at respective positions corresponding to four upper partition portions 44, which will be described later, of the upper stationary disk 40. Ends of the four upper partition walls 1214 on the upper stationary disk 40 side are fixed in a state where each of respective orientations thereof coincides with a corresponding one of respective orientations of the four upper partition portions 44 of the upper stationary disk 40. Thus, the third inlet flow passage Fi3, the fourth outlet flow passage Fo4, the fifth outlet flow passage Fo5, and the sixth outlet flow passage Fo6 respectively communicate with the four flow holes 453, 464, 465, 466 of the upper stationary disk 40. In the present embodiment, the four upper partition walls 1214 function as other-side partition walls, and the third inlet flow passage Fi3, the fourth outlet flow passage Fo4, the fifth outlet flow passage Fo5, and the sixth outlet flow passage Fo6 partitioned by the four upper partition walls 1214 function as other-side flow passages.

As illustrated in FIG. 1, the upper stationary disk 40 is fixed inside the upper housing 12. Specifically, for example, as illustrated in FIGS. 1 and 8, the upper stationary disk 40 is disposed between the upper installation surface 1211 of the upper housing 12 and the upper movable disk 50. The upper stationary disk 40 is a seal member sealing a gap between the upper housing 12 and the upper movable disk 50. The upper stationary disk 40 is formed in a disk shape, and is disposed such that the central axis thereof coincides with the axis CL.

Figure 10:
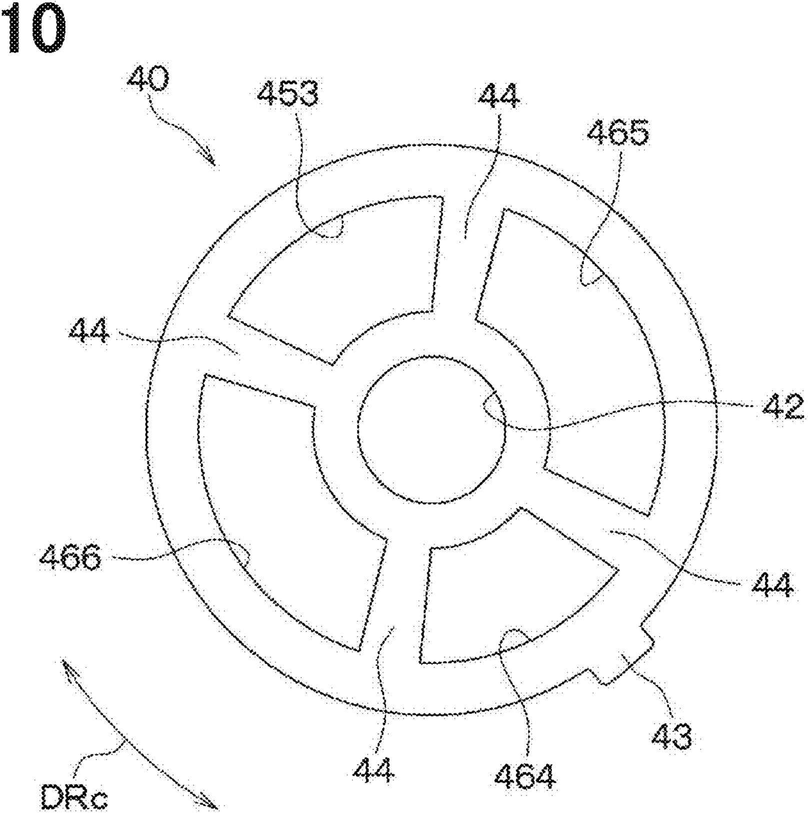
FIG. 10 is a top view of an upper stationary disk according to the first embodiment.

The upper stationary disk 40 includes an upper seal surface 41 in contact with the upper movable disk 50 and an upper support surface 48 in contact with the upper installation surface 1211. As illustrated in FIG. 10, the upper stationary disk 40 is formed with an upper stationary hole 42 through which the shaft 61 is inserted, substantially at the center thereof. The upper stationary disk 40 is formed to have an outer diameter larger than the outer diameter of the lower stationary disk 20. The upper stationary hole 42 is formed to have an inner diameter larger than the inner diameter of the lower stationary hole 22. This formation is made because a portion of the shaft 61 inserted into the upper stationary disk 40 is larger than a portion of the shaft 61 inserted into the lower stationary disk 20.

The upper seal surface 41 and the upper support surface 48 are formed to extend in a planar fashion along the radial direction DRr and the circumferential direction DRc. That is, the upper seal surface 41 and the upper support surface 48 are orthogonal to the axial direction DRa, and are parallel to the radial direction DRr. The state in which the upper seal surface 41 and the upper support surface 48 are orthogonal to the axial direction DRa does not mean a state in which the upper seal surface 41 is orthogonal to the axial direction DRa in a strict sense. The state in which the upper seal surface 41 and the upper support surface 48 are orthogonal to the axial direction DRa includes a state in which slight deviation is made from the state orthogonal to the axial direction DRa due to a manufacturing error or the like.

Like the lower stationary disk 20, the upper stationary disk 40 is formed of a material having a smaller linear expansion coefficient, more excellent wear resistance, and a smaller friction coefficient as compared with the constituent material of the housing 10. For example, the upper stationary disk 40 is formed of a high-hardness material whose hardness is higher than the hardness of the housing 10. Specifically, the upper stationary disk 40 is formed by containing at least one of phenol, resin, or ceramic. The upper stationary disk 40 of the present embodiment is formed of ceramic.

In the upper stationary disk 40, only a portion forming the upper seal surface 41 on which the upper movable disk 50 slides may be formed of a material, such as ceramic, having a smaller linear expansion coefficient and more excellent wear resistance as compared with the constituent material of the housing 10. The upper stationary disk 40 may be formed by combining a plurality of constituent pieces.

The upper stationary disk 40 is provided not to relatively rotate in the circumferential direction DRc inside the flow passage F of the housing 10. Specifically, for example, as illustrated in FIG. 10, the upper stationary disk 40 includes the upper protrusion 43 protruding outward in the radial direction DRr. The upper stationary disk 40 is not rotatable in the circumferential direction DRc along with the rotation of the shaft 61 by fitting the upper protrusion 43 into the receiving groove (not illustrated) formed in the inner peripheral portion of the rib portion 1222.

The upper stationary disk 40 of the present embodiment has the four flow holes 453, 464, 465, 466 extending therethrough in the axial direction DRa, and has each of the four upper partition portions 44 provided between the corresponding ones of the four flow holes 453, 464, 465, 466. The four flow holes 453, 464, 465, 466 are formed through the upper stationary disk 40 in the axial direction DRa, and the fluid can pass through each of the four flow holes 453, 464, 465, 466. The four flow holes 453, 464, 465, 466 are arranged alternately with the four upper partition portions 44 in the circumferential direction DRc along the entire circumference of the upper stationary disk 40. The four flow holes 453, 464, 465, 466 each are formed such that a cross section in a direction orthogonal to the axial direction DRa thereof has a substantially sector shape. In the following description, the four flow holes 453, 464, 465, 466 are referred to as a third inlet flow hole 453, a fourth outlet flow hole 464, a fifth outlet flow hole 465, and a sixth outlet flow hole 466, respectively. In the present embodiment, the third inlet flow hole 453, the fifth outlet flow hole 465, the fourth outlet flow hole 464, and the sixth outlet flow hole 466 are provided side by side in this order along the circumferential direction DRc.

The third inlet flow hole 453, the fourth outlet flow hole 464, the fifth outlet flow hole 465, and the sixth outlet flow hole 466 respectively correspond to the third inlet flow passage Fi3, the fourth outlet flow passage Fo4, the fifth outlet flow passage Fo5, and the sixth outlet flow passage Fo6 in the upper flow passage Fa, on a one-to-one basis. Specifically, the third inlet flow hole 453 has a flow passage cross-sectional area corresponding to the flow passage cross-sectional area of the third inlet flow passage Fi3, and communicates with the third fluid inlet portion 153 via the third inlet flow passage Fi3. The fourth outlet flow hole 464 has a flow passage cross-sectional area corresponding to the flow passage cross-sectional area of the fourth outlet flow passage Fo4, and communicates with the fourth fluid outlet portion 164 via the fourth outlet flow passage Fo4. The fifth outlet flow hole 465 has a flow passage cross-sectional area corresponding to the flow passage cross-sectional area of the fifth outlet flow passage Fo5, and communicates with the fifth fluid outlet portion 165 via the fifth outlet flow passage Fo5. The sixth outlet flow hole 466 has a flow passage cross-sectional area corresponding to the flow passage cross-sectional area of the sixth outlet flow passage Fo6, and communicates with the sixth fluid outlet portion 166 via the sixth outlet flow passage Fo6. The third inlet flow hole 453, the fourth outlet flow hole 464, the fifth outlet flow hole 465, and the sixth outlet flow hole 466 in the present embodiment function as second flow passage holes.

Figure 11:
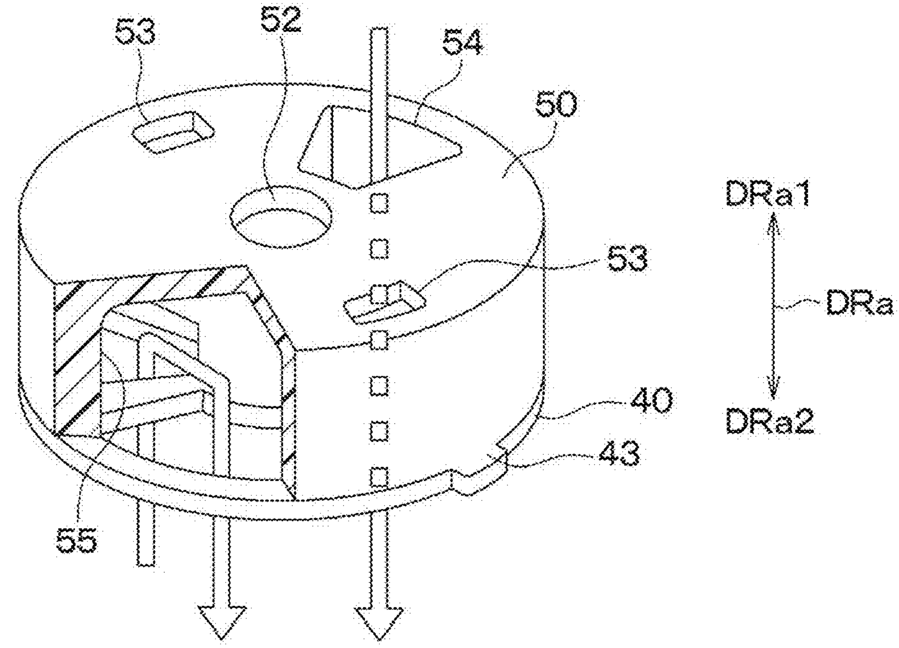
FIG. 11 is a partial cross-sectional view of an upper movable disk according to the first embodiment.
Figure 12:
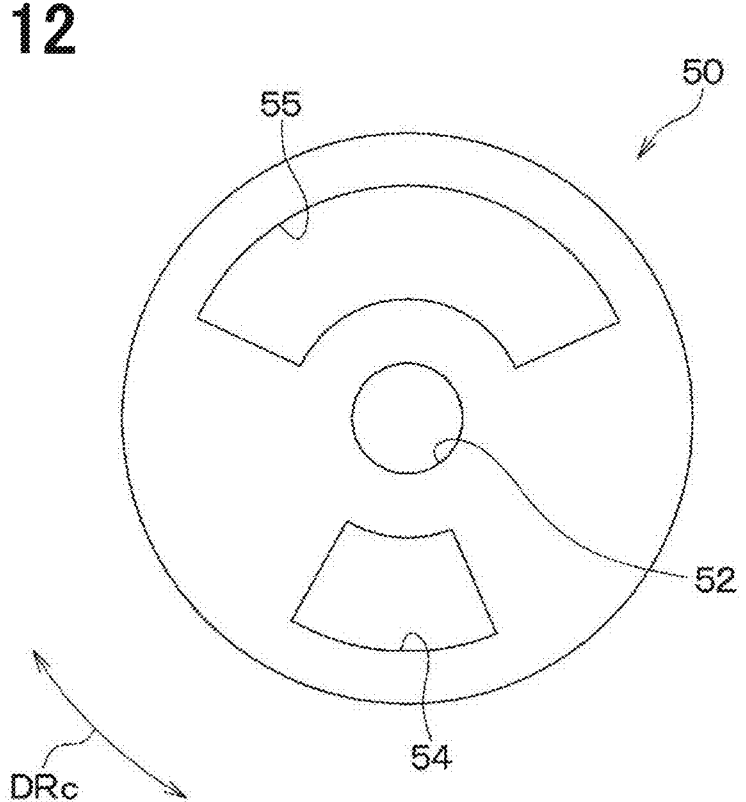
FIG. 12 is a top view of the upper movable disk according to the first embodiment.

As illustrated in FIG. 8, a portion of the upper movable disk 50 is provided inside the upper housing 12, and the upper movable disk 50 is provided to be rotatable about the axis CL of the shaft 61. The upper movable disk 50 is in surface contact with the upper seal surface 41 of the upper stationary disk 40. As illustrated in FIGS. 8 and 11, the upper movable disk 50 of the present embodiment is formed in a disk shape having an outer diameter substantially the same as the outer diameter of the upper stationary disk 40, and the upper movable disk 50 is disposed such that the central axis thereof coincides with the axis CL.

The upper movable disk 50 includes an upper sliding surface 51 that slides on the upper stationary disk 40. The upper movable disk 50 is formed with an upper movable hole 52 through which the shaft 61 is inserted, substantially at the center thereof, and is formed with two upper press-fitting grooves 53 to which the upper lever 75 to be described later is press-fitted. The upper movable disk 50 is formed such that the outer diameter thereof is larger than the outer diameter of the lower movable disk 30. The upper movable hole 52 is formed to have an inner diameter larger than the inner diameter of the lower movable hole 32.

The upper sliding surface 51 is formed to extend in a planar fashion along the radial direction DRr and the circumferential direction DRc. That is, the upper sliding surface 51 is orthogonal to the axial direction DRa, and is parallel to the radial direction DRr. The state in which the upper sliding surface 51 is orthogonal to the axial direction DRa does not mean a state in which the upper sliding surface 51 is orthogonal to the axial direction DRa in a strict sense, and includes a state in which the upper sliding surface 51 slightly deviates from the state orthogonal to the axial direction DRa due to a manufacturing error or the like.

Like the upper stationary disk 40, the upper movable disk 50 is formed of a material having a smaller linear expansion coefficient, more excellent wear resistance, and a smaller friction coefficient as compared with the constituent material of the housing 10. For example, the upper movable disk 50 is formed of a high-hardness material whose hardness is higher than the hardness of the housing 10. Specifically, the upper movable disk 50 is formed by containing at least one of phenol, resin, or ceramic. The upper movable disk 50 of the present embodiment is formed of ceramic, which is a material similar to the material of the upper stationary disk 40.

In the upper movable disk 50, only a portion forming the upper sliding surface 51 on which the upper stationary disk 40 slides may be formed of a material, such as ceramic, having a smaller linear expansion coefficient and more excellent wear resistance as compared with the constituent material of the housing 10. The upper movable disk 50 may be formed by combining a plurality of constituent pieces.

The upper movable disk 50 is formed such that the outer diameter thereof is smaller than the inner diameter of the rib portion 1222, and is provided to be rotatable about the axis CL of the shaft 61. The upper movable disk 50 has one upper flow passage through-hole 54 extending through the upper movable disk 50 in the axial direction DRa, and one upper flow passage communication hole 55 not extending through the upper movable disk 50.

The upper flow passage through-hole 54 and the upper flow passage communication hole 55 each are formed such that a cross section in a direction orthogonal to the axial direction DRa thereof has a substantially sector shape. The upper flow passage through-hole 54 is formed such that the cross section in the direction orthogonal to the axial direction DRa thereof is smaller than the cross section in the direction orthogonal to the axial direction DRa of the upper flow passage communication hole 55. Specifically, for example, the upper flow passage through-hole 54 is formed such that the cross section in the direction orthogonal to the axial direction DRa thereof has a size that is ½ or less of the size of the cross section in the direction orthogonal to the axial direction DRa of the upper flow passage communication hole 55.

The upper flow passage through-hole 54 is formed through the upper movable disk 50, and is formed such that the fluid can pass therethrough. In the upper flow passage through-hole 54, the upper direction DRa2 side communicates with any of the third inlet flow hole 453, the fourth outlet flow hole 464, the fifth outlet flow hole 465, and the sixth outlet flow hole 466 of the upper stationary disk 40. In the upper flow passage through-hole 54, the lower direction DRa1 side communicates with the central flow passage Fc.

The upper flow passage through-hole 54 is formed to have a flow passage cross-sectional area slightly larger than the flow passage cross-sectional area of the fourth outlet flow hole 464, and has a size superimposable across the entire fourth outlet flow hole 464. On the other hand, the upper flow passage through-hole 54 is formed such that the flow passage cross-sectional area thereof is smaller than each of the respective flow passage cross-sectional areas of the third inlet flow hole 453, the fifth outlet flow hole 465, and the sixth outlet flow hole 466. The upper flow passage through-hole 54 has a size non-superimposable across each of respective entireties of the third inlet flow hole 453, the fifth outlet flow hole 465, and the sixth outlet flow hole 466.

The upper flow passage through-hole 54 is formed to be able to communicate with any one or two of the third inlet flow hole 453, the fourth outlet flow hole 464, the fifth outlet flow hole 465, and the sixth outlet flow hole 466 in accordance with the rotational position of the upper movable disk 50. Specifically, in a case where the upper flow passage through-hole 54 overlaps only any one of the third inlet flow hole 453, the fourth outlet flow hole 464, the fifth outlet flow hole 465, and the sixth outlet flow hole 466 in the axial direction DRa, the upper flow passage through-hole 54 communicates with only this overlapped flow hole. In a case where the upper flow passage through-hole 54 spans and overlaps two of the third inlet flow hole 453, the fourth outlet flow hole 464, the fifth outlet flow hole 465, and the sixth outlet flow hole 466 in the axial direction DRa, the upper flow passage through-hole 54 communicates with these two spanned flow holes.

In other words, the upper movable disk 50 has the upper flow passage through-hole 54 that communicates with at least one of the third inlet flow passage Fi3, the fourth outlet flow passage Fo4, the fifth outlet flow passage Fo5, or the sixth outlet flow passage Fo6 through the rotation of the upper movable disk 50 caused along with the rotation of the shaft 61.

The upper flow passage communication hole 55 is formed by recessing a portion of the upper sliding surface 51, which is on a side where sliding with respect to the upper stationary disk 40 is performed. That is, the upper flow passage communication hole 55 is formed without extending through the upper movable disk 50. The upper flow passage communication hole 55 is formed to have a flow passage cross-sectional area larger than each of the respective flow passage cross-sectional areas of the third inlet flow hole 453, the fourth outlet flow hole 464, the fifth outlet flow hole 465, and the sixth outlet flow hole 466. The upper flow passage communication hole 55 has a size superimposable across each of respective entireties of the third inlet flow hole 453, the fourth outlet flow hole 464, the fifth outlet flow hole 465, and the sixth outlet flow hole 466.

In the present embodiment, the upper flow passage communication hole 55 has a size concurrently superimposable on at least respective parts of any two or three of the third inlet flow hole 453, the fourth outlet flow hole 464, the fifth outlet flow hole 465, or the sixth outlet flow hole 466.

The upper flow passage communication hole 55 is formed to be able to allow any two or three of the third inlet flow hole 453, the fourth outlet flow hole 464, the fifth outlet flow hole 465, and the sixth outlet flow hole 466 to communicate with each other. Specifically, in a case where the upper flow passage communication hole 55 spans and overlaps any two of the third inlet flow hole 453, the fourth outlet flow hole 464, the fifth outlet flow hole 465, and the sixth outlet flow hole 466 in the axial direction DRa, the upper flow passage communication hole 55 allows these two spanned flow holes to communicate with each other. In a case where the upper flow passage communication hole 55 spans and overlaps any three of the third inlet flow hole 453, the fourth outlet flow hole 464, the fifth outlet flow hole 465, and the sixth outlet flow hole 466 in the axial direction DRa, the upper flow passage communication hole 55 allows these three overlapped flow holes to communicate with each other. Thus, among the third inlet flow hole 453, the fourth outlet flow hole 464, the fifth outlet flow hole 465, and the sixth outlet flow hole 466, the flow holes communicating with the upper flow passage communication hole 55 communicate with each other.

In other words, the upper movable disk 50 has the upper flow passage communication hole 55 that allows a plurality of ones of the third inlet flow passage Fi3, the fourth outlet flow passage Fo4, the fifth outlet flow passage Fo5, and the sixth outlet flow passage Fo6 to communicate with each other through the rotation of the upper movable disk 50 caused along with the rotation of the shaft 61.

Therefore, when the upper movable disk 50 is caused to rotate and then is caused to stop at a predetermined position, the upper flow passage through-hole 54 communicates with any one or two of the third inlet flow hole 453, the fourth outlet flow hole 464, the fifth outlet flow hole 465, and the sixth outlet flow hole 466. The upper flow passage through-hole 54 communicates with the flow passage(s) corresponding to the flow hole(s) with which the upper flow passage through-hole 54 communicates, among the third inlet flow passage Fi3, the fourth outlet flow passage Fo4, the fifth outlet flow passage Fo5, and the sixth outlet flow passage Fo6. As a result, the upper flow passage through-hole 54 allows communication between the central flow passage Fc and the flow passage(s) with which the upper flow passage through-hole 54 communicates, among the third inlet flow passage Fi3, the fourth outlet flow passage Fo4, the fifth outlet flow passage Fo5, and the sixth outlet flow passage Fo6.

When the upper movable disk 50 is caused to rotate and then is caused to stop at a predetermined position, the upper flow passage communication hole 55 communicates with any two or three of the third inlet flow hole 453, the fourth outlet flow hole 464, the fifth outlet flow hole 465, and the sixth outlet flow hole 466. The upper flow passage communication hole 55 communicates with the respective flow passages communicating with the two or three flow holes with which the upper flow passage communication hole 55 communicates, among the third inlet flow passage Fi3, the fourth outlet flow passage Fo4, the fifth outlet flow passage Fo5, and the sixth outlet flow passage Fo6. As a result, the upper flow passage communication hole 55 allows the two or three flow passages with which the upper flow passage communication hole 55 communicates, among the third inlet flow passage Fi3, the fourth outlet flow passage Fo4, the fifth outlet flow passage Fo5, and the sixth outlet flow passage Fo6, to communicate with each other.

In the present embodiment, a rotational range of the upper movable disk 50 is determined in advance, and the upper flow passage through-hole 54 is configured to be able to communicate with any one or two of the fourth outlet flow hole 464, the fifth outlet flow hole 465, and the sixth outlet flow hole 466. The upper flow passage through-hole 54 is configured to be unable to communicate with the third inlet flow hole 453. That is, the upper flow passage through-hole 54 is configured to be unable to communicate with the third fluid inlet portion 153 via the third inlet flow passage Fi3.

The upper flow passage communication hole 55 communicates with the third inlet flow hole 453, and is configured to be able to communicate with at least one of the fifth outlet flow hole 465 or the sixth outlet flow hole 466. Thus, the upper flow passage communication hole 55 is configured to be able to allow the third inlet flow hole 453 to communicate with the fifth outlet flow hole 465 or the sixth outlet flow hole 466. The upper flow passage communication hole 55 is configured to be unable to communicate with the fourth outlet flow hole 464.

In the present embodiment, the upper stationary disk 40 functions as a second stationary disk, and the upper movable disk 50 functions as a second movable disk.

Returning to FIG. 1, the drive unit 60 is provided on the upper direction DRa2 side of the upper housing 12. The drive unit 60 is a component that outputs a rotational force for rotating the shaft 61. The drive unit 60 includes the shaft 61, a motor (not illustrated) as a drive source that rotates the shaft 61, and a gear unit (not illustrated) that transmits output of the motor to the shaft 61. As the motor, for example, a servo motor, a stepping motor, or a brushless motor can be adopted. As the gear unit, for example, a gear mechanism can be adopted that includes a helical gear or a spur gear. Although not illustrated, the motor rotates according to a control signal from a control unit electrically coupled to the motor.

The control unit is a computer including a memory that is a non-transitory tangible storage medium, a processor, and the like. The control unit executes a computer program stored in the memory and executes various types of control processing according to the computer program. The control unit executes the computer program stored in the memory, and transmits a control signal that changes the rotational position of the shaft 61, to the valve device 1. In the valve device 1, the operation mode is switched on the basis of the control signal transmitted from the control unit. Details of the operation modes will be described later.

The shaft 61 is a rotation shaft that rotates about the axis CL through the rotational force output from the drive unit 60. The shaft 61 extends along the axial direction DRa. The shaft 61 is rotatably supported by the housing 10, on both sides in the axial direction DRa. Specifically, for example, as illustrated in FIGS. 3 and 8, on the lower direction DRa1 side, the shaft 61 is rotatably supported in the lower bearing hole 1122 of the lower housing 11, and on the upper direction DRa2 side, the shaft 61 is rotatably supported in the upper bearing hole 1212 of the upper housing 12. That is, the shaft 61 has a structure in which both ends are supported.

On the lower direction DRa1 side, the shaft 61 is rotatably supported by a bearing (not illustrated) provided in the lower bearing hole 1122, and on the upper direction DRa2 side, the shaft 61 is rotatably supported by a bearing (not illustrated) provided in the upper bearing hole 1212. As each of these bearings, a slide bearing, a ball bearing, or the like can be adopted.

The shaft 61 is passed through the lower stationary disk 20, the lower movable disk 30, the upper stationary disk 40, and the upper movable disk 50, and is supported to be rotatable with respect to the lower housing 11 and the upper housing 12. An end of the shaft 61 on the upper direction DRa2 side is connected to the gear unit of the drive unit 60. With this configuration, the output of the motor is transmitted to the shaft 61 via the gear unit.

The shaft 61 includes a lower axial portion 611, an upper axial portion 612, and a flange portion 613. The lower axial portion 611, the upper axial portion 612, and the flange portion 613 are integrally formed of, for example, a metal member, and are formed to be integrally rotatable through the rotational force output from the motor of the drive unit 60. The lower axial portion 611 and the upper axial portion 612 are continuous with each other in this order from the lower direction DRa1 side toward the upper direction DRa2 side. The lower axial portion 611 is formed to have an outer diameter smaller than the outer diameter of the upper axial portion 612. The flange portion 613 is formed at an end of the upper axial portion 612 on the lower direction DRa1 side.

The lower axial portion 611 is a rod-shaped member extending along the axial direction DRa, and is inserted through the lower stationary disk 20 and the lower movable disk 30. The lower axial portion 611 is formed such that the outer diameter thereof is smaller than the inner diameter of the lower stationary hole 22 of the lower stationary disk 20 and the inner diameter of the lower movable hole 32 of the lower movable disk 30, and is not directly connected to the lower stationary disk 20 and the lower movable disk 30. That is, the lower axial portion 611 is not directly fixed to the lower stationary disk 20 and the lower movable disk 30. Thus, a configuration is made in which the rotational force of the shaft 61 is not directly transmitted to the lower movable disk 30 through the lower axial portion 611 when the lower axial portion 611 rotates.

In the present embodiment, the lower lever 70 and the lower torsion spring 80 that transmit the rotational force of the shaft 61 to the lower movable disk 30 are provided inside the lower housing 11. The lower movable disk 30 is connected to the lower axial portion 611 via the lower lever 70 and the lower torsion spring 80. The lower torsion spring 80 is disposed around the lower axial portion 611 between the lower lever 70 and the flange portion 613.

The upper axial portion 612 is a rod-shaped member extending along the axial direction DRa, and is inserted through the upper stationary disk 40 and the upper movable disk 50. The upper axial portion 612 is formed such that the outer diameter thereof is smaller than the inner diameter of the upper stationary hole 42 of the upper stationary disk 40 and the inner diameter of the upper movable hole 52 of the upper movable disk 50, and is not directly connected to the upper stationary disk 40 and the upper movable disk 50. That is, the upper axial portion 612 is not directly fixed to the upper stationary disk 40 and the upper movable disk 50. Thus, a configuration is made in which the rotational force of the shaft 61 is not directly transmitted to the upper movable disk 50 through the upper axial portion 612 when the upper axial portion 612 rotates.

In the present embodiment, the upper lever 75 and the upper torsion spring 85 that transmit the rotational force of the shaft 61 to the upper movable disk 50 are provided inside the lower housing 11. The upper movable disk 50 is connected to the upper axial portion 612 via the upper lever 75 and the upper torsion spring 85. The upper torsion spring 85 is disposed around the upper axial portion 612 between the upper lever 75 and the flange portion 613. The compression spring 90 is disposed around the upper axial portion 612 between the upper lever 75 and the flange portion 613.

The flange portion 613 is a portion supporting the lower torsion spring 80, the upper torsion spring 85, and the compression spring 90. The flange portion 613 is formed in an annular thin-plate shape protruding outward in the radial direction DRr from an end on the lower direction DRa1 side in an outer peripheral surface of the upper axial portion 612 and including plate surfaces in the axial direction DRa. The flange portion 613 includes a lower flange surface 6131 on the lower direction DRa1 side and an upper flange surface 6232 on the upper direction DRa2 side.

The flange portion 613 includes a hook portion (not illustrated) facing the circumferential direction DRc of the lower torsion spring 80, on the lower flange surface 6131, and supports an end on a side of the lower torsion spring 80 in the circumferential direction DRc. The flange portion 613 includes a hook portion (not illustrated) facing the circumferential direction DRc of the upper torsion spring 85, on the upper flange surface 6232, and supports an end on a side of the upper torsion spring 85 in the circumferential direction DRc. The upper flange surface 6232 of the flange portion 613 supports an end on the lower direction DRa1 side of the compression spring 90.

The lower lever 70 is a coupling member coupling the shaft 61 and the lower movable disk 30 via the lower torsion spring 80. The lower lever 70 is formed of, for example, a metal member, and is configured separately from the lower movable disk 30. The lower lever 70 is fixed to the lower movable disk 30, and couples the lower movable disk 30 and the shaft 61 in an integrally rotatable manner in a state where the lower movable disk 30 can be displaced in the axial direction DRa.

The lower lever 70 has a substantially disk shape having a plate thickness direction in the axial direction DRa. The lower lever 70 includes projections (not illustrated) press-fitted into the lower press-fitting grooves 33 of the lower movable disk 30, and an engagement receiving portion (not illustrated) facing the circumferential direction DRc of the lower torsion spring 80. The lower lever 70 is connected to the lower movable disk 30 by press-fitting the projections of the lower lever 70 into the lower press-fitting grooves 33. The lower lever 70 supports an end of the lower torsion spring 80 on the side opposite to the side supported by the flange portion 613, in the circumferential direction DRc.

The upper lever 75 is a coupling member coupling the shaft 61 and the upper movable disk 50 via the upper torsion spring 85. The upper lever 75 is formed of, for example, a metal member, and is configured separately from the upper movable disk 50. The upper lever 75 is fixed to the upper movable disk 50, and couples the upper movable disk 50 and the shaft 61 in an integrally rotatable manner in a state where the upper movable disk 50 can be displaced in the axial direction DRa.

The upper lever 75 has a substantially disk shape having a plate thickness direction in the axial direction DRa. The upper lever 75 includes projections (not illustrated) press-fitted into the upper press-fitting grooves 53 of the upper movable disk 50, and an engagement receiving portion (not illustrated) facing the circumferential direction DRc of the upper torsion spring 85. The upper lever 75 is connected to the upper movable disk 50 by press-fitting the projections of the upper lever 75 into the upper press-fitting grooves 53. The upper lever 75 supports an end of the upper torsion spring 85 on the side opposite to the side supported by the flange portion 613, in the circumferential direction DRc. The upper lever 75 supports an end on the upper direction DRa2 side of the compression spring 90 through a plate surface on the lower direction DRa1 side of the upper lever 75.

The lower torsion spring 80 is a torsion coil spring that biases the lower movable disk 30 toward one side in the circumferential direction DRc with respect to the housing 10. The lower torsion spring 80 is formed by being coiled around the lower axial portion 611. The coil of the lower torsion spring 80 has an inner diameter larger than the outer diameter of the lower axial portion 611. In the lower torsion spring 80, the end on the lower direction DRa1 side in the axial direction DRa is coupled to the engagement receiving portion of the lower lever 70 in a relatively non-rotatable manner, and the end on the upper direction DRa2 side in the axial direction DRa is coupled to the hook portion of the flange portion 613 in a relatively non-rotatable manner. The lower torsion spring 80 is disposed in a state of being resiliently deformed by being twisted in the circumferential direction DRc.

With this configuration, the lower torsion spring 80 generates a biasing force biasing the lower movable disk 30 toward the one side in the circumferential direction DRc, through its own resilient deformation. When the rotational force generated by the drive unit 60 is transmitted to the shaft 61, the rotational force is transmitted to the lower movable disk 30 via the flange portion 613, the lower torsion spring 80, and the lower lever 70. Then, the lower movable disk 30 is caused to rotate about the axis CL, integrally with the shaft 61, along with the rotation of the shaft 61.

The upper torsion spring 85 is a torsion coil spring that biases the upper movable disk 50 toward one side in the circumferential direction DRc with respect to the housing 10. The upper torsion spring 85 is formed by being coiled around the upper axial portion 612. The coil of the upper torsion spring 85 has an inner diameter larger than the outer diameter of the upper axial portion 612. In the upper torsion spring 85, the end on the upper direction DRa2 side in the axial direction DRa is coupled to the engagement receiving portion of the upper lever 75 in a relatively non-rotatable manner, and the end on the lower direction DRa1 side in the axial direction DRa is coupled to the hook portion of the flange portion 613 in a relatively non-rotatable manner. The upper torsion spring 85 is disposed in a state of being resiliently deformed by being twisted in the circumferential direction DRc.

With this configuration, the upper torsion spring 85 generates a biasing force biasing the upper movable disk 50 toward the one side in the circumferential direction DRc, through its own resilient deformation. When the rotational force generated by the drive unit 60 is transmitted to the shaft 61, the rotational force is transmitted to the upper movable disk 50 via the flange portion 613, the upper torsion spring 85, and the upper lever 75. Then, the upper movable disk 50 is caused to rotate about the axis CL, integrally with the shaft 61, along with the rotation of the shaft 61.

The lower torsion spring 80 functions as a pressing member that generates a pressing force pressing the lower movable disk 30 in the circumferential direction DRc. The lower lever 70 functions as a first transmission part that transmits the pressing force generated by the lower torsion spring 80 to the lower movable disk 30. The upper torsion spring 85 functions as a pressing member that generates a pressing force pressing the upper movable disk 50 in the circumferential direction DRc. The upper lever 75 functions as a second transmission part that transmits the pressing force generated by the upper torsion spring 85 to the upper movable disk 50.

The compression spring 90 is a resilient member biasing the lower movable disk 30 and the upper movable disk 50 in the axial direction DRa. Specifically, the compression spring 90 is a compression coil spring that is resiliently deformable in the axial direction DRa by being compressed in the axial direction DRa. The compression spring 90 is formed by being coiled around the upper axial portion 612. The coil of the compression spring 90 has an inner diameter larger than the outer diameter of the upper axial portion 612, and has an outer diameter smaller than the inner diameter of the upper torsion spring 85. The compression spring 90 is disposed on the inner side of the upper torsion spring 85. The end of the compression spring 90 on the upper direction DRa2 side is supported by the upper lever 75, and the end of the compression spring 90 on the lower direction DRa1 side is supported by the flange portion 613. The compression spring 90 is disposed in a state of being resiliently deformed by being compressed between the upper lever 75 and the flange portion 613.

With this configuration, the compression spring 90 generates a biasing force biasing the upper movable disk 50 in the upper direction DRa2 by biasing the upper lever 75 in the upper direction DRa2 through its own resilient deformation. The compression spring 90 also generates a biasing force biasing the lower movable disk 30 in the lower direction DRa1 by biasing the flange portion 613, the lower torsion spring 80, and the lower lever 70 in the lower direction DRa1 through its own resilient deformation.

Therefore, when the upper movable disk 50 is caused to rotate integrally with the shaft 61, the upper sliding surface 51 slides on the upper seal surface 41 in a state of being pressed against the upper seal surface 41 by the biasing force of the compression spring 90. When the lower movable disk 30 is caused to rotate integrally with the shaft 61, the lower sliding surface 31 slides on the lower seal surface 21 in a state of being pressed against the lower seal surface 21 by the biasing force of the compression spring 90. The compression spring 90 of the present embodiment functions as a biasing member pressing the upper movable disk 50 against the upper stationary disk 40 and pressing the lower movable disk 30 against the lower stationary disk 20.

Next, operation of the valve device 1 of the present embodiment will be described. As indicated by arrows FLin in FIG. 2, the fluid flows into the valve device 1 from each of the first fluid inlet portion 151, the second fluid inlet portion 152, and the third fluid inlet portion 153. The fluid having flowed into the valve device 1 from each of the first fluid inlet portion 151, the second fluid inlet portion 152, and the third fluid inlet portion 153 flows into the flow passage F communicating with each of the inlet portions. Specifically, for example, the fluid having flowed into the valve device 1 from the first fluid inlet portion 151 flows into the central flow passage Fc. The fluid having flowed into the valve device 1 from the second fluid inlet portion 152 flows into the lower flow passage Fb. The fluid having flowed into the valve device 1 from the third fluid inlet portion 153 flows into the upper flow passage Fa.

The fluid having flowed in from the first fluid inlet portion 151, the second fluid inlet portion 152, and the third fluid inlet portion 153 flows out to the outside of the valve device 1 from the first to sixth fluid outlet portions 161 to 166, as indicated by arrows FLout in FIG. 2. Specifically, for example, the fluid having flowed into the central flow passage Fc flows out to the outside of the valve device 1 from a plurality of any of the first to sixth fluid outlet portions 161 to 166 in accordance with the rotational positions of the lower movable disk 30 and the upper movable disk 50. The fluid having flowed into the lower flow passage Fb flows out to the outside of the valve device 1 from any one or two of the first fluid outlet portion 161 and the second fluid outlet portion 162 in accordance with the rotational position of the lower movable disk 30. The fluid having flowed into the upper flow passage Fa flows out to the outside of the valve device 1 from any one or two of the fifth fluid outlet portion 165 and the sixth fluid outlet portion 166 in accordance with the rotational position of the upper movable disk 50.

The valve device 1 of the present embodiment switches the operation mode of the valve device 1 to switch the fluid outlet portion through which the fluid flows out from the valve device 1, thereby switching the fluid passage of the cooling water flowing in the fluid circulation system. The operation mode of the valve device 1 can be switched by the control signal from the control unit. The valve device 1 of the present embodiment can switch the operation mode to any of a first operation mode, a second operation mode, and a third operation mode by causing the lower movable disk 30 and the upper movable disk 50 to rotate integrally with the shaft 61.

Figure 13:
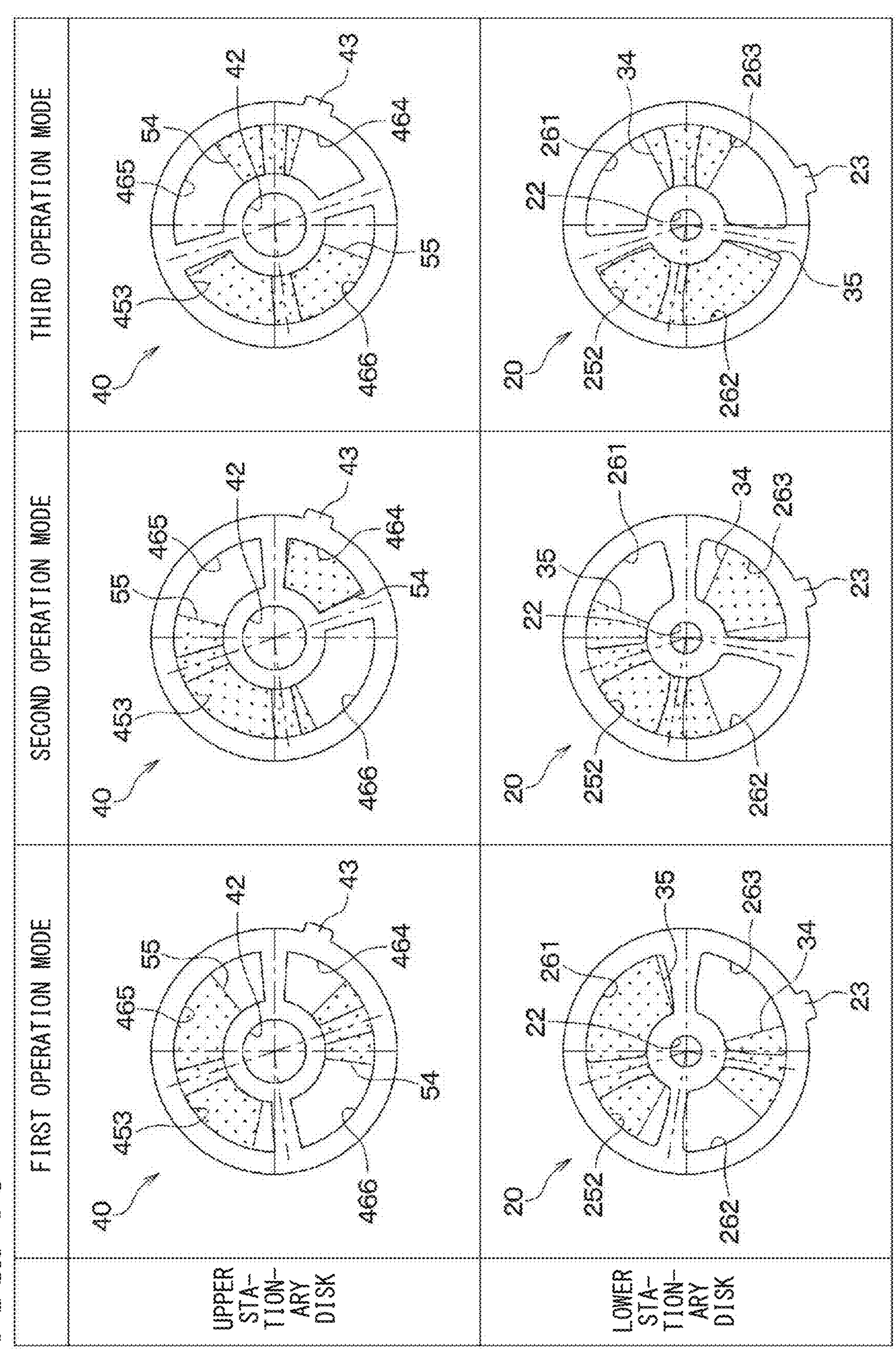
FIG. 13 is a diagram for explaining operation modes of the valve device according to the first embodiment.

The rotational positions of the lower movable disk 30 and the upper movable disk 50 and the flow of the fluid flowing through the flow passage F in each specific operation mode will be described with reference to FIG. 13. FIG. 13 illustrates relative positions of the lower flow passage through-hole 34 and the lower flow passage communication hole 35 formed in the lower movable disk 30 with respect to the lower stationary disk 20 in each operation mode. FIG. 13 also illustrates relative positions of the upper flow passage through-hole 54 and the upper flow passage communication hole 55 formed in the upper movable disk 50 with respect to the upper stationary disk 40 in each operation mode. In FIG. 13, for purposes of clarity of the drawing, respective portions in which the lower flow passage through-hole 34 and the lower flow passage communication hole 35 are superimposed on the lower stationary disk 20 are shaded with dots. Respective portions in which the upper flow passage through-hole 54 and the upper flow passage communication hole 55 are superimposed on the upper stationary disk 40 are shaded with dots.

First, the first operation mode will be described. When the operation mode of the valve device 1 is set to the first operation mode, the lower movable disk 30 and the upper movable disk 50 are positioned at the rotational positions illustrated in the first operation mode of FIG. 13.

Specifically, when the operation mode is set to the first operation mode, the lower movable disk 30 is positioned at a rotational position where the lower flow passage through-hole 34 communicates with the second outlet flow hole 262 and the third outlet flow hole 263. The lower movable disk 30 is positioned at a rotational position where the lower flow passage communication hole 35 communicates with the second inlet flow hole 252 and the first outlet flow hole 261.

Accordingly, the lower flow passage through-hole 34 communicates with the second outlet flow passage Fo2 and the third outlet flow passage Fo3. Then, the second outlet flow passage Fo2 and the third outlet flow passage Fo3 communicate with the first fluid inlet portion 151 via the central flow passage Fc. The lower flow passage communication hole 35 allows the second inlet flow passage Fi2 and the first outlet flow passage Fo1 to communicate with each other. Then, the first outlet flow passage Fo1 communicates with the second fluid inlet portion 152 via the second inlet flow passage Fi2.

Therefore, when the operation mode of the valve device 1 is set to the first operation mode, the fluid having flowed into the valve device 1 from the first fluid inlet portion 151 passes through the central flow passage Fc and the lower flow passage through-hole 34, and flows to the second outlet flow passage Fo2 and the third outlet flow passage Fo3 in the lower flow passage Fb. The fluid having flowed into the second outlet flow passage Fo2 flows out to the outside of the valve device 1 from the second fluid outlet portion 162. The fluid having flowed into the third outlet flow passage Fo3 flows out to the outside of the valve device 1 from the third fluid outlet portion 163.

The fluid having flowed into the valve device 1 from the second fluid inlet portion 152 passes through the second inlet flow passage Fi2 and the lower flow passage communication hole 35, and flows to the first outlet flow passage Fo1 in the lower flow passage Fb. The fluid having flowed into the first outlet flow passage Fo1 flows out to the outside of the valve device 1 from the first fluid outlet portion 161.

When the operation mode is set to the first operation mode, the upper movable disk 50 is positioned at a rotational position where the upper flow passage through-hole 54 communicates with the fourth outlet flow hole 464 and the sixth outlet flow hole 466. The upper movable disk 50 is positioned at a rotational position where the upper flow passage communication hole 55 communicates with the third inlet flow hole 453 and the fifth outlet flow hole 465.

Accordingly, the upper flow passage through-hole 54 communicates with the fourth outlet flow passage Fo4 and the sixth outlet flow passage Fo6. Then, the fourth outlet flow passage Fo4 and the sixth outlet flow passage Fo6 communicate with the first fluid inlet portion 151 via the central flow passage Fc. The upper flow passage communication hole 55 allows the third inlet flow passage Fi3 and the fifth outlet flow passage Fo5 to communicate with each other. Then, the fifth outlet flow passage Fo5 communicates with the third fluid inlet portion 153 via the third inlet flow passage Fi3.

Therefore, when the operation mode of the valve device 1 is set to the first operation mode, the fluid having flowed into the valve device 1 from the first fluid inlet portion 151 passes through the central flow passage Fc and the upper flow passage through-hole 54, and flows to the fourth outlet flow passage Fo4 and the sixth outlet flow passage Fo6 in the upper flow passage Fa. The fluid having flowed into the fourth outlet flow passage Fo4 flows out to the outside of the valve device 1 from the fourth fluid outlet portion 164. The fluid having flowed into the sixth outlet flow passage Fo6 flows out to the outside of the valve device 1 from the sixth fluid outlet portion 166.

The fluid having flowed into the valve device 1 from the third fluid inlet portion 153 passes through the third inlet flow passage Fi3 and the upper flow passage communication hole 55, and flows to the fifth outlet flow passage Fo5 in the upper flow passage Fa. The fluid having flowed into the fifth outlet flow passage Fo5 flows out to the outside of the valve device 1 from the fifth fluid outlet portion 165.

As described above, when the operation mode of the valve device 1 is set to the first operation mode, the fluid flows into the valve device 1 from each of the first fluid inlet portion 151, the second fluid inlet portion 152, and the third fluid inlet portion 153. The fluid having flowed into the valve device 1 from the first fluid inlet portion 151 flows out to the outside of the valve device 1 from each of the second fluid outlet portion 162, the third fluid outlet portion 163, the fourth fluid outlet portion 164, and the sixth fluid outlet portion 166. The fluid having flowed into the valve device 1 from the second fluid inlet portion 152 flows out to the outside of the valve device 1 from the first fluid outlet portion 161. The fluid having flowed into the valve device 1 from the third fluid inlet portion 153 flows out to the outside of the valve device 1 from the fifth fluid outlet portion 165.

Next, the second operation mode will be described. When the operation mode of the valve device 1 is set to the second operation mode, the lower movable disk 30 and the upper movable disk 50 are positioned at the rotational positions illustrated in the second operation mode of FIG. 13.

Specifically, when the operation mode is set to the second operation mode, the lower movable disk 30 is positioned at a rotational position where the lower flow passage through-hole 34 communicates with only the third outlet flow hole 263. The lower movable disk 30 is positioned at a rotational position where the lower flow passage communication hole 35 communicates with the second inlet flow hole 252, the first outlet flow hole 261, and the second outlet flow hole 262.

Accordingly, the lower flow passage through-hole 34 communicates with only the third outlet flow passage Fo3. Then, the third outlet flow passage Fo3 communicates with the first fluid inlet portion 151 via the central flow passage Fc. The lower flow passage communication hole 35 allows the second inlet flow passage Fi2 to communicate with the first outlet flow passage Fo1 and the second outlet flow passage Fo2. Then, the first outlet flow passage Fo1 and the second outlet flow passage Fo2 communicate with the second fluid inlet portion 152 via the second outlet flow passage Fo2.

Therefore, when the operation mode of the valve device 1 is set to the second operation mode, the fluid having flowed into the valve device 1 from the first fluid inlet portion 151 passes through the central flow passage Fc and the lower flow passage through-hole 34, and flows to the third outlet flow passage Fo3 in the lower flow passage Fb. The fluid having flowed into the third outlet flow passage Fo3 flows out to the outside of the valve device 1 from the third fluid outlet portion 163.

The fluid having flowed into the valve device 1 from the second fluid inlet portion 152 passes through the second inlet flow passage Fi2 and the lower flow passage communication hole 35, and flows to the first outlet flow passage Fo1 and the second outlet flow passage Fo2 in the lower flow passage Fb. The fluid having flowed into the first outlet flow passage Fo1 flows out to the outside of the valve device 1 from the first fluid outlet portion 161. The fluid having flowed into the second outlet flow passage Fo2 flows out to the outside of the valve device 1 from the second fluid outlet portion 162.

When the operation mode is set to the second operation mode, the upper movable disk 50 is positioned at a rotational position where the upper flow passage through-hole 54 communicates with only the fourth outlet flow hole 464. The upper movable disk 50 is positioned at a rotational position where the upper flow passage communication hole 55 communicates with the third inlet flow hole 453, the fifth outlet flow hole 465, and the sixth outlet flow hole 466.

Accordingly, the upper flow passage through-hole 54 communicates with only the fourth outlet flow passage Fo4. Then, the fourth outlet flow passage Fo4 communicates with the first fluid inlet portion 151 via the central flow passage Fc. The upper flow passage communication hole 55 allows the third inlet flow passage Fi3, the fifth outlet flow passage Fo5, and the sixth outlet flow passage Fo6 to communicate with each other. Then, the fifth outlet flow passage Fo5 and the sixth outlet flow passage Fo6 communicate with the third fluid inlet portion 153 via the third inlet flow passage Fi3.

Therefore, when the operation mode of the valve device 1 is set to the second operation mode, the fluid having flowed into the valve device 1 from the first fluid inlet portion 151 passes through the central flow passage Fc and the upper flow passage through-hole 54, and flows to the fourth outlet flow passage Fo4 in the upper flow passage Fa. The fluid having flowed into the fourth outlet flow passage Fo4 flows out to the outside of the valve device 1 from the fourth fluid outlet portion 164.

The fluid having flowed into the valve device 1 from the third fluid inlet portion 153 passes through the third inlet flow passage Fi3 and the upper flow passage communication hole 55, and flows to the fifth outlet flow passage Fo5 and the sixth outlet flow passage Fo6 in the upper flow passage Fa. The fluid having flowed into the fifth outlet flow passage Fo5 flows out to the outside of the valve device 1 from the fifth fluid outlet portion 165. The fluid having flowed into the sixth outlet flow passage Fo6 flows out to the outside of the valve device 1 from the sixth fluid outlet portion 166.

As described above, when the operation mode of the valve device 1 is set to the second operation mode, the fluid flows into the valve device 1 from each of the first fluid inlet portion 151, the second fluid inlet portion 152, and the third fluid inlet portion 153. The fluid having flowed into the valve device 1 from the first fluid inlet portion 151 flows out to the outside of the valve device 1 from each of the third fluid outlet portion 163 and the fourth fluid outlet portion 164. The fluid having flowed into the valve device 1 from the second fluid inlet portion 152 flows out to the outside of the valve device 1 from each of the first fluid outlet portion 161 and the second fluid outlet portion 162. The fluid having flowed into the valve device 1 from the third fluid inlet portion 153 flows out to the outside of the valve device 1 from each of the fifth fluid outlet portion 165 and the sixth fluid outlet portion 166.

Next, the third operation mode will be described. When the operation mode of the valve device 1 is set to the third operation mode, the lower movable disk 30 and the upper movable disk 50 are positioned at the rotational positions illustrated in the third operation mode of FIG. 13.

Specifically, when the operation mode is set to the third operation mode, the lower movable disk 30 is positioned at a rotational position where the lower flow passage through-hole 34 communicates with the first outlet flow hole 261 and the third outlet flow hole 263. The lower movable disk 30 is positioned at a rotational position where the lower flow passage communication hole 35 communicates with the second inlet flow hole 252 and the second outlet flow hole 262.

Accordingly, the lower flow passage through-hole 34 communicates with the first outlet flow passage Fo1 and the third outlet flow passage Fo3. Then, the first outlet flow passage Fo1 and the third outlet flow passage Fo3 communicate with the first fluid inlet portion 151 via the central flow passage Fc. The lower flow passage communication hole 35 allows the second inlet flow passage Fi2 and the second outlet flow passage Fo2 to communicate with each other. Then, the second outlet flow passage Fo2 communicates with the second fluid inlet portion 152 via the second inlet flow passage Fi2.

Therefore, when the operation mode of the valve device 1 is set to the third operation mode, the fluid having flowed into the valve device 1 from the first fluid inlet portion 151 passes through the central flow passage Fc and the lower flow passage through-hole 34, and flows to the first outlet flow passage Fo1 and the third outlet flow passage Fo3 in the lower flow passage Fb. The fluid having flowed into the first outlet flow passage Fo1 flows out to the outside of the valve device 1 from the first fluid outlet portion 161. The fluid having flowed into the third outlet flow passage Fo3 flows out to the outside of the valve device 1 from the third fluid outlet portion 163.

The fluid having flowed into the valve device 1 from the second fluid inlet portion 152 passes through the second inlet flow passage Fi2 and the lower flow passage communication hole 35, and flows to the second outlet flow passage Fo2 in the lower flow passage Fb. The fluid having flowed into the second outlet flow passage Fo2 flows out to the outside of the valve device 1 from the second fluid outlet portion 162.

When the operation mode is set to the third operation mode, the upper movable disk 50 is positioned at a rotational position where the upper flow passage through-hole 54 communicates with the fourth outlet flow hole 464 and the fifth outlet flow hole 465. The upper movable disk 50 is positioned at a rotational position where the upper flow passage communication hole 55 communicates with the third inlet flow hole 453 and the sixth outlet flow hole 466.

Accordingly, the upper flow passage through-hole 54 communicates with the fourth outlet flow passage Fo4 and the fifth outlet flow passage Fo5. Then, the fourth outlet flow passage Fo4 and the fifth outlet flow passage Fo5 communicate with the first fluid inlet portion 151 via the central flow passage Fc. The upper flow passage communication hole 55 allows the third inlet flow passage Fi3 and the sixth outlet flow passage Fo6 to communicate with each other. Then, the sixth outlet flow passage Fo6 communicates with the third fluid inlet portion 153 via the third inlet flow passage Fi3.

Therefore, when the operation mode of the valve device 1 is set to the third operation mode, the fluid having flowed into the valve device 1 from the first fluid inlet portion 151 passes through the central flow passage Fc and the upper flow passage through-hole 54, and flows to the fourth outlet flow passage Fo4 and the fifth outlet flow passage Fo5 in the upper flow passage Fa. The fluid having flowed into the fourth outlet flow passage Fo4 flows out to the outside of the valve device 1 from the fourth fluid outlet portion 164. The fluid having flowed into the fifth outlet flow passage Fo5 flows out to the outside of the valve device 1 from the fifth fluid outlet portion 165.

The fluid having flowed into the valve device 1 from the third fluid inlet portion 153 passes through the third inlet flow passage Fi3 and the upper flow passage communication hole 55, and flows to the sixth outlet flow passage Fo6 in the upper flow passage Fa. The fluid having flowed into the sixth outlet flow passage Fo6 flows out to the outside of the valve device 1 from the sixth fluid outlet portion 166.

As described above, when the operation mode of the valve device 1 is set to the third operation mode, the fluid flows into the valve device 1 from each of the first fluid inlet portion 151, the second fluid inlet portion 152, and the third fluid inlet portion 153. The fluid having flowed into the valve device 1 from the first fluid inlet portion 151 flows out to the outside of the valve device 1 from each of the first fluid outlet portion 161, the third fluid outlet portion 163, the fourth fluid outlet portion 164, and the fifth fluid outlet portion 165. The fluid having flowed into the valve device 1 from the second fluid inlet portion 152 flows out to the outside of the valve device 1 from the second fluid outlet portion 162. The fluid having flowed into the valve device 1 from the third fluid inlet portion 153 flows out to the outside of the valve device 1 from the sixth fluid outlet portion 166.

As described above, the valve device 1 of the present embodiment switches the operation modes to switch the respective outlet portions, among the first to sixth fluid outlet portions 161 to 166, communicating with the first fluid inlet portion 151, the second fluid inlet portion 152, and the third fluid inlet portion 153. Thus, the valve device 1 can switch the fluid passage of the cooling water flowing in the fluid circulation system to the fluid passage in accordance with each operation mode.

As described above, the valve device 1 of the present embodiment includes the shaft 61, and the housing 10 defining the flow passage F and having the first to third fluid inlet portions 151 to 153 and the first to sixth fluid outlet portions 161 to 166 through which the fluid flows. The valve device 1 includes the lower movable disk 30 and the upper movable disk 50 that are provided to be aligned with each other in the axial direction DRa while being spaced apart from each other inside the flow passage F to divide the flow passage F in the axial direction DRa, and that are caused to rotate along with the rotation of the shaft 61.

The second fluid inlet portion 152, the first fluid outlet portion 161, the second fluid outlet portion 162, and the third fluid outlet portion 163 are provided on the lower direction DRa1 side with respect to the lower movable disk 30. The third fluid inlet portion 153, the fourth fluid outlet portion 164, the fifth fluid outlet portion 165, and the sixth fluid outlet portion 166 are provided on the upper direction DRa2 side with respect to the upper movable disk 50.

The housing 10 includes the lower partition walls 1124 that partition the lower flow passage Fb into the second inlet flow passage Fi2, the first outlet flow passage Fo1, the second outlet flow passage Fo2, and the third outlet flow passage Fo3. The housing 10 includes the upper partition walls 1214 that partition the upper flow passage Fa into the third inlet flow passage Fi3, the fourth outlet flow passage Fo4, the fifth outlet flow passage Fo5, and the sixth outlet flow passage Fo6.

The lower movable disk 30 has the lower flow passage through-hole 34 formed through the lower movable disk 30. The lower movable disk 30 switches the flow passage communicating with the lower flow passage through-hole 34, among the second fluid inlet portion 152, the first fluid outlet portion 161, the second fluid outlet portion 162, and the third fluid outlet portion 163, by being caused to rotate along with the rotation of the shaft 61.

The upper movable disk 50 has the upper flow passage through-hole 54 formed through the upper movable disk 50. The upper movable disk 50 switches the flow passage communicating with the upper flow passage through-hole 54, among the third fluid inlet portion 153, the fourth fluid outlet portion 164, the fifth fluid outlet portion 165, and the sixth fluid outlet portion 166, by being caused to rotate along with the rotation of the shaft 61.

According to this configuration, the fluid outlet portion through which the fluid flows out can be switched to any of the first fluid outlet portion 161, the second fluid outlet portion 162, and the third fluid outlet portion 163, by rotating the lower movable disk 30. The fluid outlet portion through which the fluid flows out can be switched to any of the fourth fluid outlet portion 164, the fifth fluid outlet portion 165, and the sixth fluid outlet portion 166, by rotating the upper movable disk 50.

According to such a configuration, even in a configuration including the two disks of the lower movable disk 30 and the upper movable disk 50, the number of fluid outlet portions through which the fluid flows out can be increased without increasing the size of the housing 10. The operation mode of the valve device 1 can be increased.

In the present embodiment, the flow passage F inside the housing 10 is divided into the lower flow passage Fb, the central flow passage Fc, and the upper flow passage Fa by the lower movable disk 30 and the upper movable disk 50. The valve device 1 has the first fluid inlet portion 151 communicating with the central flow passage Fc, and the second fluid inlet portion 152, the first fluid outlet portion 161, the second fluid outlet portion 162, and the third fluid outlet portion 163 communicating with the lower flow passage Fb. The valve device 1 further has the third fluid inlet portion 153, the fourth fluid outlet portion 164, the fifth fluid outlet portion 165, and the sixth fluid outlet portion 166 communicating with the upper flow passage Fa. The valve device 1 switches the respective fluid outlet portions, among these six fluid outlet portions, communicating with these three fluid inlet portions, by rotating the lower movable disk 30 and the upper movable disk 50.

On the other hand, the valve device 1 can have a configuration in which one of the lower movable disk 30 and the upper movable disk 50 is removed and the number of movable disks is set to one, and in which one of the lower flow passage Fb and the upper flow passage Fa is removed. For example, the valve device 1 is assumed to have a configuration in which the upper movable disk 50 and the upper flow passage Fa are removed. The valve device 1 is assumed to have the second fluid inlet portion 152, the third fluid inlet portion 153, and the first to sixth fluid outlet portions 161 to 166 communicating with the lower flow passage Fb.

In this case, the lower flow passage Fb is partitioned into eight spaces by the lower partition walls 1124. The valve device 1 is configured to switch the respective fluid outlet portions, among the first to sixth fluid outlet portions 161 to 166, communicating with the first fluid inlet portion 151, the second fluid inlet portion 152, and the third fluid inlet portion 153, by rotating the lower movable disk 30.

However, in the case where the lower flow passage Fb is partitioned into the eight spaces by the lower partition walls 1124, the flow passage cross-sectional area in each space is smaller than the flow passage cross-sectional area of the present embodiment. As a result, resistance received by the fluid when the fluid is caused to flow into the eight spaces partitioned by the lower partition walls 1124 increases, and the increase in the resistance hinders the flow of the fluid. Further, there is a possibility that the size of the housing 10 in the circumferential direction DRc is not sufficiently secured, in order to provide the second fluid inlet portion 152, the third fluid inlet portion 153, and the first to sixth fluid outlet portions 161 to 166 on the outer periphery of the housing 10.

When the size of the housing 10 in the radial direction DRr is increased, the resistance received by the fluid when the fluid is caused to flow into the eight spaces can be reduced, and a space in which the fluid inlet portions and the fluid outlet portions are provided can be secured on the outer periphery of the housing 10. However, the increase in the size of the housing 10 in the radial direction DRr is not preferable because this increase means an increase in size of the housing of the valve device 1.

Further, there is a limit in the number of flow passages for the fluid flow inside the housing 10 switched by the single lower movable disk 30, and thus difficulty occurs in free switching of the three operation modes, unlike the present embodiment in which the free switching is allowed.

In contrast, the valve device 1 of the present embodiment switches the respective fluid outlet portions, among the first to sixth fluid outlet portions 161 to 166, communicating with the first to third fluid inlet portions 151 to 153, by rotating the lower movable disk 30 and the upper movable disk 50. Thus, the increase in the resistance received by the fluid when the fluid flows through the flow passage F inside the housing 10 can be avoided without increasing the size of the housing 10 in the radial direction DRr, and a space in which the fluid inlet portions and the fluid outlet portions are provided can be secured on the outer periphery of the housing 10. Further, the operation mode of the valve device 1 can be easily increased.

According to the above embodiment, the following effects can be obtained.

(1) In the above embodiment, the valve device 1 includes the lower stationary disk 20 and the upper stationary disk 40 provided not to be rotatable along with the rotation of the shaft 61. The valve device 1 also includes the compression spring 90 pressing the lower movable disk 30 against the lower stationary disk 20 and pressing the upper movable disk 50 against the upper stationary disk 40. The lower stationary disk 20 is provided between the lower installation surface 1121 of the lower housing 11 and the lower movable disk 30. The lower stationary disk 20 is formed with the second inlet flow hole 252, the first outlet flow hole 261, the second outlet flow hole 262, and the third outlet flow hole 263 respectively communicating with the second inlet flow passage Fi2, the first outlet flow passage Fo1, the second outlet flow passage Fo2, and the third outlet flow passage Fo3. The upper stationary disk 40 is provided between the upper installation surface 1211 of the upper housing 12 and the upper movable disk 50. The upper stationary disk 40 is formed with the third inlet flow hole 453, the fourth outlet flow hole 464, the fifth outlet flow hole 465, and the sixth outlet flow hole 466 respectively communicating with the third inlet flow passage Fi3, the fourth outlet flow passage Fo4, the fifth outlet flow passage Fo5, and the sixth outlet flow passage Fo6. Each of the lower stationary disk 20 and the upper stationary disk 40 is formed of a material having a friction coefficient smaller than the friction coefficient of the material of the housing 10.

According to this configuration, a gap between the lower installation surface 1121 and the lower movable disk 30 can be sealed with the lower stationary disk 20 by pressing the lower movable disk 30 against the lower stationary disk 20 provided between the lower installation surface 1121 and the lower movable disk 30. Therefore, even in a case where difficulty occurs in ensuring the surface accuracy of the lower installation surface 1121, sealing performance between the lower movable disk 30 and the housing 10 can be ensured.

A gap between the upper installation surface 1211 and the upper movable disk 50 can be sealed with the upper stationary disk 40 by pressing the upper movable disk 50 against the upper stationary disk 40 provided between the upper installation surface 1211 and the upper movable disk 50. Therefore, even in a case where difficulty occurs in ensuring the surface accuracy of the upper installation surface 1211, sealing performance between the upper movable disk 50 and the housing 10 can be ensured.

Incidentally, when the lower movable disk 30 is caused to rotate integrally with the shaft 61, the lower seal surface 21 of the lower stationary disk 20 and the lower sliding surface 31 of the lower movable disk 30 slide on each other by the lower movable disk 30 being pressed against the lower stationary disk 20. Thus, in order to ensure slidability required when the lower seal surface 21 and the lower sliding surface 31 slide on each other, the friction coefficient of the lower seal surface 21 is desirably small.

When the upper movable disk 50 is caused to rotate integrally with the shaft 61, the upper seal surface 41 of the upper stationary disk 40 and the upper sliding surface 51 of the upper movable disk 50 slide on each other by the upper movable disk 50 being pressed against the upper stationary disk 40. Thus, in order to ensure slidability required when the upper seal surface 41 and the upper sliding surface 51 slide on each other, the friction coefficient of the upper seal surface 41 is desirably small.

To cope with these, each of the lower stationary disk 20 and the upper stationary disk 40 of the embodiment is formed of a material having a friction coefficient smaller than the friction coefficient of the material of the housing 10. Thus, the slidability required when the lower seal surface 21 and the lower sliding surface 31 slide on each other can be ensured, and the slidability required when the upper seal surface 41 and the upper sliding surface 51 slide on each other can be ensured.

(2) In the above embodiment, the valve device 1 includes the lower gasket 114 that is provided between the lower installation surface 1121 and the lower stationary disk 20, and that seals the gap between the lower installation surface 1121 and the lower stationary disk 20. The valve device 1 also includes the upper gasket 123 that is provided between the upper installation surface 1211 and the upper stationary disk 40, and that seals the gap between the upper installation surface 1211 and the upper stationary disk 40.

According to this configuration, leakage of the fluid from the gap between the lower installation surface 1121 and the lower stationary disk 20 can be reduced, and leakage of the fluid from the gap between the upper installation surface 1211 and the upper stationary disk 40 can be reduced.

(3) In the above embodiment, each of the lower stationary disk 20 and the upper stationary disk 40 is formed of ceramic having a small linear expansion coefficient, excellent wear resistance, and a small friction coefficient. According to this configuration, wear resistance is easily ensured while the linear expansion coefficient is reduced, as compared with a case in which the lower stationary disk 20 and the upper stationary disk 40 are formed of other members.

(4) In the above embodiment, each of the lower movable disk 30 and the upper movable disk 50 is formed of ceramic having a small linear expansion coefficient, excellent wear resistance, and a small friction coefficient. According to this configuration, wear resistance is easily ensured while the linear expansion coefficient is reduced, as compared with a case in which the lower movable disk 30 and the upper movable disk 50 are formed of other members.

(5) In the above embodiment, the lower movable disk 30 has the lower flow passage communication hole 35 that allows the second inlet flow passage Fi2 to communicate with the first outlet flow passage Fo1 and the second outlet flow passage Fo2. The upper movable disk 50 has the upper flow passage communication hole 55 that allows the third inlet flow passage Fi3 to communicate with the fifth outlet flow passage Fo5 and the sixth outlet flow passage Fo6.

According to this configuration, the lower movable disk 30 can guide the fluid having flowed in from the second inlet flow passage Fi2 formed as the lower flow passage Fb, to the first outlet flow passage Fo1 and the third outlet flow passage Fo3 formed as the same lower flow passage Fb as the second inlet flow passage Fi2, instead of the central flow passage Fc. Thus, the operation mode of the valve device 1 can be increased as compared with a configuration in which the lower movable disk 30 does not have the lower flow passage communication hole 35.

The upper movable disk 50 can guide the fluid having flowed in from the third inlet flow passage Fi3 formed as the upper flow passage Fa, to the fifth outlet flow passage Fo5 and the sixth outlet flow passage Fo6 formed as the same upper flow passage Fa as the third inlet flow passage Fi3, instead of the central flow passage Fc. Thus, the operation mode of the valve device 1 can be increased as compared with a configuration in which the upper movable disk 50 does not have the upper flow passage communication hole 55.

(6) In the above embodiment, the compression spring 90 is formed of a resilient member that is resiliently deformable.

According to this configuration, a configuration can be achieved in which the lower movable disk 30 is easily pressed against the lower stationary disk 20 while the upper movable disk 50 is easily pressed against the upper stationary disk 40, as compared with a case in which the compression spring 90 is formed of a member other than the resilient member.

In the embodiment, the single compression spring 90 presses the lower movable disk 30 against the lower stationary disk 20, and presses the upper movable disk 50 against the upper stationary disk 40. Thus, the number of constituent pieces of the valve device 1 can be reduced as compared with a case in which members pressing the lower movable disk 30 and the upper stationary disk 40 are configured separately from each other.

(7) In the above embodiment, the valve device 1 includes the lower torsion spring 80 that presses the lower movable disk 30 in the circumferential direction DRc centered on the axis CL, and the upper torsion spring 85 that presses the upper movable disk 50 in the circumferential direction DRc centered on the axis CL.

According to this configuration, rattling of the lower movable disk 30 in the circumferential direction DRc can be reduced by the pressing force of the lower torsion spring 80 in the circumferential direction DRc. Thus, positional displacement of the rotational position of the lower movable disk 30 with respect to the lower stationary disk 20 can be reduced.

Therefore, displacement can be reduced in an overlap between the lower flow passage through-hole 34 of the lower movable disk 30 and each of the first outlet flow hole 261, the second outlet flow hole 262, and the third outlet flow hole 263 of the lower stationary disk 20. Displacement can also be reduced in an overlap between the lower flow passage communication hole 35 of the lower movable disk 30 and each of the second inlet flow hole 252, the first outlet flow hole 261, and the second outlet flow hole 262 of the lower stationary disk 20.

Rattling of the upper movable disk 50 in the circumferential direction DRc can be reduced by the pressing force of the upper torsion spring 85 in the circumferential direction DRc. Thus, positional displacement of the rotational position of the upper movable disk 50 with respect to the upper stationary disk 40 can be reduced.

Therefore, displacement can be reduced in an overlap between the upper flow passage through-hole 54 of the upper movable disk 50 and each of the fourth outlet flow hole 464, the fifth outlet flow hole 465, and the sixth outlet flow hole 466 of the upper stationary disk 40. Displacement can also be reduced in an overlap between the upper flow passage communication hole 55 of the upper movable disk 50 and each of the third inlet flow hole 453, the fifth outlet flow hole 465, and the sixth outlet flow hole 466 of the upper stationary disk 40.

Therefore, the flow rate can be accurately controlled for the fluid to be allowed to flow out from each of the first fluid outlet portion 161, the second fluid outlet portion 162, the third fluid outlet portion 163, the fourth fluid outlet portion 164, the fifth fluid outlet portion 165, and the sixth fluid outlet portion 166.

In the embodiment, neither the lower movable disk 30 nor the upper movable disk 50 is directly connected to the shaft 61. The lower movable disk 30 and the upper movable disk 50 are configured to be supported in the axial direction DRa by the compression spring 90, and are configured to be supported in the circumferential direction DRc by the lower torsion spring 80 and the upper torsion spring 85.

Thus, even in a case where difficulty occurs in ensuring the surface accuracy of each of the lower installation surface 1121, the upper installation surface 1211, the lower seal surface 21, the lower sliding surface 31, the upper seal surface 41, and the upper sliding surface 51 and these surfaces deviate from a direction orthogonal to the axial direction DRa, the surfaces adjacent to each other can be easily brought into contact with each other. Therefore, sealing performance between these contacting surfaces can be easily ensured.

(8) In the above embodiment, the valve device 1 includes the lower lever 70 that is fixed to the lower movable disk 30, and that transmits the pressing force of the lower torsion spring 80 to the lower movable disk 30. The valve device 1 also includes the upper lever 75 that is fixed to the upper movable disk 50, and that transmits the pressing force of the upper torsion spring 85 to the upper movable disk 50.

On the other hand, in the case of a configuration in which the valve device 1 does not include the lower lever 70 and in which the lower movable disk 30 includes a portion having a shape similar to the shape of the lower lever 70 and directly receives the pressing force from the lower torsion spring 80, the shape of the lower movable disk 30 is complicated. Thus, the configuration is made in which the lower lever 70 is provided separately from the lower movable disk 30 and the lower movable disk 30 receives the pressing force from the lower torsion spring 80 via the lower lever 70, whereby the shape of the lower movable disk 30 can be simplified. According to the shape of the lower movable disk 30 having a simple shape, the lower flow passage through-hole 34 and the lower flow passage communication hole 35 can be easily formed in the lower movable disk 30, and the manufacturing cost of the lower movable disk 30 can be reduced.

In the case of a configuration in which the valve device 1 does not include the upper lever 75 and in which the upper movable disk 50 includes a portion having a shape similar to the shape of the upper lever 75 and directly receives the pressing force from the upper torsion spring 85, the shape of the upper movable disk 50 is complicated. Thus, the configuration is made in which the upper lever 75 is provided separately from the upper movable disk 50 and the upper movable disk 50 receives the pressing force from the upper torsion spring 85 via the upper lever 75, whereby the shape of the upper movable disk 50 can be simplified. According to the shape of the upper movable disk 50 having a simple shape, the upper flow passage through-hole 54 and the upper flow passage communication hole 55 can be easily formed in the upper movable disk 50, and the manufacturing cost of the upper movable disk 50 can be reduced.

First Modification of First Embodiment

In the first embodiment described above, an example has been described in which the lower lever 70 coupling the shaft 61 and the lower movable disk 30 via the lower torsion spring 80 is configured separately from the lower movable disk 30. An example has been also described in which the upper lever 75 coupling the shaft 61 and the upper movable disk 50 via the upper torsion spring 85 is configured separately from the upper movable disk 50. However, the configurations of the lower lever 70 and the upper lever 75 are not limited thereto.

Figure 14:
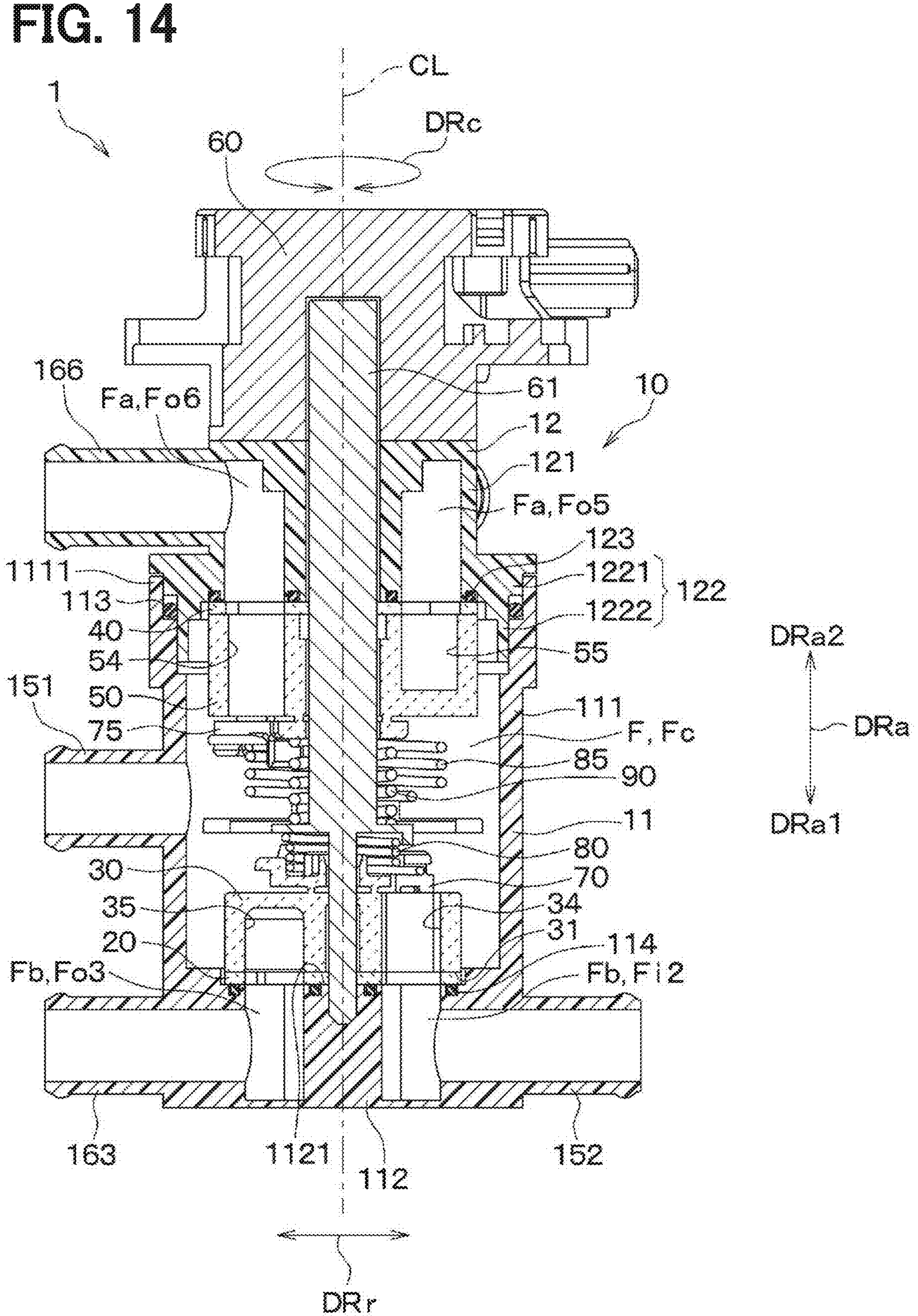
FIG. 14 is a cross-sectional view of a valve device according to a first modification of the first embodiment.

For example, as illustrated in FIG. 14, the lower lever 70 may be formed integrally with the lower movable disk 30. The upper lever 75 may be formed integrally with the upper movable disk 50.

According to this configuration, the number of pieces forming the valve device 1 can be reduced as compared with the case in which the lower lever 70 is configured separately from the lower movable disk 30 and the upper lever 75 is configured separately from the upper movable disk 50.

Second Modification of First Embodiment

In the first embodiment described above, an example has been described in which the shaft 61 and the lower movable disk 30 are coupled via the lower torsion spring 80. However, the configuration is not limited thereto.

Figure 15:
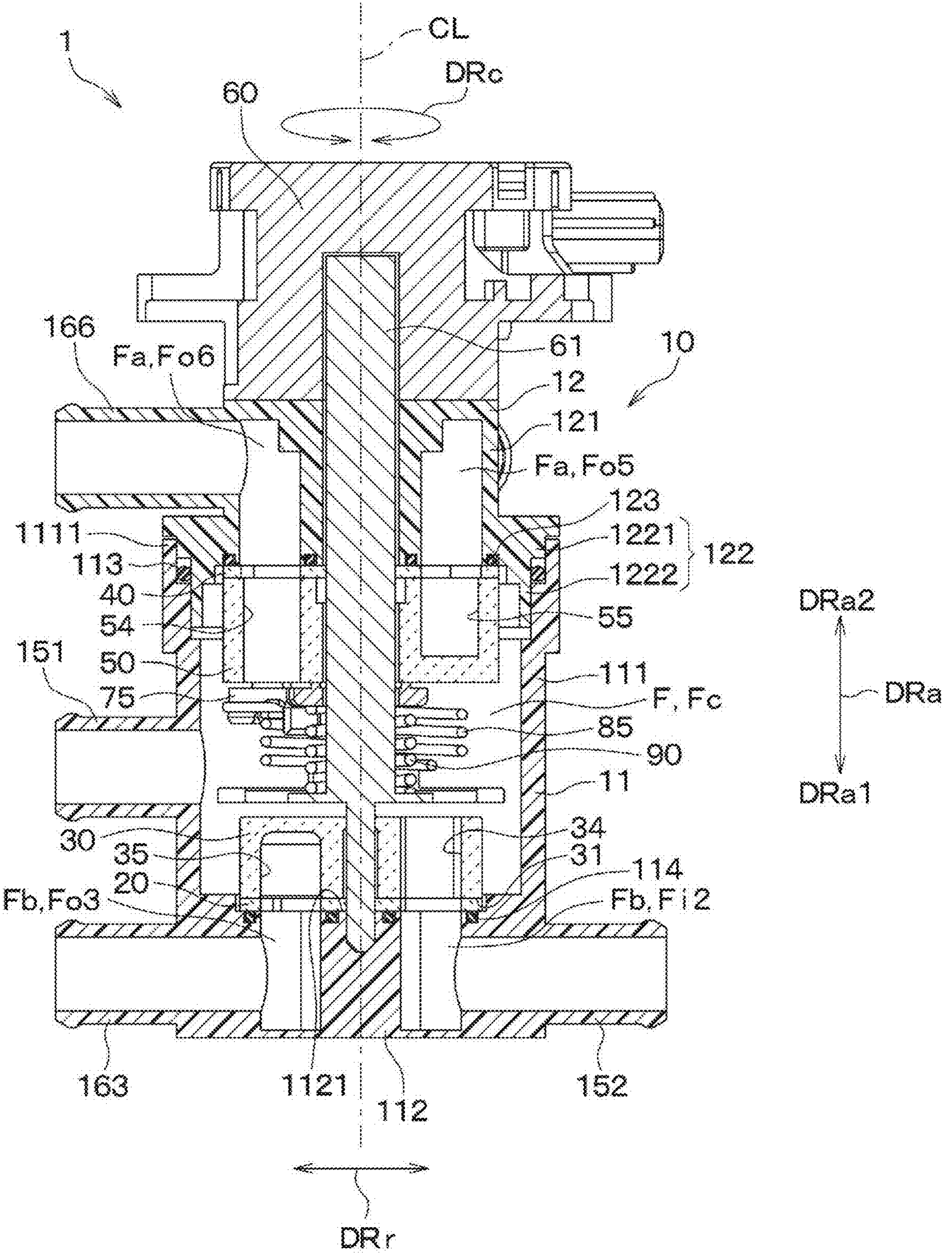
FIG. 15 is a cross-sectional view of a valve device according to a second modification of the first embodiment.

For example, as illustrated in FIG. 15, the valve device 1 may be configured without including the lower torsion spring 80. In this case, the lower lever 70 causing the lower torsion spring 80 and the lower movable disk 30 to be coupled to each other is unnecessary, and thus a configuration may be adopted in which the lower lever 70 is also not provided.

In the case of the configuration in which the lower torsion spring 80 is not provided, the shaft 61 and the lower movable disk 30 are directly coupled to each other. For example, the lower movable hole 32 of the lower movable disk 30 may be formed such that the inner diameter thereof is slightly smaller than the outer diameter of the lower axial portion 611, and the shaft 61 and the lower movable disk 30 may be directly coupled to each other by press-fitting the lower axial portion 611 into this lower movable hole 32.

With this configuration, when the lower axial portion 611 rotates, the rotational force of the shaft 61 is directly transmitted to the lower movable disk 30 through the lower axial portion 611. Further, the lower movable disk 30 can be biased in the lower direction DRa1 and thus the lower stationary disk 20 can be pressed against the lower installation surface 1121, by the compression spring 90 biasing the flange portion 613 in the lower direction DRa1.

Although not illustrated, the valve device 1 may be configured such that the valve device 1 includes the lower torsion spring 80 and the lower lever 70 and does not include the upper torsion spring 85 and the upper lever 75 instead. In this case, the shaft 61 and the upper movable disk 50 may be directly coupled to each other by press-fitting the upper axial portion 612 into the upper movable hole 52 of the upper movable disk 50.

With this configuration, when the upper axial portion 612 rotates, the rotational force of the shaft 61 is directly transmitted to the upper movable disk 50 through the upper axial portion 612. Further, the upper stationary disk 40 can be pressed against the upper installation surface 1211 by the compression spring 90 biasing the upper movable disk 50 in the upper direction DRa2.

Second Embodiment

Next, a second embodiment will be described with reference to FIGS. 16 to 20. The present embodiment is different from the first embodiment in that a fourth fluid inlet portion 154 is also provided in the lower housing 11. The present embodiment is also different from the first embodiment in the shapes of the lower stationary disk 20 and the lower movable disk 30. Others are similar to those of the first embodiment. Thus, in the present embodiment, parts different from those of the first embodiment will be mainly described, and description of parts similar to those of the first embodiment may be omitted as appropriate.

Figure 16:
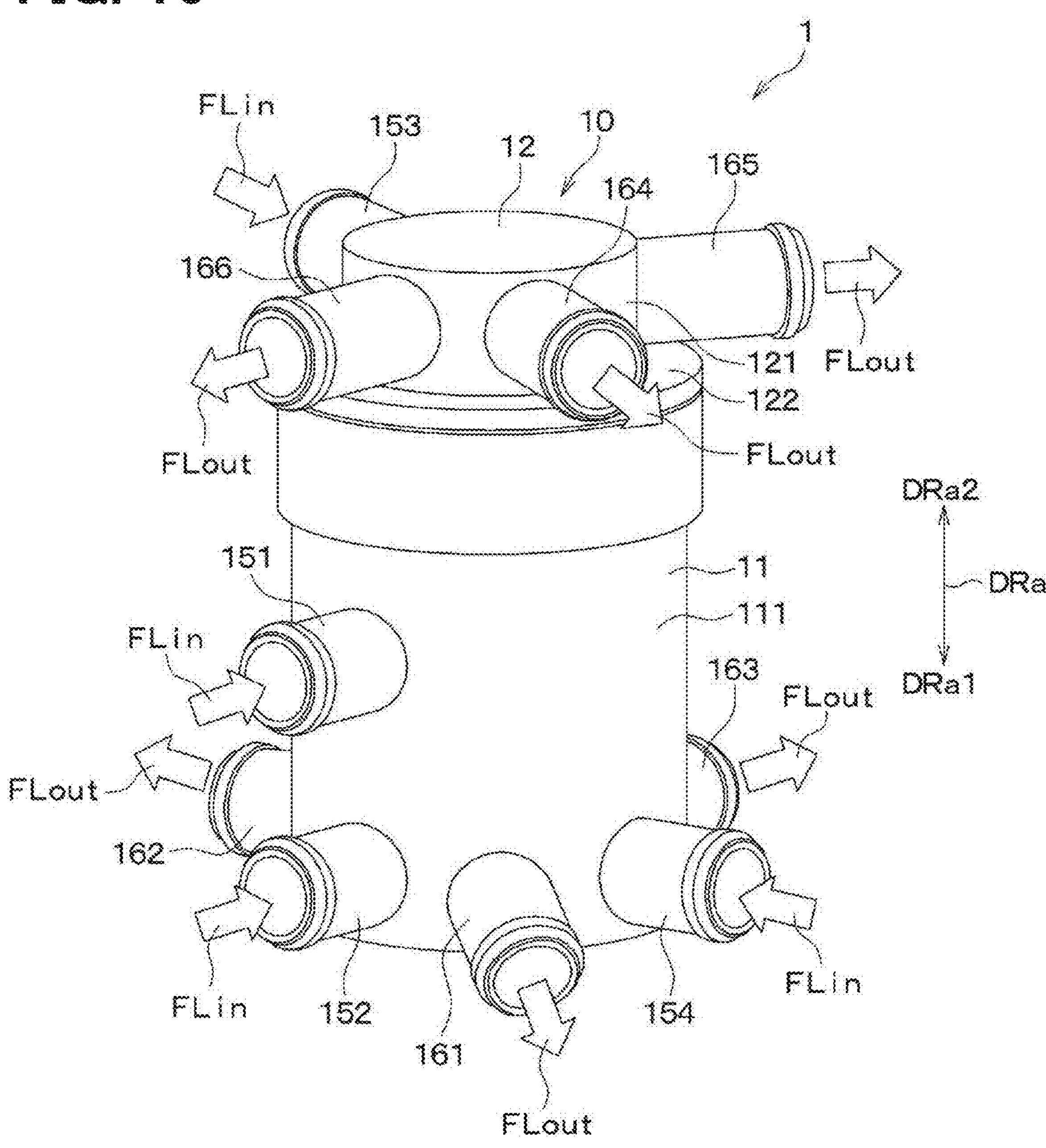
FIG. 16 is an external view of a valve device according to a second embodiment.
Figure 17:
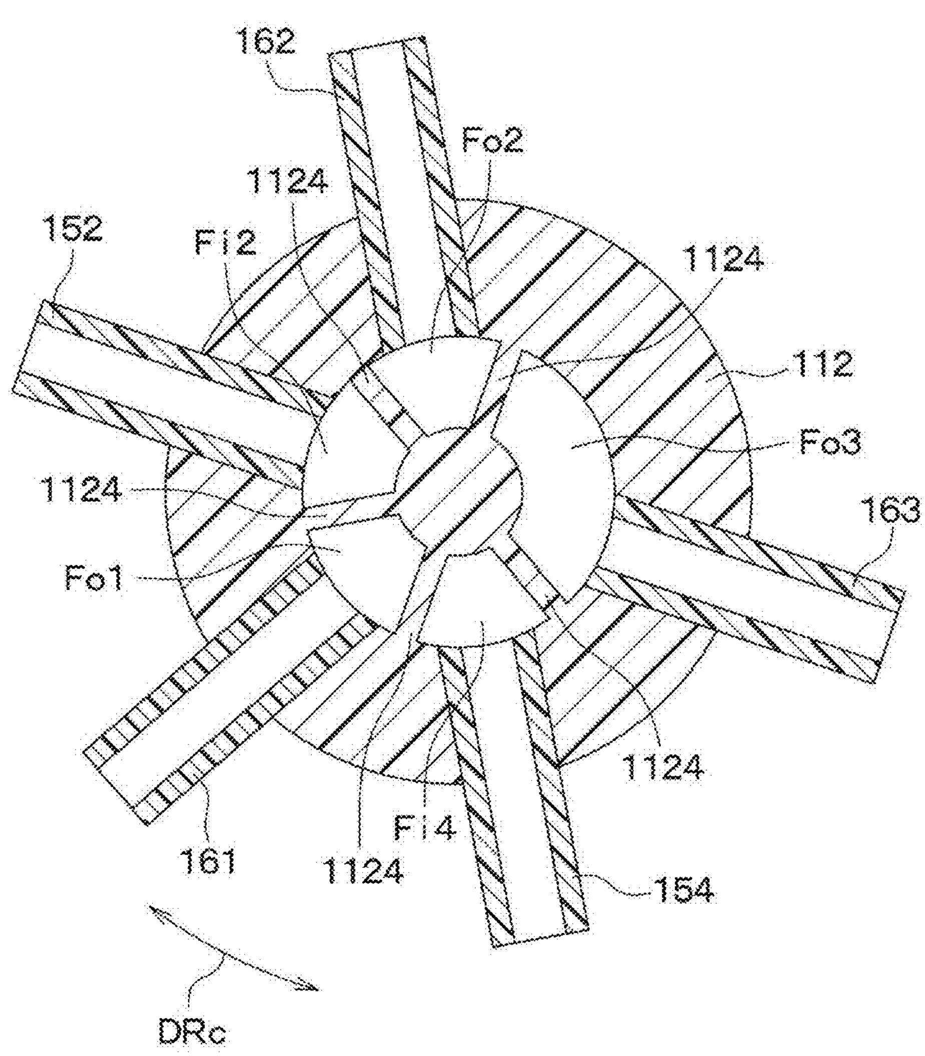
FIG. 17 is a view corresponding to FIG. 4, in the valve device according to the second embodiment.

As illustrated in FIGS. 16 and 17, the lower side wall portion 111 of the present embodiment is provided with the fourth fluid inlet portion 154, in addition to the first fluid inlet portion 151, the second fluid inlet portion 152, the first fluid outlet portion 161, the second fluid outlet portion 162, and the third fluid outlet portion 163. The fourth fluid inlet portion 154 is an inlet port that functions as an inlet through which the fluid flows into the flow passage F inside the housing 10.

In the present embodiment, the second fluid outlet portion 162, the second fluid inlet portion 152, the first fluid outlet portion 161, the fourth fluid inlet portion 154, and the third fluid outlet portion 163 are provided side by side in this order at predetermined intervals along the circumferential direction DRc, in the outer peripheral portion of the lower housing 11. Specifically, the second fluid outlet portion 162, the second fluid inlet portion 152, the first fluid outlet portion 161, the fourth fluid inlet portion 154, and the third fluid outlet portion 163 are arranged side by side at intervals of about 60°. The fourth fluid inlet portion 154 is formed on the lower direction DRa1 side with respect to the lower stationary disk 20 and the lower movable disk 30, in the outer peripheral portion of the lower housing 11.

The fourth fluid inlet portion 154 communicates with the lower flow passage Fb. The fourth fluid inlet portion 154 is an opening, and functions as a one-side opening.

In the lower side wall portion 111, as in the first embodiment, the first fluid inlet portion 151 is provided on the upper direction DRa2 side with respect to the lower stationary disk 20 and the lower movable disk 30.

The lower bottom wall portion 112 is formed with a fourth inlet flow passage Fi4 communicating with the fourth fluid inlet portion 154. The fourth inlet flow passage Fi4 is formed on the lower direction DRa1 side with respect to the lower stationary disk 20. The second outlet flow passage Fo2, the second inlet flow passage Fi2, the first outlet flow passage Fo1, the fourth inlet flow passage Fi4, and the third outlet flow passage Fo3 are partitioned by five lower partition walls 1124 provided in the lower bottom wall portion 112. In other words, in the flow passage F inside the housing 10, the lower flow passage Fb is partitioned into the second outlet flow passage Fo2, the second inlet flow passage Fi2, the first outlet flow passage Fo1, the fourth inlet flow passage Fi4, and the third outlet flow passage Fo3 by the five lower partition walls 1124. In the present embodiment, the second outlet flow passage Fo2, the second inlet flow passage Fi2, the first outlet flow passage Fo1, the fourth inlet flow passage Fi4, and the third outlet flow passage Fo3 are formed side by side in this order along the circumferential direction DRc.

The fourth inlet flow passage Fi4 is formed such that a cross section in a direction orthogonal to the axial direction DRa thereof has a substantially sector shape, and is formed such that a flow passage cross-sectional area thereof has substantially the same size as each of the respective flow passage cross-sectional areas of the second inlet flow passage Fi2, the second outlet flow passage Fo2, and the first outlet flow passage Fo1. The fourth inlet flow passage Fi4 is formed such that the flow passage cross-sectional area thereof is about half the flow passage cross-sectional area of the third outlet flow passage Fo3.

The five lower partition walls 1124 are provided at respective positions corresponding to five lower partition portions 24, which will be described later, of the lower stationary disk 20. Ends of the five lower partition walls 1124 on the lower stationary disk 20 side are fixed in a state where each of respective orientations thereof coincides with a corresponding one of respective orientations of the five lower partition portions 24 of the lower stationary disk 20. The fourth inlet flow passage Fi4 communicates with a fourth inlet flow hole 254, which will be described later, of the lower stationary disk 20. The fourth inlet flow passage Fi4 functions as a one-side flow passage.

Figure 18:
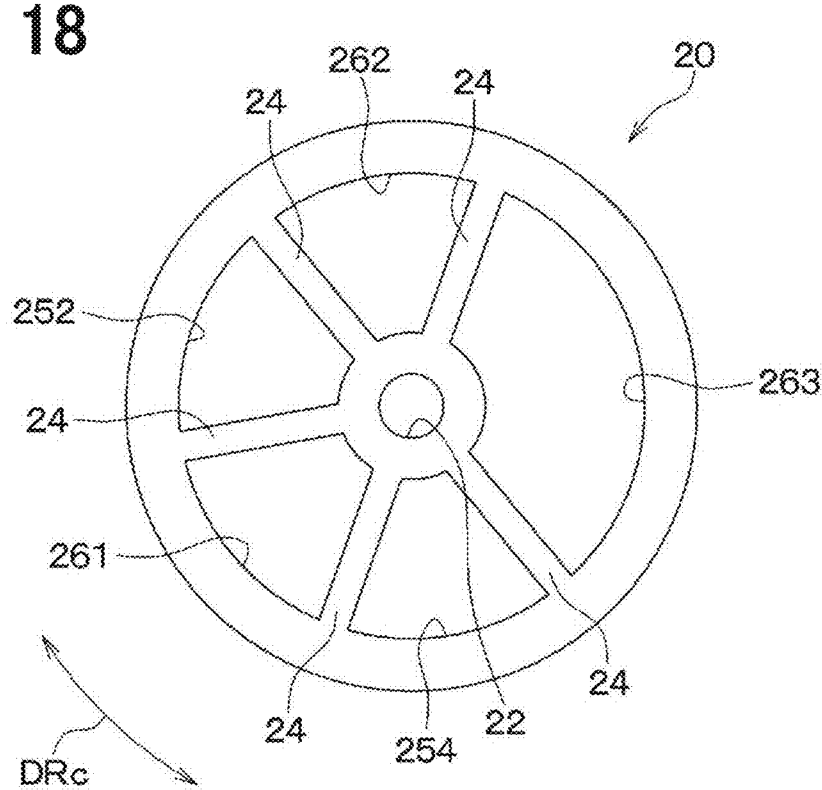
FIG. 18 is a top view of a lower stationary disk according to the second embodiment.

As illustrated in FIG. 18, the lower stationary disk 20 of the present embodiment is formed with the fourth inlet flow hole 254, in addition to the second inlet flow hole 252, the first outlet flow hole 261, the second outlet flow hole 262, and the third outlet flow hole 263. The fourth inlet flow hole 254 is formed through the lower stationary disk 20 in the axial direction DRa, and the fluid can pass therethrough. The fourth inlet flow hole 254 is formed such that a cross section in a direction orthogonal to the axial direction DRa thereof has a substantially sector shape.

The second outlet flow hole 262, the second inlet flow hole 252, the first outlet flow hole 261, the fourth inlet flow hole 254, and the third outlet flow hole 263 are formed side by side in this order. The lower stationary disk 20 has each of the five lower partition portions 24 provided between the corresponding ones of the second outlet flow hole 262, the second inlet flow hole 252, the first outlet flow hole 261, the fourth inlet flow hole 254, and the third outlet flow hole 263.

The second outlet flow hole 262, the second inlet flow hole 252, the first outlet flow hole 261, the fourth inlet flow hole 254, and the third outlet flow hole 263 are arranged alternately with the five lower partition portions 24 in the circumferential direction DRc along the entire circumference of the lower stationary disk 20.

The fourth inlet flow hole 254 has a flow passage cross-sectional area corresponding to the flow passage cross-sectional area of the fourth inlet flow passage Fi4, and communicates with the fourth fluid inlet portion 154 via the fourth inlet flow passage Fi4. The fourth inlet flow hole 254 in the present embodiment functions as a first flow passage hole. In the lower stationary disk 20 illustrated in FIG. 18, the lower protrusion 23 is omitted.

Figure 19:
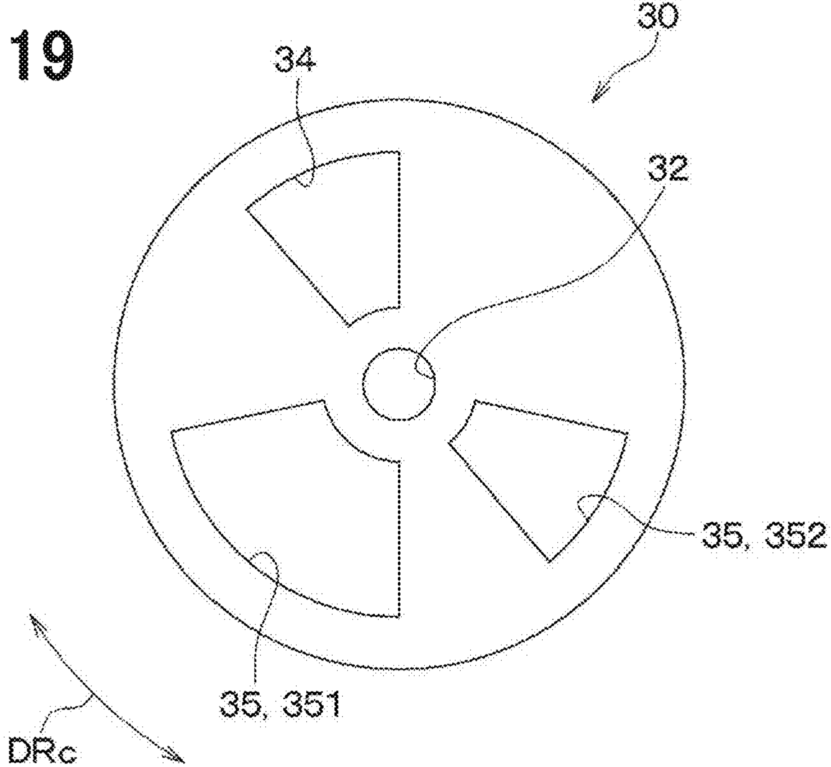
FIG. 19 is a bottom view of a lower movable disk according to the second embodiment.

As illustrated in FIG. 19, the lower movable disk 30 of the present embodiment has one lower flow passage through-hole 34 extending through the lower movable disk 30 in the axial direction DRa, and two lower flow passage communication holes 35 not extending through the lower movable disk 30. The two lower flow passage communication holes 35 each are formed such that a cross section in a direction orthogonal to the axial direction DRa thereof has a substantially sector shape.

The lower flow passage through-hole 34 of the present embodiment is formed to have a flow passage cross-sectional area smaller than the flow passage cross-sectional area of any of the second outlet flow hole 262, the second inlet flow hole 252, the first outlet flow hole 261, the fourth inlet flow hole 254, and the third outlet flow hole 263. The lower flow passage through-hole 34 is formed not to be superimposable entirely across each of the second outlet flow hole 262, the second inlet flow hole 252, the first outlet flow hole 261, the fourth inlet flow hole 254, and the third outlet flow hole 263.

The lower flow passage through-hole 34 is formed to be able to communicate with any one or two of the second outlet flow hole 262, the second inlet flow hole 252, the first outlet flow hole 261, the fourth inlet flow hole 254, and the third outlet flow hole 263 in accordance with the rotational position of the lower movable disk 30. Specifically, in a case where the lower flow passage through-hole 34 overlaps only any one of the second outlet flow hole 262, the second inlet flow hole 252, the first outlet flow hole 261, the fourth inlet flow hole 254, and the third outlet flow hole 263 in the axial direction DRa, the lower flow passage through-hole 34 communicates with only this overlapped flow hole. In a case where the lower flow passage through-hole 34 spans and overlaps two of the second outlet flow hole 262, the second inlet flow hole 252, the first outlet flow hole 261, the fourth inlet flow hole 254, and the third outlet flow hole 263 in the axial direction DRa, the lower flow passage through-hole 34 communicates with these two spanned flow holes.

In other words, the lower movable disk 30 has the lower flow passage through-hole 34 that communicates with at least one of the second outlet flow passage Fo2, the second inlet flow passage Fi2, the first outlet flow passage Fo1, the fourth inlet flow passage Fi4, or the third outlet flow passage Fo3 through the rotation of the lower movable disk 30 caused along with the rotation of the shaft 61.

In the present embodiment, a rotational range of the lower movable disk 30 is determined in advance, and the lower flow passage through-hole 34 is configured to be able to communicate with any one or two of the first outlet flow hole 261, the second outlet flow hole 262, and the third outlet flow hole 263. The lower flow passage through-hole 34 is configured to be unable to communicate with the second inlet flow hole 252 and the fourth inlet flow hole 254. That is, the lower flow passage through-hole 34 is configured to be unable to communicate with the second fluid inlet portion 152 via the second inlet flow passage Fi2, and is configured to be unable to communicate with the fourth fluid inlet portion 154 via the fourth inlet flow passage Fi4.

Therefore, when the lower movable disk 30 is caused to rotate and then is caused to stop at a predetermined position, the lower flow passage through-hole 34 communicates with any one or two of the first outlet flow hole 261, the second outlet flow hole 262, and the third outlet flow hole 263. The lower flow passage through-hole 34 communicates with the flow passage(s) corresponding to the flow hole(s) with which the lower flow passage through-hole 34 communicates, among the first outlet flow passage Fo1, the second outlet flow passage Fo2, and the third outlet flow passage Fo3. As a result, the lower flow passage through-hole 34 allows communication between the central flow passage Fc and the flow passage(s) with which the lower flow passage through-hole 34 communicates, among the first outlet flow passage Fo1, the second outlet flow passage Fo2, and the third outlet flow passage Fo3.

One of the two lower flow passage communication holes 35 is formed such that the cross section in the direction orthogonal to the axial direction DRa thereof is larger than the cross section in the direction orthogonal to the axial direction DRa of the lower flow passage through-hole 34. On the other hand, the other of the two lower flow passage communication holes 35 is formed such that the cross section in the direction orthogonal to the axial direction DRa thereof has substantially the same size as the cross section in the direction orthogonal to the axial direction DRa of the lower flow passage through-hole 34.

Hereinafter, of the two lower flow passage communication holes 35, the one having a larger flow passage cross-sectional area is also referred to as a first lower communication hole 351, and the other having a smaller flow passage cross-sectional area is also referred to as a second lower communication hole 352. The lower flow passage through-hole 34, the first lower communication hole 351, and the second lower communication hole 352 are formed side by side in this order at predetermined intervals along the circumferential direction DRc.

Each of the first lower communication hole 351 and the second lower communication hole 352 is formed by recessing a portion of the lower sliding surface 31, which is on a side where sliding with respect to the lower stationary disk 20 is performed. That is, the first lower communication hole 351 and the second lower communication hole 352 are formed without extending through the lower movable disk 30.

The first lower communication hole 351 is formed such that the flow passage cross-sectional area thereof is larger than the flow passage cross-sectional area of any of the second outlet flow hole 262, the second inlet flow hole 252, the first outlet flow hole 261, and the fourth inlet flow hole 254, and is smaller than the flow passage cross-sectional area of the third outlet flow hole 263. The first lower communication hole 351 is formed to be superimposable entirely across each of the second outlet flow hole 262, the second inlet flow hole 252, the first outlet flow hole 261, and the fourth inlet flow hole 254, and is formed not to be superimposable entirely across the third outlet flow hole 263.

In the present embodiment, the first lower communication hole 351 has a size superimposable on at least respective part(s) of any one or two of the second outlet flow hole 262, the second inlet flow hole 252, the first outlet flow hole 261, the fourth inlet flow hole 254, or the third outlet flow hole 263.

The first lower communication hole 351 is formed to be able to allow communication of any one or two of the second outlet flow hole 262, the second inlet flow hole 252, the first outlet flow hole 261, the fourth inlet flow hole 254, and the third outlet flow hole 263. Specifically, in a case where the first lower communication hole 351 overlaps only any one of the second outlet flow hole 262, the second inlet flow hole 252, the first outlet flow hole 261, the fourth inlet flow hole 254, and the third outlet flow hole 263 in the axial direction DRa, the first lower communication hole 351 communicates with only this overlapped flow hole. In a case where the first lower communication hole 351 spans and overlaps two of the second outlet flow hole 262, the second inlet flow hole 252, the first outlet flow hole 261, the fourth inlet flow hole 254, and the third outlet flow hole 263 in the axial direction DRa, the first lower communication hole 351 allows these two spanned flow holes to communicate with each other. Thus, among the second outlet flow hole 262, the second inlet flow hole 252, the first outlet flow hole 261, the fourth inlet flow hole 254, and the third outlet flow hole 263, the flow holes communicating with the first lower communication hole 351 communicate with each other.

The second lower communication hole 352 is formed such that the flow passage cross-sectional area thereof is smaller than the flow passage cross-sectional area of any of the second outlet flow hole 262, the second inlet flow hole 252, the first outlet flow hole 261, the fourth inlet flow hole 254, and the third outlet flow hole 263. The second lower communication hole 352 is formed not to be superimposable entirely across each of the second outlet flow hole 262, the second inlet flow hole 252, the first outlet flow hole 261, the fourth inlet flow hole 254, and the third outlet flow hole 263.

In the present embodiment, the second lower communication hole 352 has a size superimposable on at least respective part(s) of any one or two of the second outlet flow hole 262, the second inlet flow hole 252, the first outlet flow hole 261, the fourth inlet flow hole 254, and the third outlet flow hole 263.

The second lower communication hole 352 is formed to be able to allow communication of any one or two of the second outlet flow hole 262, the second inlet flow hole 252, the first outlet flow hole 261, the fourth inlet flow hole 254, and the third outlet flow hole 263. Specifically, in a case where the second lower communication hole 352 overlaps only any one of the second outlet flow hole 262, the second inlet flow hole 252, the first outlet flow hole 261, the fourth inlet flow hole 254, and the third outlet flow hole 263 in the axial direction DRa, the second lower communication hole 352 communicates with only this overlapped flow hole. In a case where the second lower communication hole 352 spans and overlaps two of the second outlet flow hole 262, the second inlet flow hole 252, the first outlet flow hole 261, the fourth inlet flow hole 254, and the third outlet flow hole 263 in the axial direction DRa, the second lower communication hole 352 allows these two spanned flow holes to communicate with each other. Thus, among the second outlet flow hole 262, the second inlet flow hole 252, the first outlet flow hole 261, and the fourth inlet flow hole 254, the flow holes communicating with the second lower communication hole 352 communicate with each other.

In other words, the lower movable disk 30 has the first lower communication hole 351 and the second lower communication hole 352 each of which allows a plurality of ones of the second outlet flow passage Fo2, the second inlet flow passage Fi2, the first outlet flow passage Fo1, the fourth inlet flow passage Fi4, and the third outlet flow passage Fo3 to communicate with each other through the rotation of the lower movable disk 30 caused along with the rotation of the shaft 61.

In the present embodiment, a rotational range of the lower movable disk 30 is determined in advance, and the first lower communication hole 351 is configured to be able to communicate with the second inlet flow hole 252 and the first outlet flow hole 261, and is configured to be able to communicate with the fourth inlet flow hole 254 and the first outlet flow hole 261. The first lower communication hole 351 is configured to be able to communicate with the fourth inlet flow hole 254 and the third outlet flow hole 263. Thus, the first lower communication hole 351 is configured to be able to allow the second inlet flow hole 252 to communicate with the first outlet flow hole 261, and is configured to be able to allow the fourth inlet flow hole 254 to communicate with the first outlet flow hole 261. The first lower communication hole 351 is configured to be able to allow the fourth inlet flow hole 254 to communicate with the third outlet flow hole 263. The first lower communication hole 351 is configured to be unable to communicate with the second outlet flow hole 262.

Therefore, when the lower movable disk 30 is caused to rotate and then is caused to stop at a predetermined position, the first lower communication hole 351 communicates with the second inlet flow hole 252 and the first outlet flow hole 261. The first lower communication hole 351 communicates with the second inlet flow passage Fi2 and the first outlet flow passage Fo1, and allows the second inlet flow passage Fi2 and the first outlet flow passage Fo1 to communicate with each other. Alternatively, when the lower movable disk 30 is caused to rotate and then is caused to stop at a predetermined position, the first lower communication hole 351 communicates with the fourth inlet flow hole 254 and the first outlet flow hole 261. The first lower communication hole 351 communicates with the fourth inlet flow passage Fi4 and the first outlet flow passage Fo1, and allows the fourth inlet flow passage Fi4 and the first outlet flow passage Fo1 to communicate with each other. Alternatively, when the lower movable disk 30 is caused to rotate and then is caused to stop at a predetermined position, the first lower communication hole 351 communicates with the fourth inlet flow hole 254 and the third outlet flow hole 263. The first lower communication hole 351 communicates with the fourth inlet flow passage Fi4 and the third outlet flow passage Fo3, and allows the fourth inlet flow passage Fi4 and the third outlet flow passage Fo3 to communicate with each other.

The second lower communication hole 352 is configured to be able to communicate with any one or two of the fourth inlet flow hole 254, the second outlet flow hole 262, and the third outlet flow hole 263. Thus, the second lower communication hole 352 is configured to be able to allow the fourth inlet flow hole 254 to communicate with the third outlet flow hole 263. The second lower communication hole 352 is configured to be able to allow communication between the second outlet flow hole 262 and the third outlet flow hole 263. The second lower communication hole 352 is configured to be unable to communicate with the second inlet flow hole 252 and the first outlet flow hole 261.

Therefore, in a case where the lower movable disk 30 is caused to rotate and then is caused to stop at a predetermined position and the second lower communication hole 352 communicates with only any one of the fourth inlet flow hole 254 and the third outlet flow hole 263, the second lower communication hole 352 does not allow the flow hole with which the second lower communication hole 352 communicates to communicate with other flow holes. That is, the second lower communication hole 352 closes one of the fourth inlet flow hole 254 and the third outlet flow hole 263 with which the second lower communication hole 352 communicates. Thus, the second lower communication hole 352 does not allow the flow passage with which the second lower communication hole 352 communicates, out of the fourth inlet flow passage Fi4 and the third outlet flow passage Fo3, to communicate with other flow passages.

In a case where the lower movable disk 30 is caused to rotate and then is caused to stop at a predetermined position and the second lower communication hole 352 communicates with the fourth inlet flow hole 254 and the third outlet flow hole 263, the second lower communication hole 352 allows the fourth inlet flow hole 254 and the third outlet flow hole 263 to communicate with each other. The second lower communication hole 352 communicates with the fourth inlet flow passage Fi4 and the third outlet flow passage Fo3, and allows the fourth inlet flow passage Fi4 and the third outlet flow passage Fo3 to communicate with each other. The second lower communication hole 352 also communicates with the second outlet flow hole 262 and the third outlet flow hole 263, and allows the second outlet flow passage Fo2 and the third outlet flow passage Fo3 to communicate with each other.

The valve device 1 of the present embodiment can switch the operation mode to any of a first operation mode, a second operation mode, a third operation mode, a fourth operation mode, a fifth operation mode, and a sixth operation mode by causing the lower movable disk 30 and the upper movable disk 50 to rotate. The rotational position of the lower movable disk 30 and the flow of the fluid flowing through the flow passage F in each specific operation mode will be described with reference to FIG. 20.

In FIG. 20, for purposes of clarity of the drawing, respective portions in which the lower flow passage through-hole 34, the first lower communication hole 351, and the second lower communication hole 352 are superimposed on the lower stationary disk 20 are shaded with dots. In the present embodiment, since the shapes of the upper housing 12, the upper stationary disk 40, and the upper movable disk 50 are similar to those of the first embodiment, the description of the flow of the fluid flowing through the upper flow passage Fa will be omitted.

First, the first operation mode will be described. When the operation mode of the valve device 1 is set to the first operation mode, the lower movable disk 30 is positioned at the rotational position illustrated in the first operation mode of FIG. 20.

Specifically, when the operation mode is set to the first operation mode, the lower movable disk 30 is positioned at a rotational position where the lower flow passage through-hole 34 communicates with the second outlet flow hole 262 and the third outlet flow hole 263. The lower movable disk 30 is positioned at a rotational position where the first lower communication hole 351 communicates with the second inlet flow hole 252 and the first outlet flow hole 261. The lower movable disk 30 is positioned at a rotational position where the second lower communication hole 352 communicates with only the fourth inlet flow hole 254.

Accordingly, the lower flow passage through-hole 34 communicates with the second outlet flow passage Fo2 and the third outlet flow passage Fo3. Then, the second outlet flow passage Fo2 and the third outlet flow passage Fo3 communicate with the first fluid inlet portion 151 via the central flow passage Fc. The first lower communication hole 351 allows the second inlet flow passage Fi2 and the first outlet flow passage Fo1 to communicate with each other. Then, the first outlet flow passage Fo1 communicates with the second fluid inlet portion 152 via the second inlet flow passage Fi2. The second lower communication hole 352 communicates with only the fourth inlet flow passage Fi4. Then, the fourth inlet flow passage Fi4 is closed by the second lower communication hole 352 and the lower sliding surface 31.

When the operation mode is set to the first operation mode, the third outlet flow hole 263 faces a portion of the lower sliding surface 31 where the lower flow passage through-hole 34, the first lower communication hole 351, and the second lower communication hole 352 are not formed. Thus, when the operation mode is set to the first operation mode, the third outlet flow passage Fo3 is closed by the lower sliding surface 31.

Therefore, when the operation mode of the valve device 1 is set to the first operation mode, the fluid having flowed into the valve device 1 from the first fluid inlet portion 151 passes through the central flow passage Fc and the lower flow passage through-hole 34, and flows to the second outlet flow passage Fo2 and the third outlet flow passage Fo3 in the lower flow passage Fb. The fluid having flowed into the second outlet flow passage Fo2 flows out to the outside of the valve device 1 from the second fluid outlet portion 162. The fluid having flowed into the third outlet flow passage Fo3 flows out to the outside of the valve device 1 from the third fluid outlet portion 163.

The fluid having flowed into the valve device 1 from the second fluid inlet portion 152 passes through the second inlet flow passage Fi2 and the first lower communication hole 351, and flows to the first outlet flow passage Fo1 in the lower flow passage Fb. The fluid having flowed into the first outlet flow passage Fo1 flows out to the outside of the valve device 1 from the first fluid outlet portion 161.

However, the fluid having flowed into the valve device 1 from the fourth fluid inlet portion 154 is blocked by the lower movable disk 30, and does not flow out from the first fluid outlet portion 161, the second fluid outlet portion 162, and the third fluid outlet portion 163.

As described above, when the operation mode of the valve device 1 is set to the first operation mode, the fluid flows into the valve device 1 from each of the first fluid inlet portion 151 and the second fluid inlet portion 152. The fluid having flowed into the valve device 1 from the first fluid inlet portion 151 flows out to the outside of the valve device 1 from each of the second fluid outlet portion 162 and the third fluid outlet portion 163. The fluid having flowed into the valve device 1 from the second fluid inlet portion 152 flows out to the outside of the valve device 1 from the first fluid outlet portion 161. However, the fluid does not flow into the valve device 1 from the fourth fluid inlet portion 154 closed by the lower movable disk 30.

Next, the second operation mode will be described. When the operation mode of the valve device 1 is set to the second operation mode, the lower movable disk 30 is positioned at the rotational position illustrated in the second operation mode of FIG. 20.

Specifically, when the operation mode is set to the second operation mode, the lower movable disk 30 is positioned at a rotational position where the lower flow passage through-hole 34 communicates with only the third outlet flow hole 263. The lower movable disk 30 is positioned at a rotational position where the first lower communication hole 351 communicates with the second inlet flow hole 252 and the first outlet flow hole 261. The lower movable disk 30 is positioned at a rotational position where the second lower communication hole 352 communicates with only the fourth inlet flow hole 254.

Accordingly, the lower flow passage through-hole 34 communicates with only the third outlet flow passage Fo3. Then, the third outlet flow passage Fo3 communicates with the first fluid inlet portion 151 via the central flow passage Fc. The first lower communication hole 351 allows the second inlet flow passage Fi2 and the first outlet flow passage Fo1 to communicate with each other. Then, the first outlet flow passage Fo1 communicates with the second fluid inlet portion 152 via the second inlet flow passage Fi2. The second lower communication hole 352 communicates with only the fourth inlet flow passage Fi4. Then, the fourth inlet flow passage Fi4 is closed by the second lower communication hole 352 and the lower sliding surface 31.

When the operation mode is set to the second operation mode, the second outlet flow hole 262 faces a portion of the lower sliding surface 31 where none of the lower flow passage through-hole 34, the first lower communication hole 351, and the second lower communication hole 352 are formed. Thus, when the operation mode is set to the second operation mode, the second outlet flow passage Fo2 is closed by the lower sliding surface 31.

Therefore, when the operation mode of the valve device 1 is set to the second operation mode, the fluid having flowed into the valve device 1 from the first fluid inlet portion 151 passes through the central flow passage Fc and the lower flow passage through-hole 34, and flows to the third outlet flow passage Fo3 in the lower flow passage Fb. The fluid having flowed into the third outlet flow passage Fo3 flows out to the outside of the valve device 1 from the third fluid outlet portion 163.

The fluid having flowed into the valve device 1 from the second fluid inlet portion 152 passes through the second inlet flow passage Fi2 and the first lower communication hole 351, and flows to the first outlet flow passage Fo1 in the lower flow passage Fb. The fluid having flowed into the first outlet flow passage Fo1 flows out to the outside of the valve device 1 from the first fluid outlet portion 161.

However, the fluid having flowed into the valve device 1 from the fourth fluid inlet portion 154 is blocked by the lower movable disk 30, and does not flow out from the first fluid outlet portion 161, the second fluid outlet portion 162, and the third fluid outlet portion 163.

As described above, when the operation mode of the valve device 1 is set to the second operation mode, the fluid flows into the valve device 1 from each of the first fluid inlet portion 151 and the second fluid inlet portion 152. The fluid having flowed into the valve device 1 from the first fluid inlet portion 151 flows out to the outside of the valve device 1 from the third fluid outlet portion 163. The fluid having flowed into the valve device 1 from the second fluid inlet portion 152 flows out to the outside of the valve device 1 from the first fluid outlet portion 161. However, the fluid does not flow into the valve device 1 from the fourth fluid inlet portion 154 closed by the lower movable disk 30.

Next, the third operation mode will be described. When the operation mode of the valve device 1 is set to the third operation mode, the lower movable disk 30 is positioned at the rotational position illustrated in the third operation mode of FIG. 20.

Specifically, when the operation mode is set to the third operation mode, the lower movable disk 30 is positioned at a rotational position where the lower flow passage through-hole 34 communicates with only the second outlet flow hole 262. The lower movable disk 30 is positioned at a rotational position where the first lower communication hole 351 communicates with the second inlet flow hole 252 and the first outlet flow hole 261. The lower movable disk 30 is positioned at a rotational position where the second lower communication hole 352 communicates with the fourth inlet flow hole 254 and the third outlet flow hole 263.

Accordingly, the lower flow passage through-hole 34 communicates with only the second outlet flow passage Fo2. Then, the second outlet flow passage Fo2 communicates with the first fluid inlet portion 151 via the central flow passage Fc. The first lower communication hole 351 allows the second inlet flow passage Fi2 and the first outlet flow passage Fo1 to communicate with each other. Then, the first outlet flow passage Fo1 communicates with the second fluid inlet portion 152 via the second inlet flow passage Fi2. The second lower communication hole 352 allows the fourth inlet flow passage Fi4 and the third outlet flow passage Fo3 to communicate with each other. Then, the third outlet flow passage Fo3 communicates with the fourth fluid inlet portion 154 via the fourth inlet flow passage Fi4.

Therefore, when the operation mode of the valve device 1 is set to the third operation mode, the fluid having flowed into the valve device 1 from the first fluid inlet portion 151 passes through the central flow passage Fc and the lower flow passage through-hole 34, and flows to the second outlet flow passage Fo2 in the lower flow passage Fb. The fluid having flowed into the second outlet flow passage Fo2 flows out to the outside of the valve device 1 from the second fluid outlet portion 162.

The fluid having flowed into the valve device 1 from the second fluid inlet portion 152 passes through the second inlet flow passage Fi2 and the first lower communication hole 351, and flows to the first outlet flow passage Fo1 in the lower flow passage Fb. The fluid having flowed into the first outlet flow passage Fo1 flows out to the outside of the valve device 1 from the first fluid outlet portion 161.

The fluid having flowed into the valve device 1 from the fourth fluid inlet portion 154 passes through the fourth inlet flow passage Fi4 and the second lower communication hole 352, and flows to the third outlet flow passage Fo3 in the lower flow passage Fb. The fluid having flowed into the third outlet flow passage Fo3 flows out to the outside of the valve device 1 from the third fluid outlet portion 163.

As described above, when the operation mode of the valve device 1 is set to the third operation mode, the fluid flows into the valve device 1 from each of the first fluid inlet portion 151, the second fluid inlet portion 152, and the fourth fluid inlet portion 154. The fluid having flowed into the valve device 1 from the first fluid inlet portion 151 flows out to the outside of the valve device 1 from the second fluid outlet portion 162. The fluid having flowed into the valve device 1 from the second fluid inlet portion 152 flows out to the outside of the valve device 1 from the first fluid outlet portion 161. The fluid having flowed into the valve device 1 from the fourth fluid inlet portion 154 flows out to the outside of the valve device 1 from the third fluid outlet portion 163.

Next, the fourth operation mode will be described. When the operation mode of the valve device 1 is set to the fourth operation mode, the lower movable disk 30 is positioned at the rotational position illustrated in the fourth operation mode of FIG. 20.

Specifically, when the operation mode is set to the fourth operation mode, the lower movable disk 30 is positioned at a rotational position where the lower flow passage through-hole 34 communicates with only the second outlet flow hole 262. The lower movable disk 30 is positioned at a rotational position where the first lower communication hole 351 communicates with the fourth inlet flow hole 254 and the first outlet flow hole 261. The lower movable disk 30 is positioned at a rotational position where the second lower communication hole 352 communicates with only the third outlet flow hole 263.

Accordingly, the lower flow passage through-hole 34 communicates with only the second outlet flow passage Fo2. Then, the second outlet flow passage Fo2 communicates with the first fluid inlet portion 151 via the central flow passage Fc. The first lower communication hole 351 allows the fourth inlet flow passage Fi4 and the first outlet flow passage Fo1 to communicate with each other. Then, the first outlet flow passage Fo1 communicates with the fourth fluid inlet portion 154 via the fourth inlet flow passage Fi4. The second lower communication hole 352 communicates with only the third outlet flow passage Fo3. Then, the third outlet flow passage Fo3 is closed by the second lower communication hole 352 and the lower sliding surface 31.

When the operation mode is set to the fourth operation mode, the second inlet flow hole 252 faces a portion of the lower sliding surface 31 where none of the lower flow passage through-hole 34, the first lower communication hole 351, and the second lower communication hole 352 are formed. Thus, when the operation mode is set to the fourth operation mode, the second inlet flow passage Fi2 is closed by the lower sliding surface 31.

Therefore, when the operation mode of the valve device 1 is set to the fourth operation mode, the fluid having flowed into the valve device 1 from the first fluid inlet portion 151 passes through the central flow passage Fc and the lower flow passage through-hole 34, and flows to the second outlet flow passage Fo2 in the lower flow passage Fb. The fluid having flowed into the second outlet flow passage Fo2 flows out to the outside of the valve device 1 from the second fluid outlet portion 162.

The fluid having flowed into the valve device 1 from the fourth fluid inlet portion 154 passes through the fourth inlet flow passage Fi4 and the first lower communication hole 351, and flows to the first outlet flow passage Fo1 in the lower flow passage Fb. The fluid having flowed into the first outlet flow passage Fo1 flows out to the outside of the valve device 1 from the first fluid outlet portion 161.

However, the fluid having flowed into the valve device 1 from the second fluid inlet portion 152 is blocked by the lower movable disk 30, and does not flow out from the first fluid outlet portion 161, the second fluid outlet portion 162, and the third fluid outlet portion 163.

As described above, when the operation mode of the valve device 1 is set to the fourth operation mode, the fluid flows into the valve device 1 from each of the first fluid inlet portion 151 and the fourth fluid inlet portion 154. The fluid having flowed into the valve device 1 from the first fluid inlet portion 151 flows out to the outside of the valve device 1 from the second fluid outlet portion 162. The fluid having flowed into the valve device 1 from the fourth fluid inlet portion 154 flows out to the outside of the valve device 1 from the first fluid outlet portion 161. However, the fluid does not flow into the valve device 1 from the second fluid inlet portion 152 closed by the lower movable disk 30.

Next, the fifth operation mode will be described. When the operation mode of the valve device 1 is set to the fifth operation mode, the lower movable disk 30 is positioned at the rotational position illustrated in the fifth operation mode of FIG. 20.

Specifically, when the operation mode is set to the fifth operation mode, the lower movable disk 30 is positioned at a rotational position where the lower flow passage through-hole 34 communicates with only the first outlet flow hole 261. The lower movable disk 30 is positioned at a rotational position where the first lower communication hole 351 communicates with the fourth inlet flow hole 254 and the third outlet flow hole 263. The lower movable disk 30 is positioned at a rotational position where the second lower communication hole 352 communicates with the second outlet flow hole 262 and the third outlet flow hole 263.

Accordingly, the lower flow passage through-hole 34 communicates with only the first outlet flow passage Fo1. Then, the first outlet flow passage Fo1 communicates with the first fluid inlet portion 151 via the central flow passage Fc. The first lower communication hole 351 allows the fourth inlet flow passage Fi4 and the third outlet flow passage Fo3 to communicate with each other. Then, the third outlet flow passage Fo3 communicates with the fourth fluid inlet portion 154 via the fourth inlet flow passage Fi4. The second lower communication hole 352 communicates with the second outlet flow passage Fo2 and the third outlet flow passage Fo3. Then, the second outlet flow passage Fo2 communicates with the fourth fluid inlet portion 154 via the third outlet flow passage Fo3, the first lower communication hole 351, and the fourth inlet flow passage Fi4.

When the operation mode is set to the fifth operation mode, the second inlet flow hole 252 faces a portion of the lower sliding surface 31 where none of the lower flow passage through-hole 34, the first lower communication hole 351, and the second lower communication hole 352 are formed. Thus, when the operation mode is set to the fifth operation mode, the second inlet flow passage Fi2 is closed by the lower sliding surface 31.

Therefore, when the operation mode of the valve device 1 is set to the fifth operation mode, the fluid having flowed into the valve device 1 from the first fluid inlet portion 151 passes through the central flow passage Fc and the lower flow passage through-hole 34, and flows to the first outlet flow passage Fo1 in the lower flow passage Fb. The fluid having flowed into the first outlet flow passage Fo1 flows out to the outside of the valve device 1 from the first fluid outlet portion 161.

The fluid having flowed into the valve device 1 from the fourth fluid inlet portion 154 passes through the fourth inlet flow passage Fi4 and the first lower communication hole 351, and flows to the third outlet flow passage Fo3 in the lower flow passage Fb. Part of the fluid having flowed into the third outlet flow passage Fo3 flows out to the outside of the valve device 1 from the third fluid outlet portion 163, and the rest of the fluid passes through the lower flow passage through-hole 34 and flows into the second outlet flow passage Fo2 in the lower flow passage Fb. The fluid having flowed into the second outlet flow passage Fo2 flows out to the outside of the valve device 1 from the second fluid outlet portion 162.

As described above, when the operation mode of the valve device 1 is set to the fifth operation mode, the fluid flows into the valve device 1 from each of the first fluid inlet portion 151 and the fourth fluid inlet portion 154. The fluid having flowed into the valve device 1 from the first fluid inlet portion 151 flows out to the outside of the valve device 1 from the first fluid outlet portion 161. The fluid having flowed into the valve device 1 from the fourth fluid inlet portion 154 flows out to the outside of the valve device 1 from the second fluid outlet portion 162 and the third fluid outlet portion 163. However, the fluid does not flow into the valve device 1 from the second fluid inlet portion 152 closed by the lower movable disk 30.

Next, the sixth operation mode will be described. When the operation mode of the valve device 1 is set to the sixth operation mode, the lower movable disk 30 is positioned at the rotational position illustrated in the sixth operation mode of FIG. 20.

Specifically, when the operation mode is set to the sixth operation mode, the lower movable disk 30 is positioned at a rotational position where the lower flow passage through-hole 34 communicates with the second outlet flow hole 262 and the third outlet flow hole 263. The lower movable disk 30 is positioned at a rotational position where the first lower communication hole 351 communicates with the second inlet flow hole 252 and the first outlet flow hole 261. The lower movable disk 30 is positioned at a rotational position where the second lower communication hole 352 communicates with the fourth inlet flow hole 254 and the third outlet flow hole 263.

Accordingly, the lower flow passage through-hole 34 communicates with the second outlet flow passage Fo2 and the third outlet flow passage Fo3. Then, the second outlet flow passage Fo2 and the third outlet flow passage Fo3 communicate with the first fluid inlet portion 151 via the central flow passage Fc. The first lower communication hole 351 allows the second inlet flow passage Fi2 and the first outlet flow passage Fo1 to communicate with each other. Then, the first outlet flow passage Fo1 communicates with the second fluid inlet portion 152 via the second inlet flow passage Fi2. The second lower communication hole 352 allows the fourth inlet flow passage Fi4 and the third outlet flow passage Fo3 to communicate with each other. Then, the third outlet flow passage Fo3 communicates with the fourth fluid inlet portion 154 via the fourth inlet flow passage Fi4.

Therefore, when the operation mode of the valve device 1 is set to the sixth operation mode, the fluid having flowed into the valve device 1 from the first fluid inlet portion 151 passes through the central flow passage Fc and the lower flow passage through-hole 34, and flows to the second outlet flow passage Fo2 and the third outlet flow passage Fo3 in the lower flow passage Fb. The fluid having flowed into the second outlet flow passage Fo2 flows out to the outside of the valve device 1 from the second fluid outlet portion 162. The fluid having flowed into the third outlet flow passage Fo3 flows out to the outside of the valve device 1 from the third fluid outlet portion 163.

The fluid having flowed into the valve device 1 from the second fluid inlet portion 152 passes through the second inlet flow passage Fi2 and the first lower communication hole 351, and flows to the first outlet flow passage Fo1 in the lower flow passage Fb. The fluid having flowed into the first outlet flow passage Fo1 flows out to the outside of the valve device 1 from the first fluid outlet portion 161.

The fluid having flowed into the valve device 1 from the fourth fluid inlet portion 154 passes through the fourth inlet flow passage Fi4 and the second lower communication hole 352, and flows to the third outlet flow passage Fo3 in the lower flow passage Fb. The fluid having flowed into the third outlet flow passage Fo3 flows out to the outside of the valve device 1 from the third fluid outlet portion 163.

As described above, the valve device 1 switches the operation mode to switch each of the respective fluid outlet portions communicating with the first fluid inlet portion 151, the second fluid inlet portion 152, and the fourth fluid inlet portion 154 to any of the first fluid outlet portion 161, the second fluid outlet portion 162, and the third fluid outlet portion 163. Thus, the valve device 1 can switch the fluid passage of the cooling water flowing in the fluid circulation system. The valve device 1 can close the second fluid inlet portion 152, the fourth fluid inlet portion 154, the second fluid outlet portion 162, and the third fluid outlet portion 163 in accordance with the operation modes.

Other configurations are similar to those in the first embodiment. As in the first embodiment, the valve device 1 of the present embodiment can obtain operation and effects exhibited through a configuration similar to or equivalent to that of the first embodiment.

Third Embodiment

Next, a third embodiment will be described with reference to FIGS. 21 to 25. The present embodiment is different from the first embodiment in that a fifth fluid inlet portion 155 and a seventh fluid outlet portion 167 are also provided in the lower housing 11. The present embodiment is also different from the first embodiment in the shapes of the lower stationary disk 20 and the lower movable disk 30. Others are similar to those of the first embodiment. Thus, in the present embodiment, parts different from those of the first embodiment will be mainly described, and description of parts similar to those of the first embodiment may be omitted as appropriate.

Figure 21:
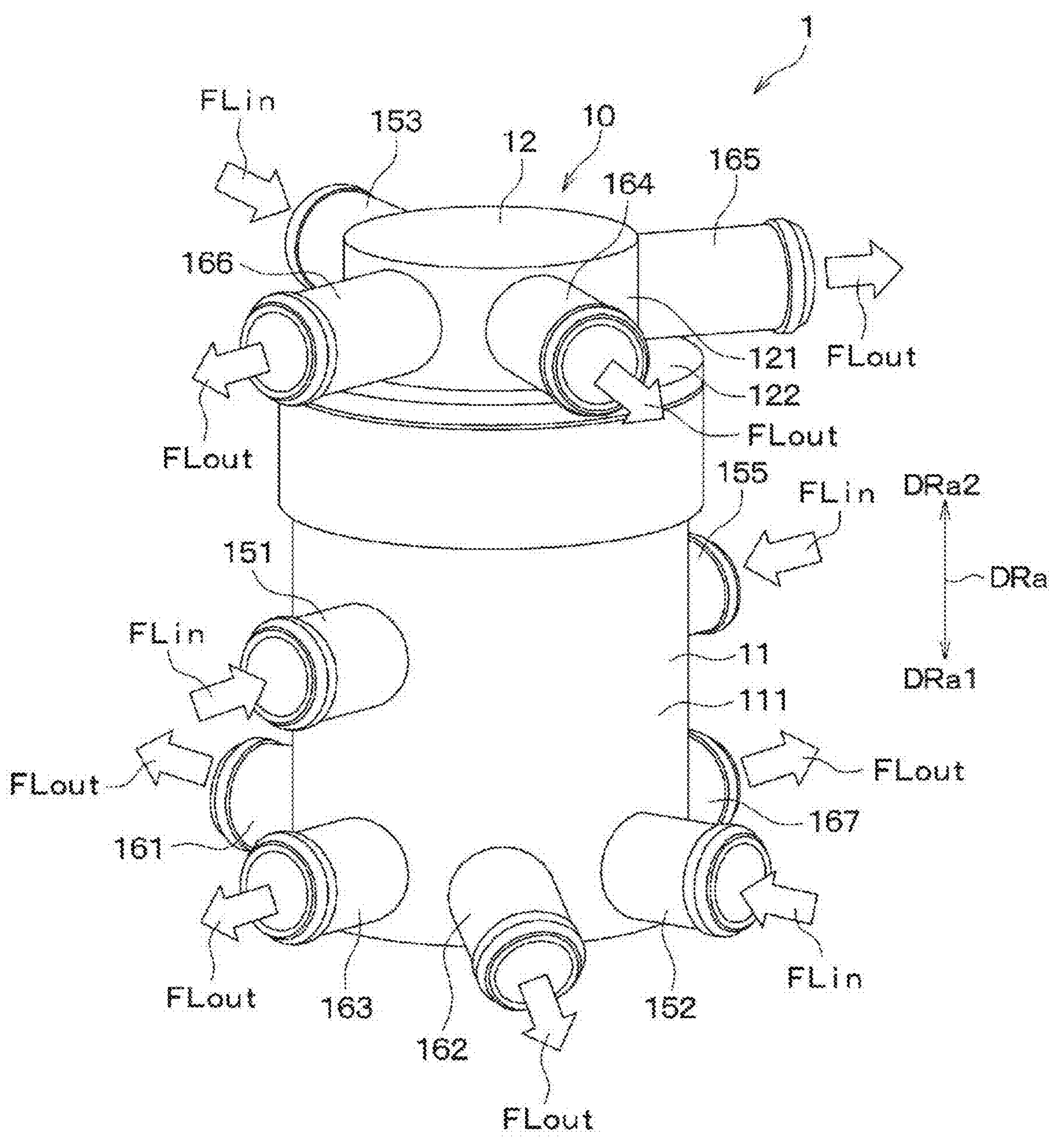
FIG. 21 is an external view of a valve device according to a third embodiment.
Figure 22:
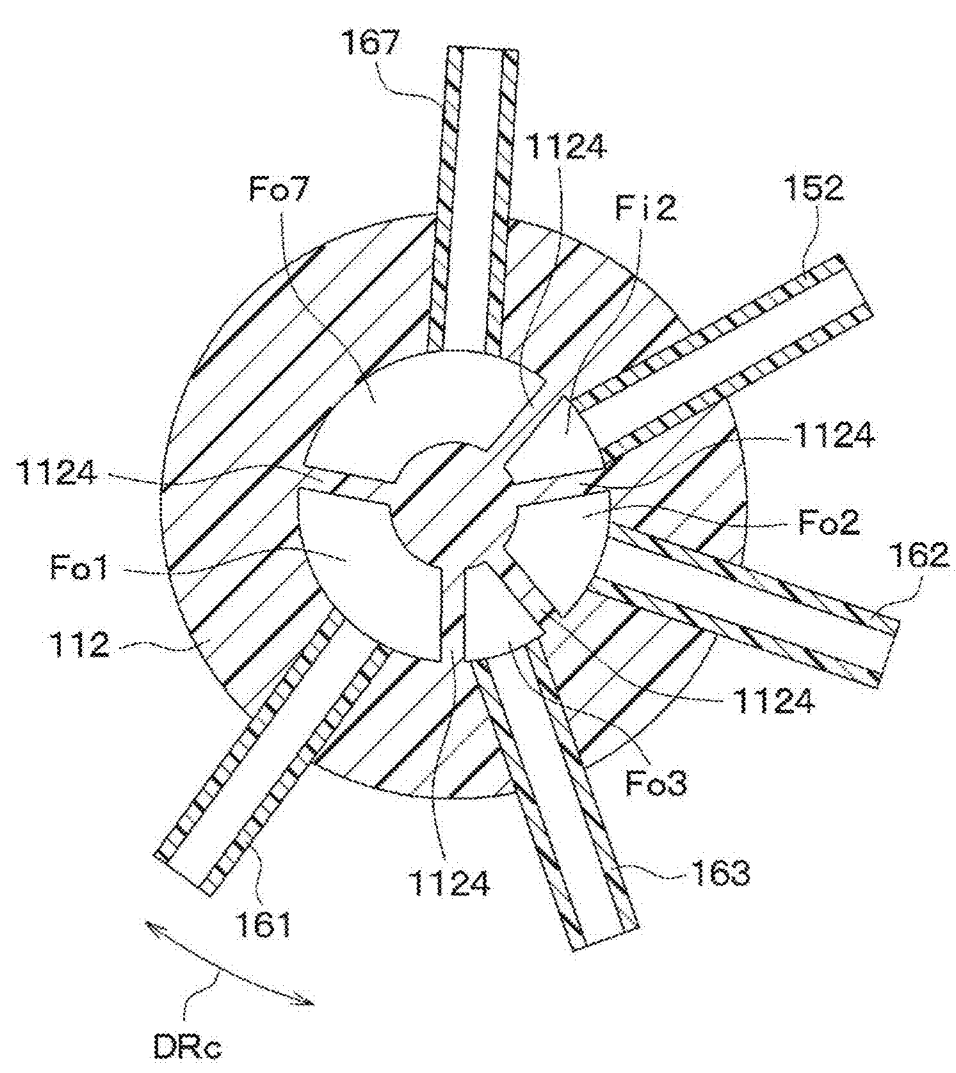
FIG. 22 is a view corresponding to FIG. 4, in the valve device according to the third embodiment.

As illustrated in FIGS. 21 and 22, the lower side wall portion 111 of the present embodiment is provided with the fifth fluid inlet portion 155 and the seventh fluid outlet portion 167, in addition to the first fluid inlet portion 151, the second fluid inlet portion 152, the first fluid outlet portion 161, the second fluid outlet portion 162, and the third fluid outlet portion 163. The fifth fluid inlet portion 155 is an inlet port that functions as an inlet through which the fluid flows into the flow passage F inside the housing 10. The seventh fluid outlet portion 167 is an outlet port that functions as an outlet through which the fluid allowed to flow into the flow passage F inside the housing 10 flows out to the outside of the valve device 1.

The fifth fluid inlet portion 155 is formed on the upper direction DRa2 side with respect to the lower stationary disk 20 and the lower movable disk 30. The fifth fluid inlet portion 155 is arranged side by side with the first fluid inlet portion 151 along the circumferential direction DRc in the outer peripheral portion of the lower housing 11, and the fifth fluid inlet portion 155 and the first fluid inlet portion 151 are provided at a predetermined interval. Specifically, the first fluid inlet portion 151 and the fifth fluid inlet portion 155 are provided side by side along the circumferential direction DRc at an interval of about 180°. The fifth fluid inlet portion 155 communicates with the central flow passage Fc. The first fluid inlet portion 151 and the fifth fluid inlet portion 155 communicate with the central flow passage Fc as inlet ports. The first fluid inlet portion 151 and the fifth fluid inlet portion 155 communicate with each other via the central flow passage Fc.

In the present embodiment, the first fluid outlet portion 161, the third fluid outlet portion 163, the second fluid outlet portion 162, the second fluid inlet portion 152, and the seventh fluid outlet portion 167 are provided side by side in this order at predetermined intervals along the circumferential direction DRc, in the outer peripheral portion of the lower housing 11. Specifically, the first fluid outlet portion 161, the third fluid outlet portion 163, the second fluid outlet portion 162, the second fluid inlet portion 152, and the seventh fluid outlet portion 167 are arranged side by side at intervals of about 60°. The seventh fluid outlet portion 167 is formed on the lower direction DRa1 side with respect to the lower stationary disk 20 and the lower movable disk 30. The seventh fluid outlet portion 167 communicates with the lower flow passage Fb.

In the present embodiment, the fifth fluid inlet portion 155 and the seventh fluid outlet portion 167 function as openings. The seventh fluid outlet portion 167 functions as a one-side opening.

The lower bottom wall portion 112 is formed with a seventh outlet flow passage Fo7 communicating with the seventh fluid outlet portion 167. The seventh outlet flow passage Fo7 is formed on the lower direction DRa1 side with respect to the lower stationary disk 20. The first outlet flow passage Fo1, the third outlet flow passage Fo3, the second outlet flow passage Fo2, the second inlet flow passage Fi2, and the seventh outlet flow passage Fo7 are partitioned by five lower partition walls 1124 provided in the lower bottom wall portion 112. In other words, in the flow passage F inside the housing 10, the lower flow passage Fb is partitioned into the first outlet flow passage Fo1, the third outlet flow passage Fo3, the second outlet flow passage Fo2, the second inlet flow passage Fi2, and the seventh outlet flow passage Fo7 by the five lower partition walls 1124. In the present embodiment, the first outlet flow passage Fo1, the third outlet flow passage Fo3, the second outlet flow passage Fo2, the second inlet flow passage Fi2, and the seventh outlet flow passage Fo7 are formed side by side in this order along the circumferential direction DRc.

The seventh outlet flow passage Fo7 is formed such that a cross section in a direction orthogonal to the axial direction DRa thereof has a substantially sector shape, and is formed such that a flow passage cross-sectional area thereof is larger than each of the respective flow passage cross-sectional areas of the first outlet flow passage Fo1, the third outlet flow passage Fo3, the second outlet flow passage Fo2, and the second inlet flow passage Fi2.

The first outlet flow passage Fo1 is formed such that the flow passage cross-sectional area thereof is larger than each of the respective flow passage cross-sectional areas of the third outlet flow passage Fo3, the second inlet flow passage Fi2, and the second outlet flow passage Fo2. The second outlet flow passage Fo2 is formed such that the flow passage cross-sectional area thereof is larger than each of the respective flow passage cross-sectional areas of the second inlet flow passage Fi2 and the third outlet flow passage Fo3. The second inlet flow passage Fi2 and the third outlet flow passage Fo3 are formed such that the respective flow passage cross-sectional areas thereof have substantially the same size.

The five lower partition walls 1124 are provided at respective positions corresponding to five lower partition portions 24 of the lower stationary disk 20. Ends of the five lower partition walls 1124 on the lower stationary disk 20 side are fixed in a state where each of respective orientations thereof coincides with a corresponding one of respective orientations of the five lower partition portions 24 of the lower stationary disk 20. The seventh outlet flow passage Fo7 communicates with a seventh outlet flow hole 267, which will be described later, of the lower stationary disk 20. The seventh outlet flow passage Fo7 functions as a one-side flow passage.

Figure 23:
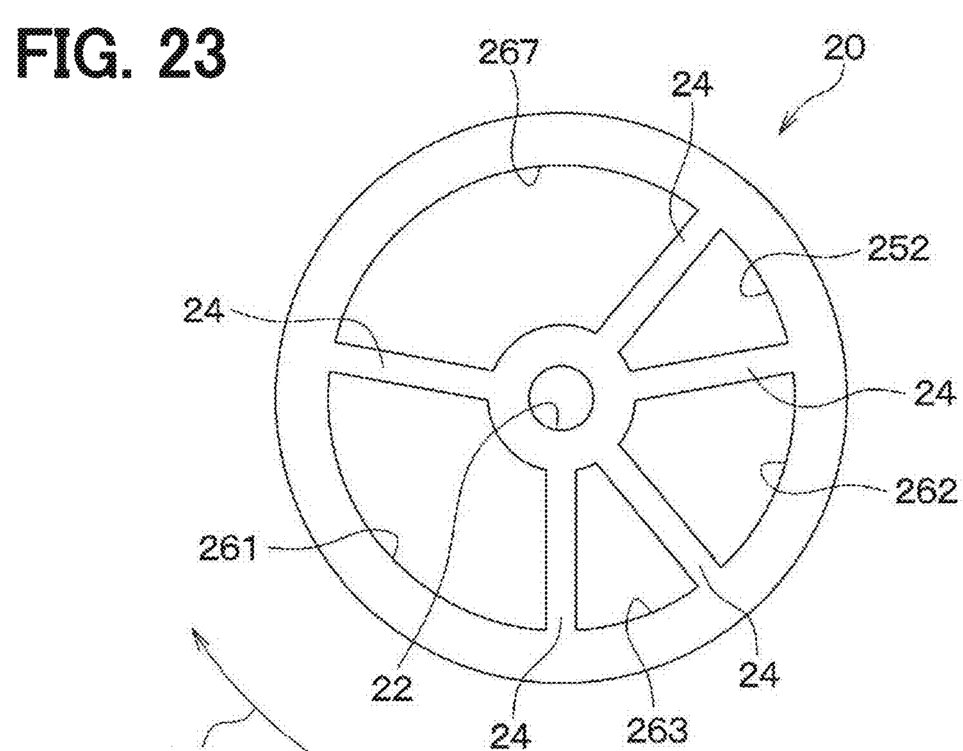
FIG. 23 is a top view of a lower stationary disk according to the third embodiment.

As illustrated in FIG. 23, the lower stationary disk 20 of the present embodiment is formed with the seventh outlet flow hole 267, in addition to the first outlet flow hole 261, the third outlet flow hole 263, the second outlet flow hole 262, and the second inlet flow hole 252. The seventh outlet flow hole 267 is formed through the lower stationary disk 20 in the axial direction DRa, and the fluid can pass therethrough. The seventh outlet flow hole 267 is formed such that a cross section in a direction orthogonal to the axial direction DRa thereof has a substantially sector shape.

The first outlet flow hole 261, the third outlet flow hole 263, the second outlet flow hole 262, the second inlet flow hole 252, and the seventh outlet flow hole 267 are formed side by side in this order. The lower stationary disk 20 has each of the five lower partition portions 24 provided between the corresponding ones of the first outlet flow hole 261, the third outlet flow hole 263, the second outlet flow hole 262, the second inlet flow hole 252, and the seventh outlet flow hole 267.

The first outlet flow hole 261, the third outlet flow hole 263, the second outlet flow hole 262, the second inlet flow hole 252, and the seventh outlet flow hole 267 are arranged alternately with the five lower partition portions 24 in the circumferential direction DRc along the entire circumference of the lower stationary disk 20.

The seventh outlet flow hole 267 has a flow passage cross-sectional area corresponding to the flow passage cross-sectional area of the seventh outlet flow passage Fo7, and communicates with the seventh fluid outlet portion 167 via the seventh outlet flow passage Fo7. The seventh outlet flow hole 267 in the present embodiment functions as a first flow passage hole. In the lower stationary disk 20 illustrated in FIG. 23, the lower protrusion 23 is omitted.

Figure 24:
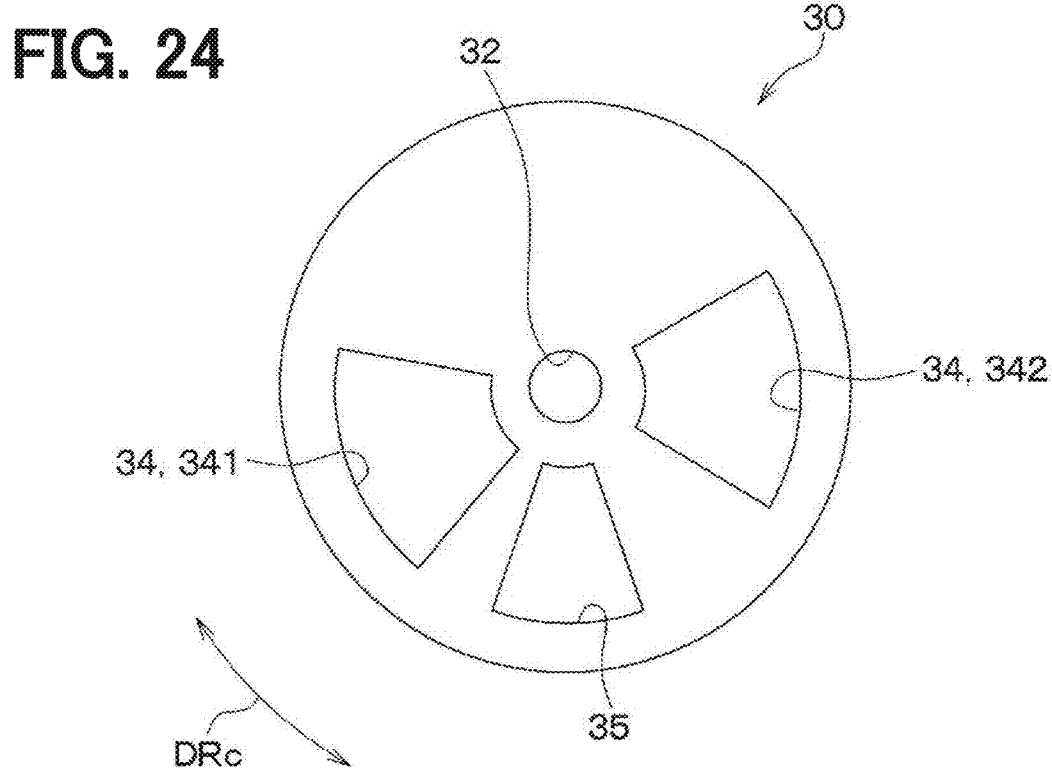
FIG. 24 is a bottom view of a lower movable disk according to the third embodiment.

As illustrated in FIG. 24, the lower movable disk 30 of the present embodiment has two lower flow passage through-holes 34 extending through the lower movable disk 30 in the axial direction DRa, and one lower flow passage communication hole 35 not extending through the lower movable disk 30. The two lower flow passage through-holes 34 each are formed such that a cross section in a direction orthogonal to the axial direction DRa thereof has a substantially sector shape.

The two lower flow passage through-holes 34 each are formed such that the cross section in the direction orthogonal to the axial direction DRa thereof is larger than the cross section in the direction orthogonal to the axial direction DRa of the lower flow passage communication hole 35. The two lower flow passage through-holes 34 are formed such that the respective cross sections in the direction orthogonal to the axial direction DRa thereof have substantially the same size. Hereinafter, of the two lower flow passage through-holes 34, one is also referred to as a first lower through-hole 341, and the other is also referred to as the second lower through-hole 342. The first lower through-hole 341, the lower flow passage communication hole 35, and the second lower through-hole 342 are formed side by side in this order at predetermined intervals along the circumferential direction DRc.

The first lower through-hole 341 and the second lower through-hole 342 are formed through the lower movable disk 30, and each are formed such that the fluid can pass through the lower stationary disk 20. In each of the first lower through-hole 341 and the second lower through-hole 342, the lower direction DRa1 side communicates with any of the second inlet flow hole 252, the first outlet flow hole 261, the second outlet flow hole 262, the third outlet flow hole 263, and the seventh outlet flow hole 267. In each of the first lower through-hole 341 and the second lower through-hole 342, the upper direction DRa2 side communicates with the central flow passage Fc.

The first lower through-hole 341 and the second lower through-hole 342 each are formed such that a flow passage cross-sectional area thereof is larger than each of the respective flow passage cross-sectional areas of the second inlet flow hole 252, the second outlet flow hole 262, and the third outlet flow hole 263. Each of the first lower through-hole 341 and the second lower through-hole 342 is formed to be superimposable entirely across each of the second inlet flow hole 252, the second outlet flow hole 262, and the third outlet flow hole 263.

On the other hand, the first lower through-hole 341 and the second lower through-hole 342 each are formed such that the flow passage cross-sectional area thereof is smaller than each of the respective flow passage cross-sectional areas of the first outlet flow hole 261 and the seventh outlet flow hole 267. Each of the first lower through-hole 341 and the second lower through-hole 342 is formed not to be superimposable entirely across each of the first outlet flow hole 261 and the seventh outlet flow hole 267.

Each of the first lower through-hole 341 and the second lower through-hole 342 is formed to be able to communicate with any one or two of the first outlet flow hole 261, the third outlet flow hole 263, the second outlet flow hole 262, the second inlet flow hole 252, and the seventh outlet flow hole 267 in accordance with the rotational position of the lower movable disk 30. Specifically, in a case where the first lower through-hole 341 or the second lower through-hole 342 overlaps only any one of the first outlet flow hole 261, the third outlet flow hole 263, the second outlet flow hole 262, the second inlet flow hole 252, and the seventh outlet flow hole 267 in the axial direction DRa, the first lower through-hole 341 or the second lower through-hole 342 communicates with only this overlapped flow hole. In a case where the first lower through-hole 341 or the second lower through-hole 342 spans and overlaps two of the first outlet flow hole 261, the third outlet flow hole 263, the second outlet flow hole 262, the second inlet flow hole 252, and the seventh outlet flow hole 267 in the axial direction DRa, the first lower through-hole 341 or the second lower through-hole 342 communicates with these two spanned flow holes.

In other words, the lower movable disk 30 has the first lower through-hole 341 and the second lower through-hole 342 each of which communicates with at least one of the first outlet flow hole 261, the third outlet flow hole 263, the second outlet flow hole 262, the second inlet flow hole 252, or the seventh outlet flow hole 267 through the rotation of the lower movable disk 30 caused along with the rotation of the shaft 61.

In the present embodiment, a rotational range of the lower movable disk 30 is determined in advance, and the first lower through-hole 341 is configured to be able to communicate with any one or two of the first outlet flow hole 261, the second outlet flow hole 262, and the third outlet flow hole 263. The first lower through-hole 341 is configured to be unable to communicate with the second inlet flow hole 252 and the seventh outlet flow passage Fo7. That is, the first lower through-hole 341 is configured to be unable to communicate with the second fluid inlet portion 152 via the second inlet flow passage Fi2, and is configured to be unable to communicate with the seventh fluid outlet portion 167 via the seventh outlet flow passage Fo7.

Therefore, when the lower movable disk 30 is caused to rotate and then is caused to stop at a predetermined position, the first lower through-hole 341 communicates with any one or two of the first outlet flow hole 261, the second outlet flow hole 262, and the third outlet flow hole 263. The first lower through-hole 341 communicates with the flow passage(s) corresponding to the flow hole(s) with which the first lower through-hole 341 communicates, among the first outlet flow passage Fo1, the second outlet flow passage Fo2, and the third outlet flow passage Fo3. As a result, the first lower through-hole 341 allows communication between the central flow passage Fc and the flow passage(s) with which the first lower through-hole 341 communicates, among the first outlet flow passage Fo1, the second outlet flow passage Fo2, and the third outlet flow passage Fo3.

The second lower through-hole 342 is configured to be able to communicate with any one, two, or three of the second inlet flow hole 252, the second outlet flow hole 262, and the seventh outlet flow hole 267. The second lower through-hole 342 is configured to be unable to communicate with the first outlet flow hole 261 and the third outlet flow passage Fo3. That is, the second lower through-hole 342 is configured to be unable to communicate with the first fluid outlet portion 161 via the first outlet flow passage Fo1, and is configured to be unable to communicate with the third fluid outlet portion 163 via the third outlet flow passage Fo3.

Therefore, when the lower movable disk 30 is caused to rotate and then is caused to stop at a predetermined position, the second lower through-hole 342 communicates with any one, two, or three of the second inlet flow hole 252, the second outlet flow hole 262, and the seventh outlet flow hole 267. The second lower through-hole 342 communicates with the flow passage(s) corresponding to the flow hole(s) with which the second lower through-hole 342 communicates, among the second inlet flow passage Fi2, the second outlet flow passage Fo2, and the seventh outlet flow passage Fo7. As a result, the second lower through-hole 342 allows communication between the central flow passage Fc and the flow passage(s) with which the second lower through-hole 342 communicates, among the second inlet flow passage Fi2, the second outlet flow passage Fo2, and the seventh outlet flow passage Fo7.

The lower flow passage communication hole 35 is formed by recessing a portion of the lower sliding surface 31, which is on a side where sliding with respect to the lower stationary disk 20 is performed. That is, the lower flow passage communication hole 35 is formed without extending through the lower movable disk 30.

The lower flow passage communication hole 35 is formed to have a flow passage cross-sectional area slightly larger than each of the respective flow passage cross-sectional areas of the second inlet flow hole 252 and the third outlet flow hole 263, and is formed to be superimposable entirely across each of the second inlet flow hole 252 and the third outlet flow hole 263. On the other hand, the lower flow passage communication hole 35 is formed such that the flow passage cross-sectional area thereof is smaller than each of the respective flow passage cross-sectional areas of the first outlet flow hole 261, the second outlet flow hole 262, and the seventh outlet flow hole 267. The lower flow passage communication hole 35 is formed not to be superimposable entirely across each of the first outlet flow hole 261, the second outlet flow hole 262, and the seventh outlet flow hole 267.

The lower flow passage communication hole 35 is formed to be able to communicate with any one or two of the first outlet flow hole 261, the third outlet flow hole 263, the second outlet flow hole 262, the second inlet flow hole 252, and the seventh outlet flow hole 267 in accordance with the rotational position of the lower movable disk 30. Specifically, in a case where the lower flow passage communication hole 35 overlaps only any one of the first outlet flow hole 261, the third outlet flow hole 263, the second outlet flow hole 262, the second inlet flow hole 252, and the seventh outlet flow hole 267 in the axial direction DRa, the lower flow passage communication hole 35 communicates with only this overlapped flow hole. In a case where the lower flow passage communication hole 35 spans and overlaps two of the first outlet flow hole 261, the third outlet flow hole 263, the second outlet flow hole 262, the second inlet flow hole 252, and the seventh outlet flow hole 267 in the axial direction DRa, the lower flow passage communication hole 35 allows these two spanned flow holes to communicate with each other.

In other words, the lower movable disk 30 has the lower flow passage communication hole 35 that communicates with at least one of the first outlet flow hole 261, the third outlet flow hole 263, the second outlet flow hole 262, the second inlet flow hole 252, or the seventh outlet flow hole 267 through the rotation of the lower movable disk 30 caused along with the rotation of the shaft 61.

In the present embodiment, a rotational range of the lower movable disk 30 is determined in advance, and the lower flow passage communication hole 35 is configured to be able to communicate with any one or two of the first outlet flow hole 261, the second outlet flow hole 262, and the third outlet flow hole 263. The lower flow passage communication hole 35 is configured to be able to communicate with the seventh outlet flow hole 267. The lower flow passage communication hole 35 is configured to be unable to communicate with the seventh outlet flow passage Fo7.

Therefore, in a case where the lower movable disk 30 is caused to rotate and then is caused to stop at a predetermined position and the lower flow passage communication hole 35 communicates with only any one of the first outlet flow hole 261, the second outlet flow hole 262, and the third outlet flow hole 263, the lower flow passage communication hole 35 does not allow the flow hole with which the lower flow passage communication hole 35 communicates to communicate with other flow holes. That is, the lower flow passage communication hole 35 closes the flow hole with which the lower flow passage communication hole 35 communicates, among the first outlet flow hole 261, the second outlet flow hole 262, and the third outlet flow hole 263. Thus, the lower flow passage communication hole 35 does not allow the flow passage with which the lower flow passage communication hole 35 communicates, among the first outlet flow passage Fo1, the second outlet flow passage Fo2, and the third outlet flow passage Fo3, to communicate with other flow passages.

In a case where the lower movable disk 30 is caused to rotate and then is caused to stop at a predetermined position and the lower flow passage communication hole 35 communicates with the first outlet flow hole 261 and the third outlet flow hole 263, the lower flow passage communication hole 35 allows the first outlet flow hole 261 and the third outlet flow hole 263 to communicate with each other. The lower flow passage communication hole 35 communicates with the first outlet flow passage Fo1 and the third outlet flow passage Fo3, and allows the first outlet flow passage Fo1 and the third outlet flow passage Fo3 to communicate with each other.

In a case where the lower movable disk 30 is caused to rotate and then is caused to stop at a predetermined position and the lower flow passage communication hole 35 communicates with the second outlet flow hole 262 and the third outlet flow hole 263, the lower flow passage communication hole 35 allows the second outlet flow hole 262 and the third outlet flow hole 263 to communicate with each other. The lower flow passage communication hole 35 communicates with the second outlet flow passage Fo2 and the third outlet flow passage Fo3, and allows the second outlet flow passage Fo2 and the third outlet flow passage Fo3 to communicate with each other.

In a case where the lower movable disk 30 is caused to rotate and then is caused to stop at a predetermined position and the lower flow passage communication hole 35 communicates with the second inlet flow hole 252 and the seventh outlet flow hole 267, the lower flow passage communication hole 35 allows the second inlet flow hole 252 and the seventh outlet flow hole 267 to communicate with each other. The lower flow passage communication hole 35 communicates with the second inlet flow passage Fi2 and the seventh outlet flow passage Fo7, and allows the second inlet flow passage Fi2 and the seventh outlet flow passage Fo7 to communicate with each other.

The valve device 1 of the present embodiment can switch the operation mode to any of a first operation mode, a second operation mode, a third operation mode, a fourth operation mode, a fifth operation mode, and a sixth operation mode by causing the lower movable disk 30 and the upper movable disk 50 to rotate. The rotational position of the lower movable disk 30 and the flow of the fluid flowing through the flow passage F in each specific operation mode will be described with reference to FIG. 25.

In FIG. 25, for purposes of clarity of the drawing, respective portions in which the first lower through-hole 341, the second lower through-hole 342, and the lower flow passage communication hole 35 are superimposed on the lower stationary disk 20 are shaded with dots. In the present embodiment, since the shapes of the upper housing 12, the upper stationary disk 40, and the upper movable disk 50 are similar to those of the first embodiment, the description of the flow of the fluid flowing through the upper flow passage Fa will be omitted.

First, the first operation mode will be described. When the operation mode of the valve device 1 is set to the first operation mode, the lower movable disk 30 is positioned at the rotational position illustrated in the first operation mode of FIG. 25.

Specifically, when the operation mode is set to the first operation mode, the lower movable disk 30 is positioned at a rotational position where the first lower through-hole 341 communicates with only the first outlet flow hole 261. The lower movable disk 30 is positioned at a rotational position where the second lower through-hole 342 communicates with the second inlet flow hole 252 and the second outlet flow hole 262. The lower movable disk 30 is positioned at a rotational position where the lower flow passage communication hole 35 communicates with the first outlet flow hole 261 and the third outlet flow hole 263.

Accordingly, the first lower through-hole 341 communicates with only the first outlet flow passage Fo1. Then, the first outlet flow passage Fo1 communicates with the first fluid inlet portion 151 and the fifth fluid inlet portion 155 via the central flow passage Fc. The second lower through-hole 342 communicates with the second inlet flow passage Fi2 and the second outlet flow passage Fo2. Then, the second inlet flow passage Fi2 and the second outlet flow passage Fo2 communicate with the first fluid inlet portion 151 and the fifth fluid inlet portion 155 via the central flow passage Fc. The lower flow passage communication hole 35 allows the first outlet flow passage Fo1 and the third outlet flow passage Fo3 to communicate with each other. Then, the third outlet flow passage Fo3 communicates with the first fluid inlet portion 151 and the fifth fluid inlet portion 155 via the first outlet flow passage Fo1, the first lower through-hole 341, and the central flow passage Fc.

When the operation mode is set to the first operation mode, the seventh outlet flow hole 267 faces a portion of the lower sliding surface 31 where none of the first lower through-hole 341, the second lower through-hole 342, and the lower flow passage communication hole 35 are formed. Thus, when the operation mode is set to the first operation mode, the seventh outlet flow passage Fo7 is closed by the lower sliding surface 31.

Therefore, when the operation mode of the valve device 1 is set to the first operation mode, the fluid having flowed into the valve device 1 from each of the first fluid inlet portion 151 and the fifth fluid inlet portion 155 flows to the central flow passage Fc. The fluid having flowed into the valve device 1 from the second fluid inlet portion 152 passes through the second inlet flow passage Fi2 and the second lower through-hole 342, and flows into the central flow passage Fc. Thus, the respective fluids having flowed into the valve device 1 from the first fluid inlet portion 151, the second fluid inlet portion 152, and the fifth fluid inlet portion 155 merge with one another in the central flow passage Fc.

Part of the fluid having merged in the central flow passage Fc passes through the first lower through-hole 341 and flows to the first outlet flow passage Fo1 in the lower flow passage Fb, and the rest of the fluid passes through the second lower through-hole 342 and flows to the second outlet flow passage Fo2 in the lower flow passage Fb. The fluid having flowed into the first outlet flow passage Fo1 further diverges, and part of the fluid flows out to the outside of the valve device 1 from the first fluid outlet portion 161, and the rest of the fluid passes through the lower flow passage communication hole 35 and flows to the third outlet flow passage Fo3 in the lower flow passage Fb. The fluid having flowed into the second outlet flow passage Fo2 flows out to the outside of the valve device 1 from the second fluid outlet portion 162. The fluid having flowed into the third outlet flow passage Fo3 flows out to the outside of the valve device 1 from the third fluid outlet portion 163.

As described above, when the operation mode of the valve device 1 is set to the first operation mode, the fluid flows into the valve device 1 from each of the first fluid inlet portion 151, the second fluid inlet portion 152, and the fifth fluid inlet portion 155. The fluids having flowed into the valve device 1 from the first fluid inlet portion 151, the second fluid inlet portion 152, and the fifth fluid inlet portion 155 flow out to the outside of the valve device 1 from the first fluid outlet portion 161, the second fluid outlet portion 162, and the third fluid outlet portion 163. The fluid does not flow out to the outside of the valve device 1 from the seventh fluid outlet portion 167 closed by the lower movable disk 30.

Next, the second operation mode will be described. When the operation mode of the valve device 1 is set to the second operation mode, the lower movable disk 30 is positioned at the rotational position illustrated in the second operation mode of FIG. 25.

Specifically, when the operation mode is set to the second operation mode, the lower movable disk 30 is positioned at a rotational position where the first lower through-hole 341 communicates with only the first outlet flow hole 261. The lower movable disk 30 is positioned at a rotational position where the second lower through-hole 342 communicates with the second inlet flow hole 252 and the second outlet flow hole 262. The lower movable disk 30 is positioned at a rotational position where the lower flow passage communication hole 35 communicates with only the third outlet flow hole 263.

Accordingly, the first lower through-hole 341 communicates with only the first outlet flow passage Fo1. Then, the first outlet flow passage Fo1 communicates with the first fluid inlet portion 151 and the fifth fluid inlet portion 155 via the central flow passage Fc. The second lower through-hole 342 communicates with the second inlet flow passage Fi2 and the second outlet flow passage Fo2. Then, the second inlet flow passage Fi2 and the second outlet flow passage Fo2 communicate with the first fluid inlet portion 151 and the fifth fluid inlet portion 155 via the central flow passage Fc. The lower flow passage communication hole 35 communicates with only the third outlet flow passage Fo3. Then, the third outlet flow passage Fo3 is closed by the lower flow passage communication hole 35.

When the operation mode is set to the second operation mode, the seventh outlet flow hole 267 faces a portion of the lower sliding surface 31 where none of the first lower through-hole 341, the second lower through-hole 342, and the lower flow passage communication hole 35 are formed. Thus, when the operation mode is set to the second operation mode, the seventh outlet flow passage Fo7 is closed by the lower sliding surface 31.

Therefore, when the operation mode of the valve device 1 is set to the second operation mode, the fluid having flowed into the valve device 1 from each of the first fluid inlet portion 151 and the fifth fluid inlet portion 155 flows to the central flow passage Fc. The fluid having flowed into the valve device 1 from the second fluid inlet portion 152 passes through the second inlet flow passage Fi2 and the second lower through-hole 342, and flows into the central flow passage Fc. Thus, the respective fluids having flowed into the valve device 1 from the first fluid inlet portion 151, the second fluid inlet portion 152, and the fifth fluid inlet portion 155 merge with one another in the central flow passage Fc.

Part of the fluid having merged in the central flow passage Fc passes through the first lower through-hole 341 and flows to the first outlet flow passage Fo1 in the lower flow passage Fb, and the rest of the fluid passes through the second lower through-hole 342 and flows to the second outlet flow passage Fo2 in the lower flow passage Fb. The fluid having flowed into the first outlet flow passage Fo1 flows out to the outside of the valve device 1 from the first fluid outlet portion 161. The fluid having flowed into the second outlet flow passage Fo2 flows out to the outside of the valve device 1 from the second fluid outlet portion 162.

The lower flow passage communication hole 35 communicates with only the third outlet flow passage Fo3, and does not allow the third outlet flow passage Fo3 to communicate with the other outlet flow passages. Thus, the fluid is not allowed to flow out to the outside of the valve device 1 from the third outlet flow passage Fo3.

As described above, when the operation mode of the valve device 1 is set to the second operation mode, the fluid flows into the valve device 1 from each of the first fluid inlet portion 151, the second fluid inlet portion 152, and the fifth fluid inlet portion 155. The fluids having flowed into the valve device 1 from the first fluid inlet portion 151, the second fluid inlet portion 152, and the fifth fluid inlet portion 155 flow out to the outside of the valve device 1 from the first fluid inlet portion 151 and the second fluid inlet portion 152. The fluid does not flow out to the outside of the valve device 1 from the third fluid outlet portion 163 and the seventh fluid outlet portion 167 closed by the lower movable disk 30.

Next, the third operation mode will be described. When the operation mode of the valve device 1 is set to the third operation mode, the lower movable disk 30 is positioned at the rotational position illustrated in the third operation mode of FIG. 25.

Specifically, when the operation mode is set to the third operation mode, the lower movable disk 30 is positioned at a rotational position where the first lower through-hole 341 communicates with the second outlet flow hole 262 and the third outlet flow hole 263. The lower movable disk 30 is positioned at a rotational position where the second lower through-hole 342 communicates with only the seventh outlet flow hole 267. The lower movable disk 30 is positioned at a rotational position where the lower flow passage communication hole 35 communicates with the second inlet flow hole 252 and the seventh outlet flow hole 267.

Accordingly, the first lower through-hole 341 communicates with the second outlet flow passage Fo2 and the third outlet flow passage Fo3. Then, the second outlet flow passage Fo2 and the third outlet flow passage Fo3 communicate with the first fluid inlet portion 151 and the fifth fluid inlet portion 155 via the central flow passage Fc. The second lower through-hole 342 communicates with only the seventh outlet flow passage Fo7. Then, the seventh outlet flow passage Fo7 communicates with the first fluid inlet portion 151 and the fifth fluid inlet portion 155 via the central flow passage Fc. The lower flow passage communication hole 35 allows the second inlet flow passage Fi2 and the seventh outlet flow passage Fo7 to communicate with each other. Then, the seventh outlet flow passage Fo7 communicates with the second fluid inlet portion 152 via the second inlet flow passage Fi2.

When the operation mode is set to the third operation mode, the first outlet flow hole 261 faces a portion of the lower sliding surface 31 where none of the first lower through-hole 341, the second lower through-hole 342, and the lower flow passage communication hole 35 are formed. Thus, when the operation mode is set to the third operation mode, the first outlet flow passage Fo1 is closed by the lower sliding surface 31.

Therefore, when the operation mode of the valve device 1 is set to the third operation mode, the fluid having flowed into the valve device 1 from each of the first fluid inlet portion 151 and the fifth fluid inlet portion 155 flows to the central flow passage Fc. Thus, the respective fluids having flowed into the valve device 1 from the first fluid inlet portion 151 and the fifth fluid inlet portion 155 merge with each other in the central flow passage Fc.

Part of the fluid having merged in the central flow passage Fc passes through the first lower through-hole 341 and flows to the second outlet flow passage Fo2 and the third outlet flow passage Fo3 in the lower flow passage Fb, and the rest of the fluid passes through the second lower through-hole 342 and flows to the seventh outlet flow passage Fo7 in the lower flow passage Fb. The fluid having flowed into the second outlet flow passage Fo2 flows out to the outside of the valve device 1 from the second fluid outlet portion 162. The fluid having flowed into the third outlet flow passage Fo3 flows out to the outside of the valve device 1 from the third fluid outlet portion 163. The fluid having flowed into the seventh outlet flow passage Fo7 flows out to the outside of the valve device 1 from the seventh fluid outlet portion 167.

The fluid having flowed into the valve device 1 from the second fluid inlet portion 152 passes through the second inlet flow passage Fi2 and the lower flow passage communication hole 35. The fluid having passed through the lower flow passage communication hole 35 merges with the fluid having flowed in from the first fluid inlet portion 151 and the fifth fluid inlet portion 155 and having passed through the second lower through-hole 342, and flows to the seventh outlet flow passage Fo7 in the lower flow passage Fb. The fluid having flowed into the seventh outlet flow passage Fo7 flows out to the outside of the valve device 1 from the seventh fluid outlet portion 167.

As described above, when the operation mode of the valve device 1 is set to the third operation mode, the fluid flows into the valve device 1 from each of the first fluid inlet portion 151, the second fluid inlet portion 152, and the fifth fluid inlet portion 155. The fluids having flowed into the valve device 1 from the first fluid inlet portion 151 and the fifth fluid inlet portion 155 flow out to the outside of the valve device 1 from the second fluid outlet portion 162, the third fluid outlet portion 163, and the seventh fluid outlet portion 167. The fluid having flowed into the valve device 1 from the second fluid inlet portion 152 also flows out to the outside of the valve device 1 from the seventh fluid outlet portion 167. The fluid does not flow out to the outside of the valve device 1 from the first fluid outlet portion 161 closed by the lower movable disk 30.

Next, the fourth operation mode will be described. When the operation mode of the valve device 1 is set to the fourth operation mode, the lower movable disk 30 is positioned at the rotational position illustrated in the fourth operation mode of FIG. 25.

Specifically, when the operation mode is set to the fourth operation mode, the lower movable disk 30 is positioned at a rotational position where the first lower through-hole 341 communicates with only the second outlet flow hole 262. The lower movable disk 30 is positioned at a rotational position where the second lower through-hole 342 communicates with only the seventh outlet flow hole 267. The lower movable disk 30 is positioned at a rotational position where the lower flow passage communication hole 35 communicates with the second inlet flow hole 252 and the seventh outlet flow hole 267.

Accordingly, the first lower through-hole 341 communicates with only the second outlet flow passage Fo2. Then, the second outlet flow passage Fo2 communicates with the first fluid inlet portion 151 and the fifth fluid inlet portion 155 via the central flow passage Fc. The second lower through-hole 342 communicates with only the seventh outlet flow passage Fo7. Then, the seventh outlet flow passage Fo7 communicates with the first fluid inlet portion 151 and the fifth fluid inlet portion 155 via the central flow passage Fc. The lower flow passage communication hole 35 allows the second inlet flow passage Fi2 and the seventh outlet flow passage Fo7 to communicate with each other. Then, the seventh outlet flow passage Fo7 communicates with the second fluid inlet portion 152 via the second inlet flow passage Fi2.

When the operation mode is set to the fourth operation mode, the first outlet flow hole 261 and the third outlet flow hole 263 face respective portions of the lower sliding surface 31 where none of the first lower through-hole 341, the second lower through-hole 342, and the lower flow passage communication hole 35 are formed. Thus, when the operation mode is set to the fourth operation mode, the first outlet flow passage Fo1 and the third outlet flow hole 263 are closed by the lower sliding surface 31.

Therefore, when the operation mode of the valve device 1 is set to the fourth operation mode, the fluid having flowed into the valve device 1 from each of the first fluid inlet portion 151 and the fifth fluid inlet portion 155 flows to the central flow passage Fc. Thus, the respective fluids having flowed into the valve device 1 from the first fluid inlet portion 151 and the fifth fluid inlet portion 155 merge with each other in the central flow passage Fc.

Part of the fluid having merged in the central flow passage Fc passes through the first lower through-hole 341 and flows to the second outlet flow passage Fo2 in the lower flow passage Fb, and the rest of the fluid passes through the second lower through-hole 342 and flows to the seventh outlet flow passage Fo7 in the lower flow passage Fb. The fluid having flowed into the second outlet flow passage Fo2 flows out to the outside of the valve device 1 from the second fluid outlet portion 162. The fluid having flowed into the seventh outlet flow passage Fo7 flows out to the outside of the valve device 1 from the seventh fluid outlet portion 167.

The fluid having flowed into the valve device 1 from the second fluid inlet portion 152 passes through the second inlet flow passage Fi2 and the lower flow passage communication hole 35. The fluid having passed through the lower flow passage communication hole 35 merges with the fluid having flowed in from the first fluid inlet portion 151 and the fifth fluid inlet portion 155 and having passed through the second lower through-hole 342, and flows to the seventh outlet flow passage Fo7 in the lower flow passage Fb. The fluid having flowed into the seventh outlet flow passage Fo7 flows out to the outside of the valve device 1 from the seventh fluid outlet portion 167.

As described above, when the operation mode of the valve device 1 is set to the fourth operation mode, the fluid flows into the valve device 1 from each of the first fluid inlet portion 151, the second fluid inlet portion 152, and the fifth fluid inlet portion 155. The fluids having flowed into the valve device 1 from the first fluid inlet portion 151 and the fifth fluid inlet portion 155 flow out to the outside of the valve device 1 from the second fluid outlet portion 162 and the seventh fluid outlet portion 167. The fluid having flowed into the valve device 1 from the second fluid inlet portion 152 also flows out to the outside of the valve device 1 from the seventh fluid outlet portion 167. The fluid does not flow out to the outside of the valve device 1 from the first fluid outlet portion 161 and the third fluid outlet portion 163 closed by the lower movable disk 30.

Next, the fifth operation mode will be described. When the operation mode of the valve device 1 is set to the fifth operation mode, the lower movable disk 30 is positioned at the rotational position illustrated in the fifth operation mode of FIG. 25.

Specifically, when the operation mode is set to the fifth operation mode, the lower movable disk 30 is positioned at a rotational position where the first lower through-hole 341 communicates with only the first outlet flow hole 261. The lower movable disk 30 is positioned at a rotational position where the second lower through-hole 342 communicates with the second inlet flow hole 252 and the seventh outlet flow hole 267. The lower movable disk 30 is positioned at a rotational position where the lower flow passage communication hole 35 communicates with the second outlet flow hole 262 and the third outlet flow hole 263.

Accordingly, the first lower through-hole 341 communicates with only the first outlet flow passage Fo1. Then, the first outlet flow passage Fo1 communicates with the first fluid inlet portion 151 and the fifth fluid inlet portion 155 via the central flow passage Fc. The second lower through-hole 342 communicates with the second inlet flow passage Fi2 and the seventh outlet flow passage Fo7. Then, the second inlet flow passage Fi2 and the seventh outlet flow passage Fo7 communicate with the first fluid inlet portion 151 and the fifth fluid inlet portion 155 via the central flow passage Fc. The lower flow passage communication hole 35 allows the second outlet flow passage Fo2 and the third outlet flow passage Fo3 to communicate with each other. However, the second outlet flow passage Fo2 and the third outlet flow passage Fo3 do not communicate with any of a first inlet flow passage Fi1, the second inlet flow passage Fi2, a fifth inlet flow passage Fi5, the first outlet flow passage Fo1, and the seventh outlet flow passage Fo7. Thus, the second outlet flow passage Fo2 and the third outlet flow passage Fo3 are closed by the lower sliding surface 31 and the lower flow passage communication hole 35.

Therefore, when the operation mode of the valve device 1 is set to the fifth operation mode, the fluid having flowed into the valve device 1 from each of the first fluid inlet portion 151 and the fifth fluid inlet portion 155 flows to the central flow passage Fc. The fluid having flowed into the valve device 1 from the second fluid inlet portion 152 passes through the second inlet flow passage Fi2 and the second lower through-hole 342, and flows into the central flow passage Fc. Thus, the respective fluids having flowed into the valve device 1 from the first fluid inlet portion 151, the second fluid inlet portion 152, and the fifth fluid inlet portion 155 merge with one another in the central flow passage Fc.

Part of the fluid having merged in the central flow passage Fc passes through the first lower through-hole 341 and flows to the first outlet flow passage Fo1 in the lower flow passage Fb, and the rest of the fluid passes through the second lower through-hole 342 and flows to the seventh outlet flow passage Fo7 in the lower flow passage Fb. The fluid having flowed into the first outlet flow passage Fo1 flows out to the outside of the valve device 1 from the first fluid outlet portion 161. The fluid having flowed into the seventh outlet flow passage Fo7 flows out to the outside of the valve device 1 from the seventh fluid outlet portion 167.

As described above, when the operation mode of the valve device 1 is set to the fifth operation mode, the fluid flows into the valve device 1 from each of the first fluid inlet portion 151, the second fluid inlet portion 152, and the fifth fluid inlet portion 155. The fluids having flowed into the valve device 1 from the first fluid inlet portion 151, the second fluid inlet portion 152, and the fifth fluid inlet portion 155 flow out to the outside of the valve device 1 from the first fluid outlet portion 161 and the seventh fluid outlet portion 167. The fluid does not flow out to the outside of the valve device 1 from the second fluid outlet portion 162 and the third fluid outlet portion 163 closed by the lower movable disk 30.

Next, the sixth operation mode will be described. When the operation mode of the valve device 1 is set to the sixth operation mode, the lower movable disk 30 is positioned at the rotational position illustrated in the sixth operation mode of FIG. 25.

Specifically, when the operation mode is set to the sixth operation mode, the lower movable disk 30 is positioned at a rotational position where the first lower through-hole 341 communicates with only the first outlet flow hole 261. The lower movable disk 30 is positioned at a rotational position where the second lower through-hole 342 communicates with the second inlet flow hole 252, the second outlet flow hole 262, and the seventh outlet flow hole 267. The lower movable disk 30 is positioned at a rotational position where the lower flow passage communication hole 35 communicates with the second outlet flow hole 262 and the third outlet flow hole 263.

Accordingly, the first lower through-hole 341 communicates with only the first outlet flow passage Fo1. Then, the first outlet flow passage Fo1 communicates with the first fluid inlet portion 151 and the fifth fluid inlet portion 155 via the central flow passage Fc. The second lower through-hole 342 communicates with the second inlet flow passage Fi2, the second outlet flow passage Fo2, and the seventh outlet flow passage Fo7. Then, the second inlet flow passage Fi2, the second outlet flow passage Fo2, and the seventh outlet flow passage Fo7 communicate with the first fluid inlet portion 151 and the fifth fluid inlet portion 155 via the central flow passage Fc. The lower flow passage communication hole 35 allows the second outlet flow passage Fo2 and the third outlet flow passage Fo3 to communicate with each other. Then, the second outlet flow passage Fo2 communicates with the second fluid inlet portion 152 via the second lower through-hole 342 and the second inlet flow passage Fi2. The third outlet flow passage Fo3 communicates with the second fluid inlet portion 152 via the second outlet flow passage Fo2, the second lower through-hole 342, and the second inlet flow passage Fi2.

Therefore, when the operation mode of the valve device 1 is set to the sixth operation mode, the fluid having flowed into the valve device 1 from each of the first fluid inlet portion 151 and the fifth fluid inlet portion 155 flows to the central flow passage Fc. The fluid having flowed into the valve device 1 from the second fluid inlet portion 152 passes through the second inlet flow passage Fi2 and the second lower through-hole 342, and flows into the central flow passage Fc. Thus, the respective fluids having flowed into the valve device 1 from the first fluid inlet portion 151, the second fluid inlet portion 152, and the fifth fluid inlet portion 155 merge with one another in the central flow passage Fc.

Part of the fluid having merged in the central flow passage Fc passes through the first lower through-hole 341 and flows to the first outlet flow passage Fo1 in the lower flow passage Fb, and the rest of the fluid passes through the second lower through-hole 342 and flows to the second outlet flow passage Fo2 and the seventh outlet flow passage Fo7 in the lower flow passage Fb. The fluid having flowed into the first outlet flow passage Fo1 flows out to the outside of the valve device 1 from the first fluid outlet portion 161. The fluid having flowed into the seventh outlet flow passage Fo7 flows out to the outside of the valve device 1 from the seventh fluid outlet portion 167.

The fluid having flowed into the second outlet flow passage Fo2 further diverges, and part of the fluid flows out to the outside of the valve device 1 from the second fluid outlet portion 162, and the rest of the fluid passes through the lower flow passage communication hole 35 and flows into the third outlet flow passage Fo3 in the lower flow passage Fb. The fluid having flowed into the third outlet flow passage Fo3 flows out to the outside of the valve device 1 from the third fluid outlet portion 163.

As described above, when the operation mode of the valve device 1 is set to the sixth operation mode, the fluid flows into the valve device 1 from each of the first fluid inlet portion 151, the second fluid inlet portion 152, and the fifth fluid inlet portion 155. The fluids having flowed into the valve device 1 from the first fluid inlet portion 151, the second fluid inlet portion 152, and the fifth fluid inlet portion 155 flow out to the outside of the valve device 1 from the first fluid outlet portion 161, the second fluid outlet portion 162, the third fluid outlet portion 163, and the seventh fluid outlet portion 167.

As described above, the valve device 1 switches the operation mode to switch each of the respective fluid outlet portions communicating with the first fluid inlet portion 151, the second fluid inlet portion 152, and the fifth fluid inlet portion 155 to any of the first fluid outlet portion 161, the second fluid outlet portion 162, the third fluid outlet portion 163, and the seventh fluid outlet portion 167. Thus, the valve device 1 can switch the fluid passage of the cooling water flowing in the fluid circulation system. In the valve device 1, the fluid allowed to flow into the first inlet flow passage Fi1 and the fifth inlet flow passage Fi5 can be caused to diverge by the lower flow passage communication hole 35, whereby part of the fluid can be allowed to flow out from the first fluid outlet portion 161 and the rest of the fluid can be allowed to flow out from the third fluid outlet portion 163. In the valve device 1, the fluid allowed to flow into the first inlet flow passage Fi1, the second inlet flow passage Fi2, and the fifth inlet flow passage Fi5 can be caused to diverge by the lower flow passage communication hole 35, whereby part of the fluid can be allowed to flow out from the second fluid outlet portion 162 and the rest of the fluid can be allowed to flow out from the third fluid outlet portion 163. In the valve device 1, the fluids allowed to flow into the valve device 1 from the second fluid inlet portion 152 and the fifth fluid inlet portion 155 can be caused to merge with each other, whereby the fluid can be allowed to flow out from the second fluid outlet portion 162 or the seventh fluid outlet portion 167.

Other configurations are similar to those in the first embodiment. As in the first embodiment, the valve device 1 of the present embodiment can obtain operation and effects exhibited through a configuration similar to or equivalent to that of the first embodiment.

Modification of Third Embodiment

In the third embodiment described above, an example has been described in which the first fluid inlet portion 151 and the fifth fluid inlet portion 155 communicate with each other via the central flow passage Fc. However, the configuration is not limited thereto. For example, the central flow passage Fc may be divided into a space communicating with the first fluid inlet portion 151 and a space communicating with the fifth fluid inlet portion 155 by a partition member (not illustrated). In this case, the fluid having flowed into the valve device 1 from the first fluid inlet portion 151 and the fluid having flowed into the valve device 1 from the fifth fluid inlet portion 155 can be guided to different fluid outlet portions.

For example, a space communicating with the first fluid inlet portion 151 is assumed to be a first space, a space communicating with the fifth fluid inlet portion 155 is assumed to be a second space, and the first space and the second space are assumed to be partitioned by a partition member provided inside the lower housing 11. The first space is assumed to communicate with the first outlet flow hole 261 and the third outlet flow hole 263. The second space is assumed to communicate with the second outlet flow hole 262 and the seventh outlet flow hole 267.

In a case where the central flow passage Fc is divided into the first space and the second space in this manner, the respective fluids having flowed into the valve device 1 from the first fluid inlet portion 151 and the fifth fluid inlet portion 155 do not merge with each other in the central flow passage Fc. The fluid having flowed into the first space from the first fluid inlet portion 151 can be allowed to flow out to the outside of the valve device 1 from the first fluid outlet portion 161 and the third fluid outlet portion 163 in accordance with the operation modes. The fluid having flowed into the second space from the fifth fluid inlet portion 155 can be allowed to flow out to the outside of the valve device 1 from the second fluid outlet portion 162 and the seventh fluid outlet portion 167 in accordance with the operation modes.

Fourth Embodiment

Next, a fourth embodiment will be described with reference to FIG. 26. The present embodiment is different from the first embodiment in that the valve device 1 does not include the lower stationary disk 20 and the upper stationary disk 40. Others are similar to those of the first embodiment. Thus, in the present embodiment, parts different from those of the first embodiment will be mainly described, and description of parts similar to those of the first embodiment may be omitted as appropriate.

Figure 26:
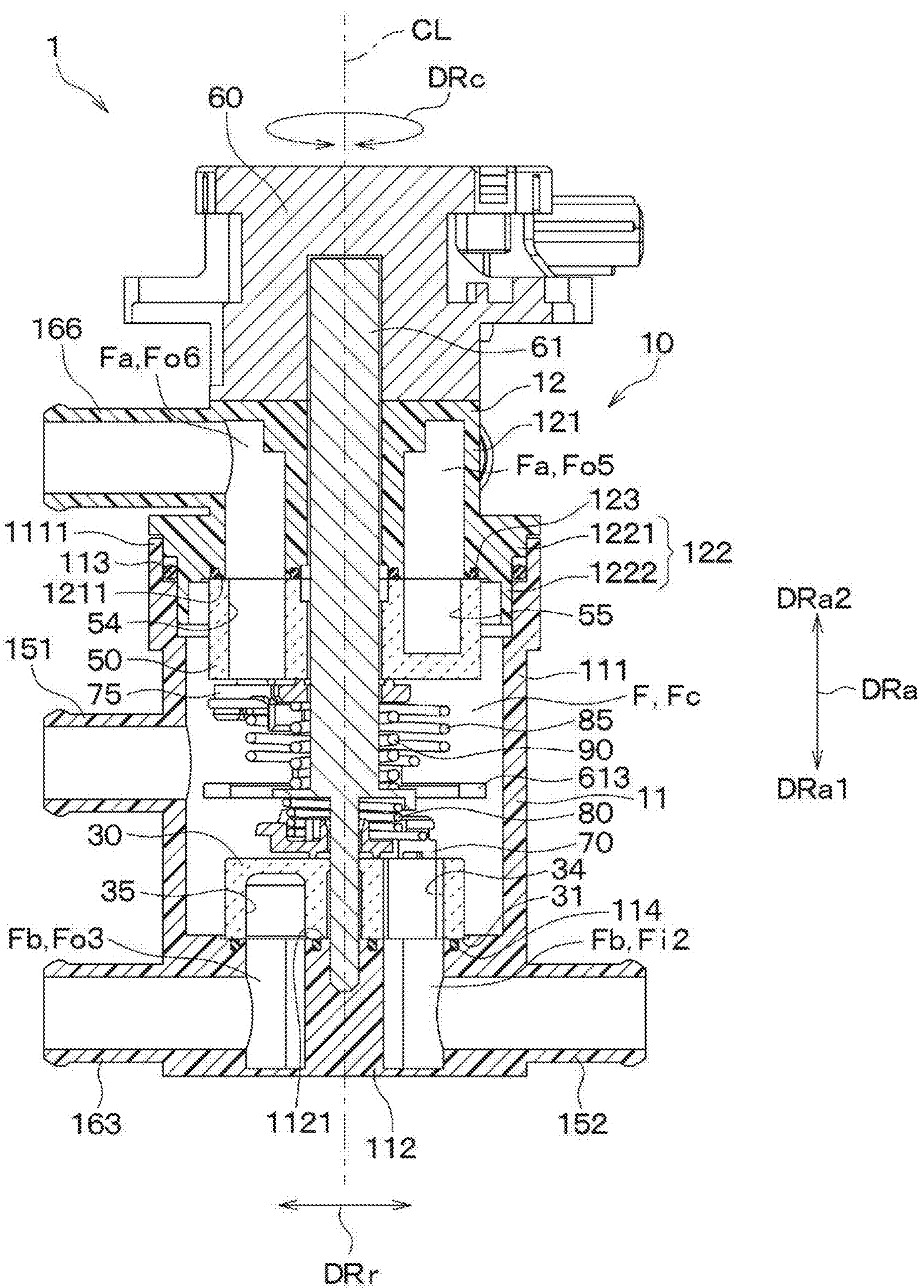
FIG. 26 is a cross-sectional view of a valve device according to a fourth embodiment.

As illustrated in FIG. 26, the valve device 1 of the present embodiment is not provided with the lower stationary disk 20 and the upper stationary disk 40 inside the housing 10. Thus, in the present embodiment, the lower gasket 114 is provided between the lower movable disk 30 and the lower installation surface 1121. The upper gasket 123 is provided between the upper movable disk 50 and the upper installation surface 1211.

The compression spring 90 biases the flange portion 613 in the lower direction DRa1, thereby biasing the lower movable disk 30 in the lower direction DRa1 via the lower torsion spring 80 and the lower lever 70 configured separately from the lower movable disk 30. As a result, the lower movable disk 30 is pressed against the lower gasket 114. The compression spring 90 biases the upper movable disk 50 in the upper direction DRa2 via the upper lever 75 configured separately from the upper movable disk 50. As a result, the upper movable disk 50 is pressed against the upper gasket 123.

Other configurations are similar to those in the first embodiment. As in the first embodiment, the valve device 1 of the present embodiment can obtain operation and effects exhibited through a configuration similar to or equivalent to that of the first embodiment.

Leakage of the fluid from a gap between the lower installation surface 1121 and the lower movable disk 30 can be reduced by pressing the lower movable disk 30 against the lower gasket 114 provided between the lower installation surface 1121 and the lower movable disk 30.

Leakage of the fluid from a gap between the upper installation surface 1211 and the upper movable disk 50 can be reduced by pressing the upper movable disk 50 against the upper gasket 123 provided between the upper installation surface 1211 and the upper movable disk 50.

First Modification of Fourth Embodiment

In the fourth embodiment described above, an example has been described in which the lower lever 70 coupling the shaft 61 and the lower movable disk 30 via the lower torsion spring 80 is configured separately from the lower movable disk 30. An example has been also described in which the upper lever 75 coupling the shaft 61 and the upper movable disk 50 via the upper torsion spring 85 is configured separately from the upper movable disk 50. However, the configurations of the lower lever 70 and the upper lever 75 are not limited thereto.

Figure 27:
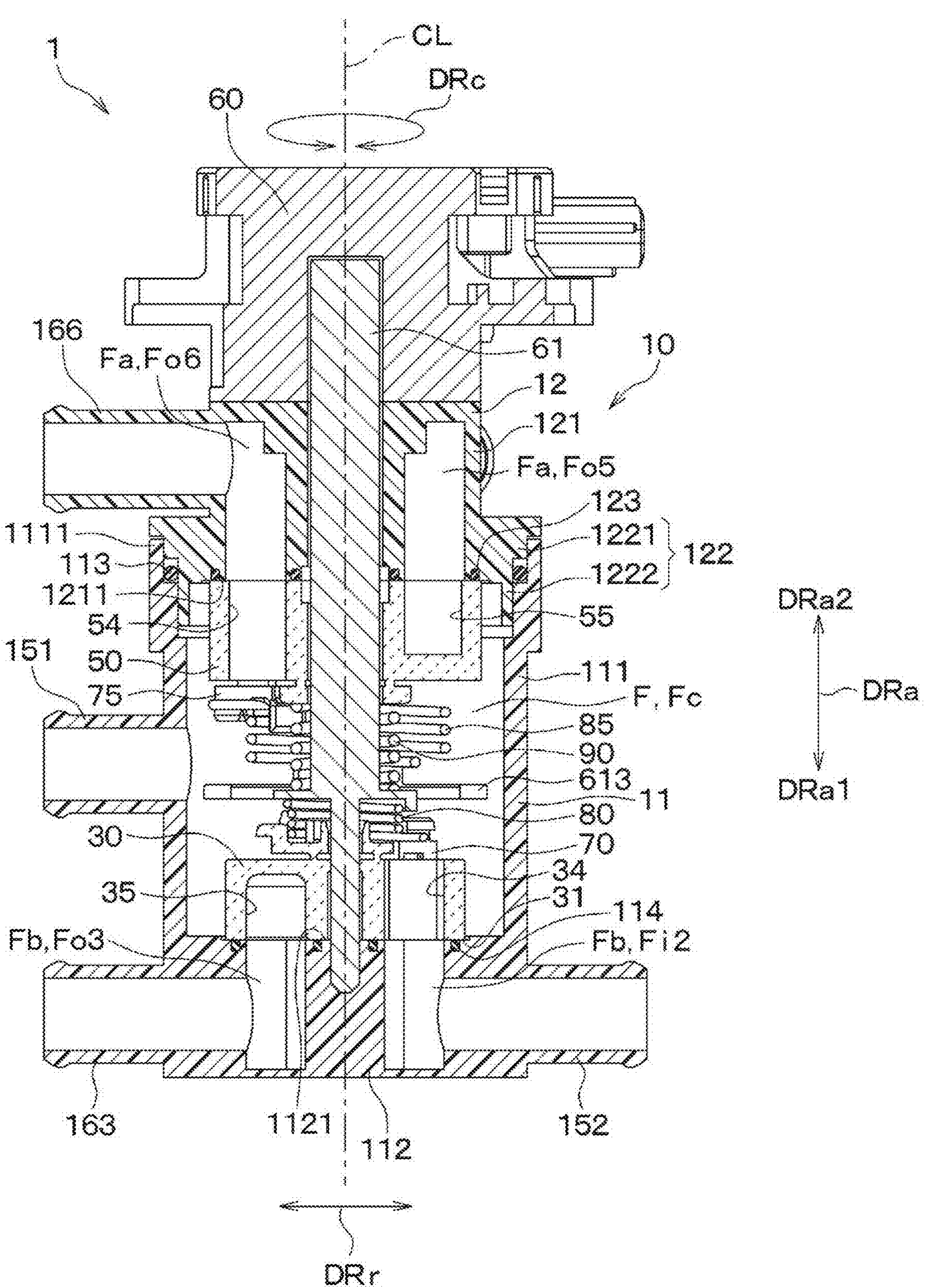
FIG. 27 is a cross-sectional view of a valve device according to a first modification of the fourth embodiment.

For example, as illustrated in FIG. 27, the lower lever 70 may be formed integrally with the lower movable disk 30. That is, the lower lever 70 may be formed of ceramic, integrally with the lower movable disk 30.

The upper lever 75 may be formed integrally with the upper movable disk 50. That is, the upper lever 75 may be formed of ceramic, integrally with the upper movable disk 50.

According to this configuration, the number of pieces forming the valve device 1 can be reduced as compared with the case in which the lower lever 70 is configured separately from the lower movable disk 30 and the upper lever 75 is configured separately from the upper movable disk 50.

Second Modification of Fourth Embodiment

In the fourth embodiment and the first modification of the fourth embodiment described above, an example has been described in which the shaft 61 and the lower movable disk 30 are coupled via the lower torsion spring 80. However, the configuration is not limited thereto.

Figure 28:
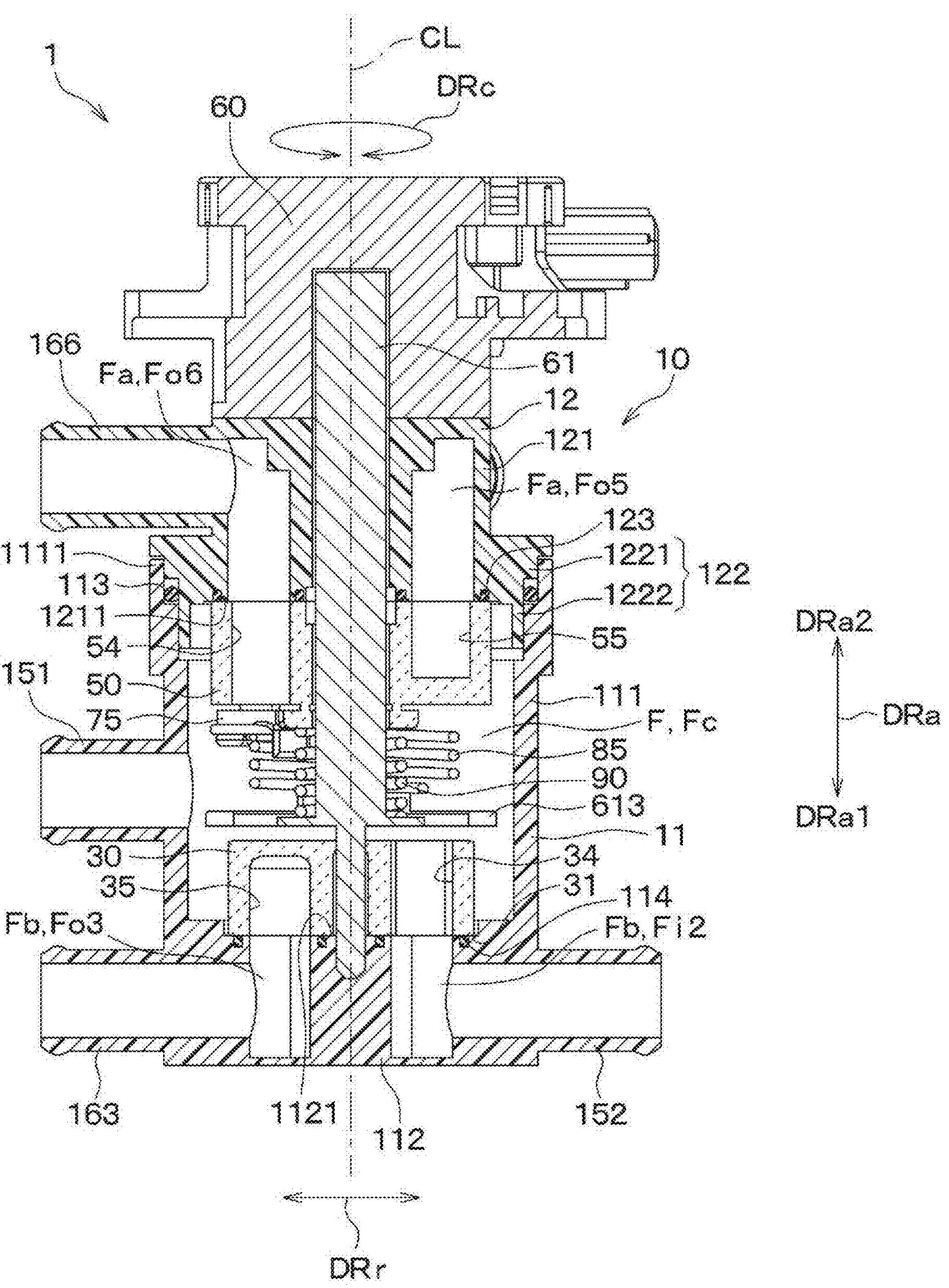
FIG. 28 is a cross-sectional view of a valve device according to a second modification of the fourth embodiment.

For example, as illustrated in FIG. 28, the valve device 1 may be configured without including the lower torsion spring 80. In this case, the lower lever 70 causing the lower torsion spring 80 and the lower movable disk 30 to be coupled to each other is unnecessary, and thus a configuration may be adopted in which the lower lever 70 is also not provided.

In the case of the configuration in which the lower torsion spring 80 is not provided, the shaft 61 and the lower movable disk 30 are directly coupled to each other. For example, the lower movable hole 32 of the lower movable disk 30 may be formed such that the inner diameter thereof is slightly smaller than the outer diameter of the lower axial portion 611, and the shaft 61 and the lower movable disk 30 may be directly coupled to each other by press-fitting the lower axial portion 611 into this lower movable hole 32.

With this configuration, when the lower axial portion 611 rotates, the rotational force of the shaft 61 is directly transmitted to the lower movable disk 30 through the lower axial portion 611. Further, the lower movable disk 30 can be biased in the lower direction DRa1 and thus the lower movable disk 30 can be pressed against the lower installation surface 1121, by the compression spring 90 biasing the flange portion 613 in the lower direction DRa1.

Although not illustrated, the valve device 1 may be configured such that the valve device 1 includes the lower torsion spring 80 and the lower lever 70 and does not include the upper torsion spring 85 and the upper lever 75 instead. In this case, the shaft 61 and the upper movable disk 50 may be directly coupled to each other by press-fitting the upper axial portion 612 into the upper movable hole 52 of the upper movable disk 50.

With this configuration, when the upper axial portion 612 rotates, the rotational force of the shaft 61 is directly transmitted to the upper movable disk 50 through the upper axial portion 612. Further, the upper movable disk 50 can be pressed against the upper installation surface 1211 by the compression spring 90 biasing the upper movable disk 50 in the upper direction DRa2.

Fifth Embodiment

Next, a fifth embodiment will be described with reference to FIG. 29. The present embodiment is different from the fourth embodiment in that the lower gasket 114 and the upper gasket 123 are not provided. Other configurations are similar to those of the fourth embodiment. Thus, in the present embodiment, parts different from those of the first embodiment will be mainly described, and description of parts similar to those of the first embodiment may be omitted as appropriate.

Figure 29:
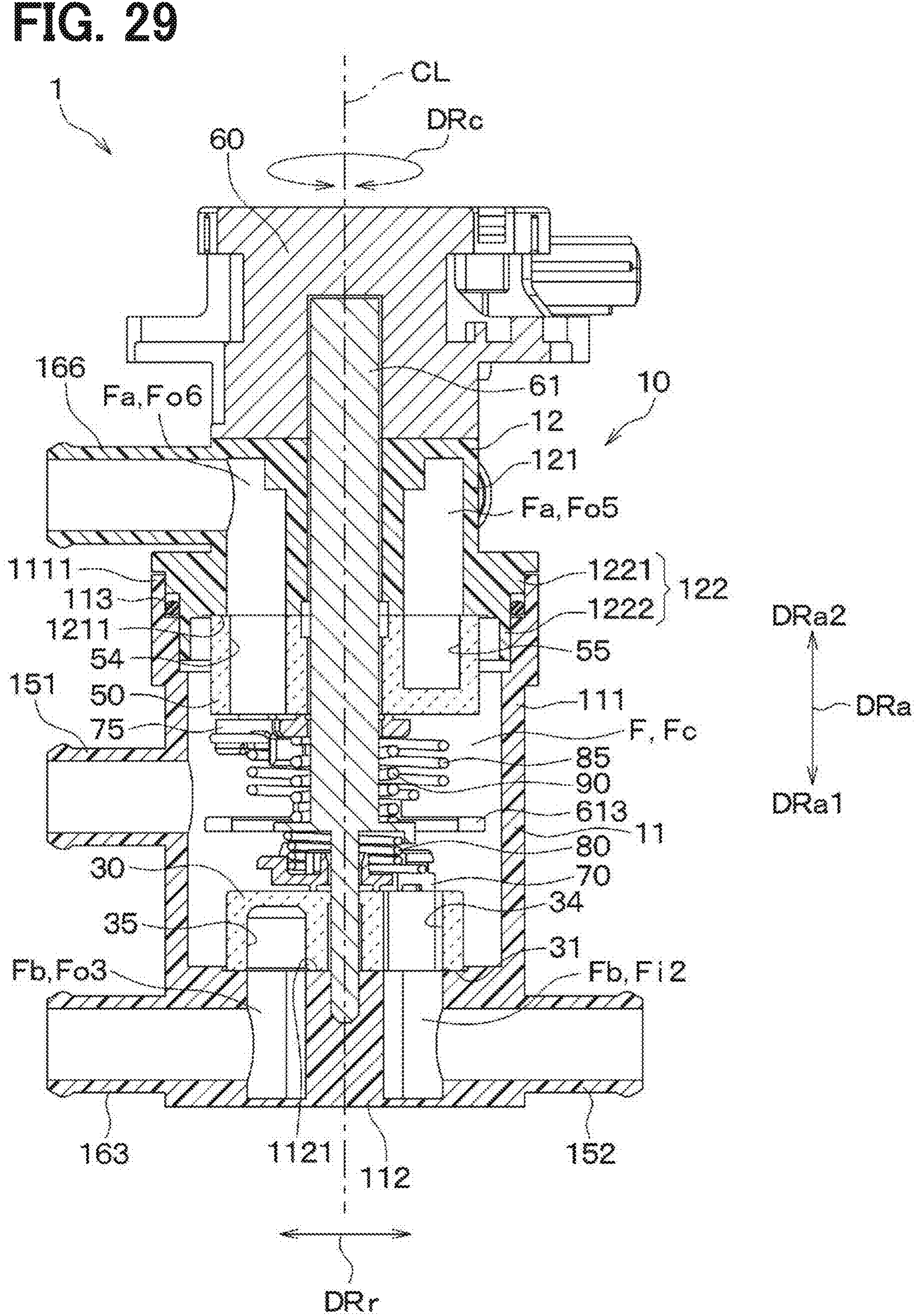
FIG. 29 is a cross-sectional view of a valve device according to a fifth embodiment.

As illustrated in FIG. 29, in the valve device 1 of the present embodiment, the lower installation surface 1121 is not formed with the lower gasket groove 1123. The lower gasket 114 is not provided between the lower movable disk 30 and the lower installation surface 1121. The upper installation surface 1211 is not formed with the upper gasket groove 1213. The upper gasket 123 is not provided between the upper movable disk 50 and the upper installation surface 1211.

The lower movable disk 30 is biased in the lower direction DRa1 and is pressed against the lower installation surface 1121 by receiving the biasing force generated by the compression spring 90 via the flange portion 613 and the lower torsion spring 80.

The upper movable disk 50 is biased in the upper direction DRa2 and is pressed against the upper installation surface 1211 by receiving the biasing force generated by the compression spring 90 via the upper lever 75.

Other configurations are similar to those in the fourth embodiment. As in the fourth embodiment, the valve device 1 of the present embodiment can obtain operation and effects exhibited through a configuration similar to or equivalent to that of the fourth embodiment.

The valve device 1 of the present embodiment includes the compression spring 90 pressing the lower movable disk 30 against the lower installation surface 1121 and pressing the upper movable disk 50 against the upper installation surface 1211.

Thus, even in the configuration in which the lower gasket 114 is not provided, the fluid hardly leaks from a gap between the lower installation surface 1121 and the lower movable disk 30. Even in the configuration in which the upper gasket 123 is not provided, the fluid hardly leaks from a gap between the upper installation surface 1211 and the upper movable disk 50.

First Modification of Fifth Embodiment

In the fifth embodiment described above, an example has been described in which the lower lever 70 coupling the shaft 61 and the lower movable disk 30 via the lower torsion spring 80 is configured separately from the lower movable disk 30. An example has been also described in which the upper lever 75 coupling the shaft 61 and the upper movable disk 50 via the upper torsion spring 85 is configured separately from the upper movable disk 50. However, the configurations of the lower lever 70 and the upper lever 75 are not limited thereto.

Figure 30:
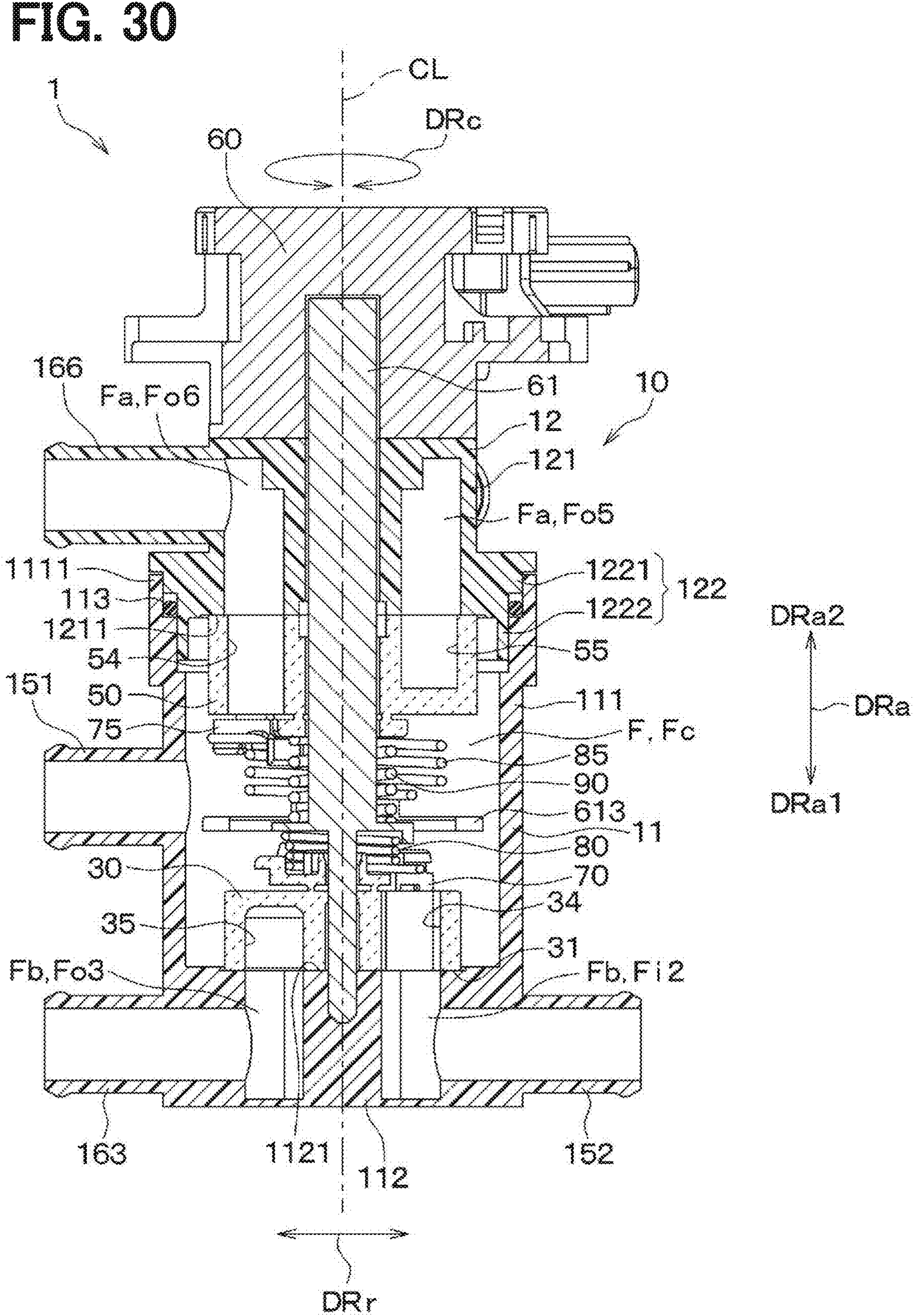
FIG. 30 is a cross-sectional view of a valve device according to a first modification of the fifth embodiment.

For example, as illustrated in FIG. 30, the lower lever 70 may be formed integrally with the lower movable disk 30. That is, the lower lever 70 may be formed of ceramic, integrally with the lower movable disk 30.

The upper lever 75 may be formed integrally with the upper movable disk 50. That is, the upper lever 75 may be formed of ceramic, integrally with the upper movable disk 50.

According to this configuration, the number of pieces forming the valve device 1 can be reduced as compared with the case in which the lower lever 70 is configured separately from the lower movable disk 30 and the upper lever 75 is configured separately from the upper movable disk 50.

Second Modification of Fifth Embodiment

In the fifth embodiment and the first modification of the fifth embodiment described above, an example has been described in which the shaft 61 and the lower movable disk 30 are coupled via the lower torsion spring 80, however, the configuration is not limited thereto.

Figure 31:
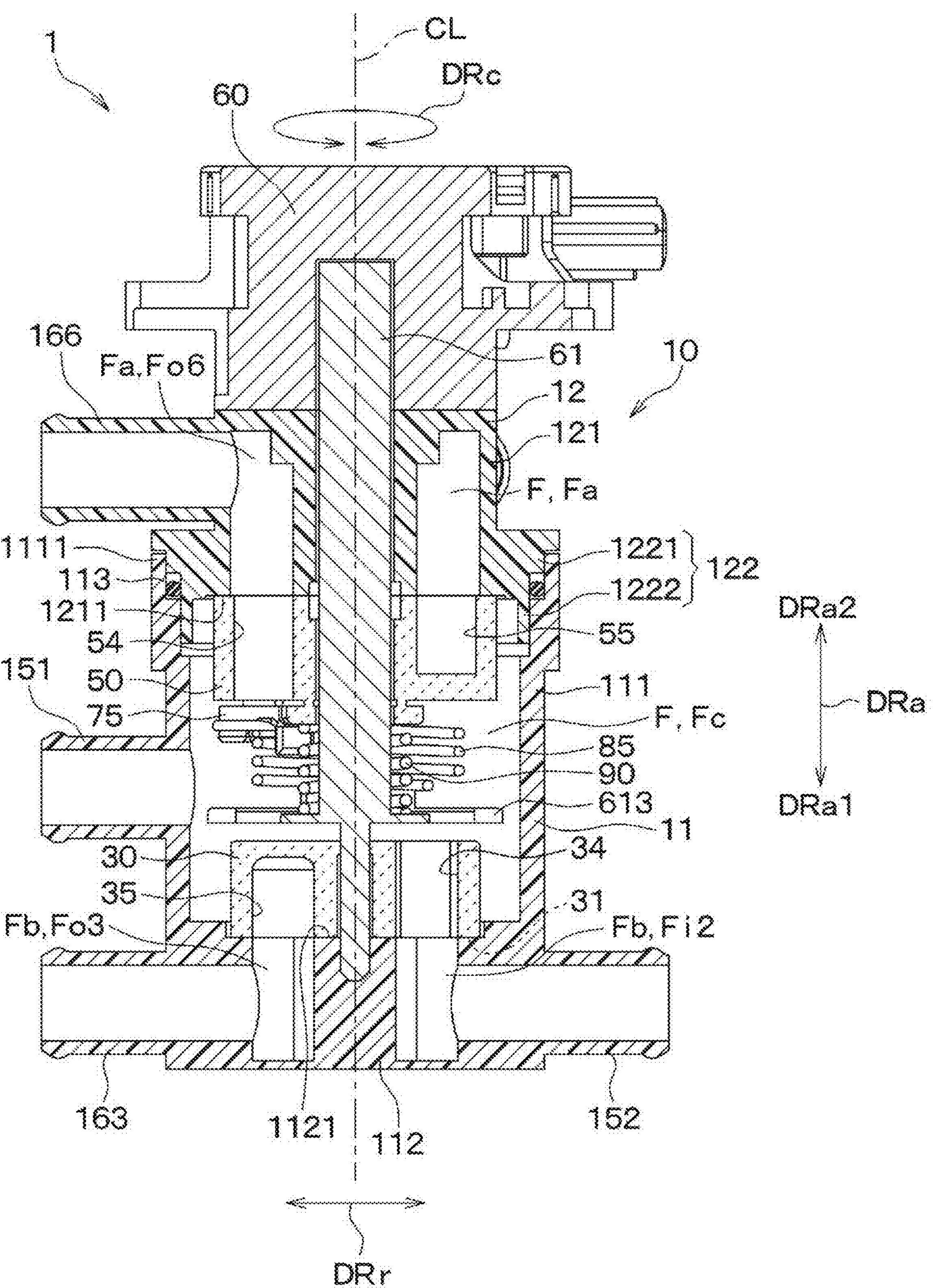
FIG. 31 is a cross-sectional view of a valve device according to a second modification of the fifth embodiment.

For example, as illustrated in FIG. 31, the valve device 1 may be configured without including the lower torsion spring 80. In this case, the lower lever 70 causing the lower torsion spring 80 and the lower movable disk 30 to be coupled to each other is unnecessary, and thus a configuration may be adopted in which the lower lever 70 is also not provided.

In the case of the configuration in which the lower torsion spring 80 is not provided, the shaft 61 and the lower movable disk 30 are directly coupled to each other. For example, the lower movable hole 32 of the lower movable disk 30 may be formed such that the inner diameter thereof is slightly smaller than the outer diameter of the lower axial portion 611, and the shaft 61 and the lower movable disk 30 may be directly coupled to each other by press-fitting the lower axial portion 611 into this lower movable hole 32.

With this configuration, when the lower axial portion 611 rotates, the rotational force of the shaft 61 is directly transmitted to the lower movable disk 30 through the lower axial portion 611. Further, the lower movable disk 30 can be pressed against the lower installation surface 1121 by the compression spring 90 biasing the flange portion 613 in the lower direction DRa1.

Although not illustrated, the valve device 1 may be configured such that the valve device 1 includes the lower torsion spring 80 and the lower lever 70 and does not include the upper torsion spring 85 and the upper lever 75 instead. In this case, the shaft 61 and the upper movable disk 50 may be directly coupled to each other by press-fitting the upper axial portion 612 into the upper movable hole 52 of the upper movable disk 50.

With this configuration, when the upper axial portion 612 rotates, the rotational force of the shaft 61 is directly transmitted to the upper movable disk 50 through the upper axial portion 612. Further, the upper movable disk 50 can be pressed against the upper installation surface 1211 by the compression spring 90 biasing the upper movable disk 50 in the upper direction DRa2.

Sixth Embodiment

Next, a sixth embodiment will be described with reference to FIG. 32. The present embodiment is different from the first embodiment in that each of the lower stationary disk 20 and the upper stationary disk 40 is not formed of ceramic. Others are similar to those of the first embodiment. Thus, in the present embodiment, parts different from those of the first embodiment will be mainly described, and description of parts similar to those of the first embodiment may be omitted as appropriate.

Figure 32:
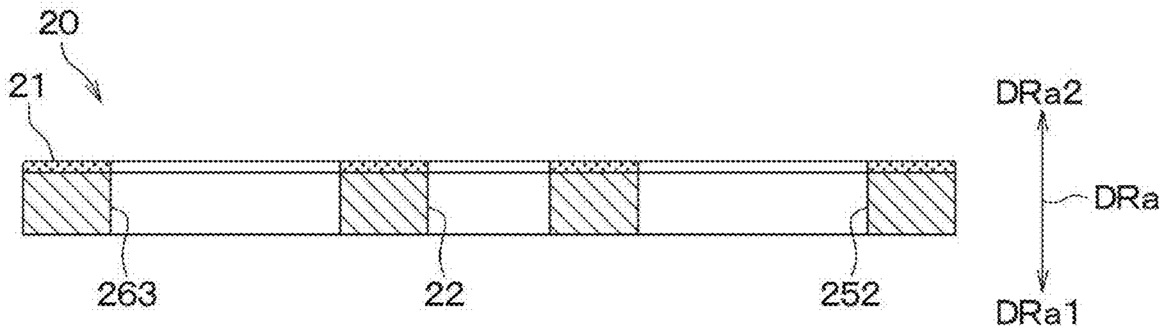
FIG. 32 is a cross-sectional view of a lower stationary disk according to a sixth embodiment.

As illustrated in FIG. 32, the lower stationary disk 20 of the present embodiment is formed of metal (for example, an aluminum alloy). In the lower stationary disk 20, the lower seal surface 21 on the upper direction DRa2 side, which is a surface on a side caused to be in contact with the lower movable disk 30 by the lower movable disk 30 being pressed thereagainst, is coated through thin-film coating treatment that improves slidability. As specific thin-film coating treatment, coating can be adopted such as diamond like carbon (DLC) coating, diamond coating, or the like that improves wear resistance, impact resistance, and the like in addition to slidability. The DLC coating and the diamond coating can be formed by a plasma chemical vapor deposition (CVD) method, a sputtering method, an ion beam deposition method, or the like. The lower seal surface 21 may be coated with Teflon (registered trademark) as surface treatment that improves slidability.

Figure 33:
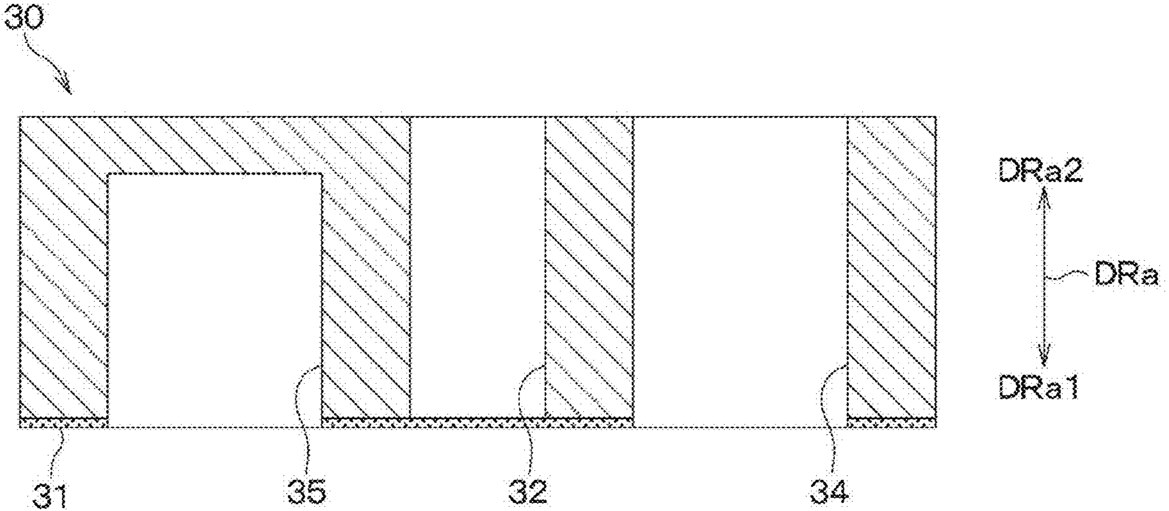
FIG. 33 is a cross-sectional view of a lower movable disk according to the sixth embodiment.

As illustrated in FIG. 33, the lower movable disk 30 of the present embodiment is formed of metal (for example, an aluminum alloy). In the lower movable disk 30, the lower sliding surface 31 on the lower direction DRa1 side, which is a surface on a side caused to be in contact with the lower stationary disk 20 by being pressed against the lower stationary disk 20, is coated through thin-film coating treatment that improves slidability. As specific coating treatment, DLC coating, diamond coating, or the like can be adopted. The lower sliding surface 31 may be coated with Teflon (registered trademark) as surface treatment that improves slidability.

Figure 34:
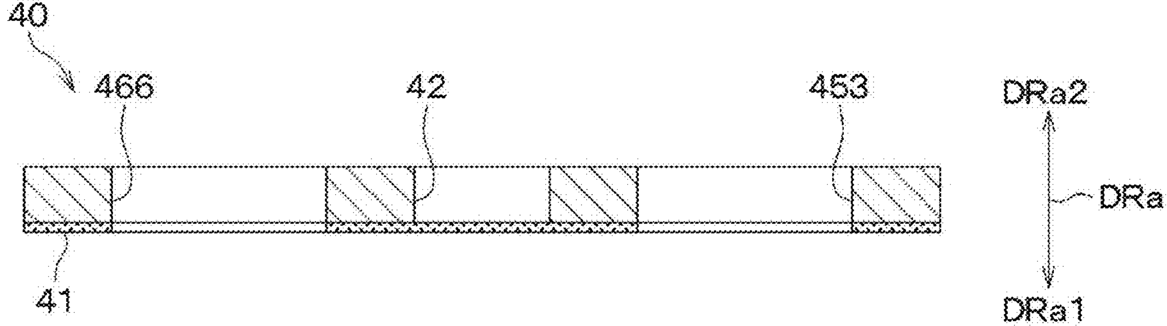
FIG. 34 is a cross-sectional view of an upper stationary disk according to the sixth embodiment.
Figure 35:
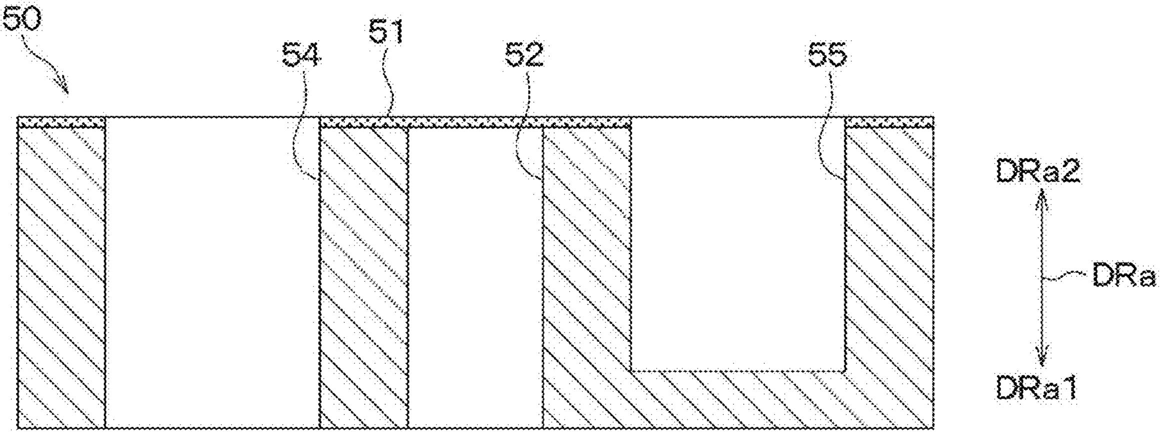
FIG. 35 is a cross-sectional view of an upper movable disk according to the sixth embodiment.

As illustrated in FIGS. 34 and 35, each of the upper stationary disk 40 and the upper movable disk 50 of the present embodiment is formed of metal (for example, an aluminum alloy), similarly to the lower stationary disk 20. In the upper stationary disk 40, the upper seal surface 41 on the lower direction DRa1 side, which is a surface on a side caused to be in contact with the upper movable disk 50 by the upper movable disk 50 being pressed thereagainst, is coated through thin-film coating treatment that improves slidability. In the upper movable disk 50, the upper sliding surface 51 on the upper direction DRa2 side, which is a surface on a side caused to be in contact with the upper stationary disk 40 by being pressed against the upper stationary disk 40, is coated through thin-film coating treatment that improves slidability. As specific coating treatment on the upper seal surface 41 and the upper sliding surface 51, DLC coating, diamond coating, or the like can be adopted. Each of the upper seal surface 41 and the upper sliding surface 51 may be coated with Teflon (registered trademark) as surface treatment that improves slidability.

Other configurations are similar to those in the first embodiment. As in the first embodiment, the valve device 1 of the present embodiment can obtain operation and effects exhibited through a configuration similar to or equivalent to that of the first embodiment.

Since the lower seal surface 21 is coated through coating treatment that improves slidability, slidability required when the lower movable disk 30 slides on the lower stationary disk 20 can be ensured. Since the upper seal surface 41 is coated through coating treatment that improves slidability, slidability required when the upper movable disk 50 slides on the upper stationary disk 40 can be ensured.

Modifications of Sixth Embodiment

In the sixth embodiment described above, an example has been described in which each of the lower seal surface 21, the lower sliding surface 31, the upper seal surface 41, and the upper sliding surface 51 is coated through the coating treatment that improves slidability. However, the configuration is not limited thereto. For example, in a case where one of the lower stationary disk 20 and the upper stationary disk 40 is formed of ceramic, a configuration may be adopted in which only the seal surface of the other disk is coated through the coating treatment that improves slidability. In a case where one of the lower movable disk 30 and the upper movable disk 50 is formed of ceramic, a configuration may be adopted in which only the sliding surface of the other disk is coated through the coating treatment that improves slidability.

Seventh Embodiment

Next, a seventh embodiment will be described with reference to FIG. 36. The present embodiment is different from the first embodiment in that the valve device 1 includes a first flow passage unit 1A and a second flow passage unit 1B. Others are similar to those of the first embodiment. Thus, in the present embodiment, parts different from those of the first embodiment will be mainly described, and description of parts similar to those of the first embodiment may be omitted as appropriate.

Figure 36:
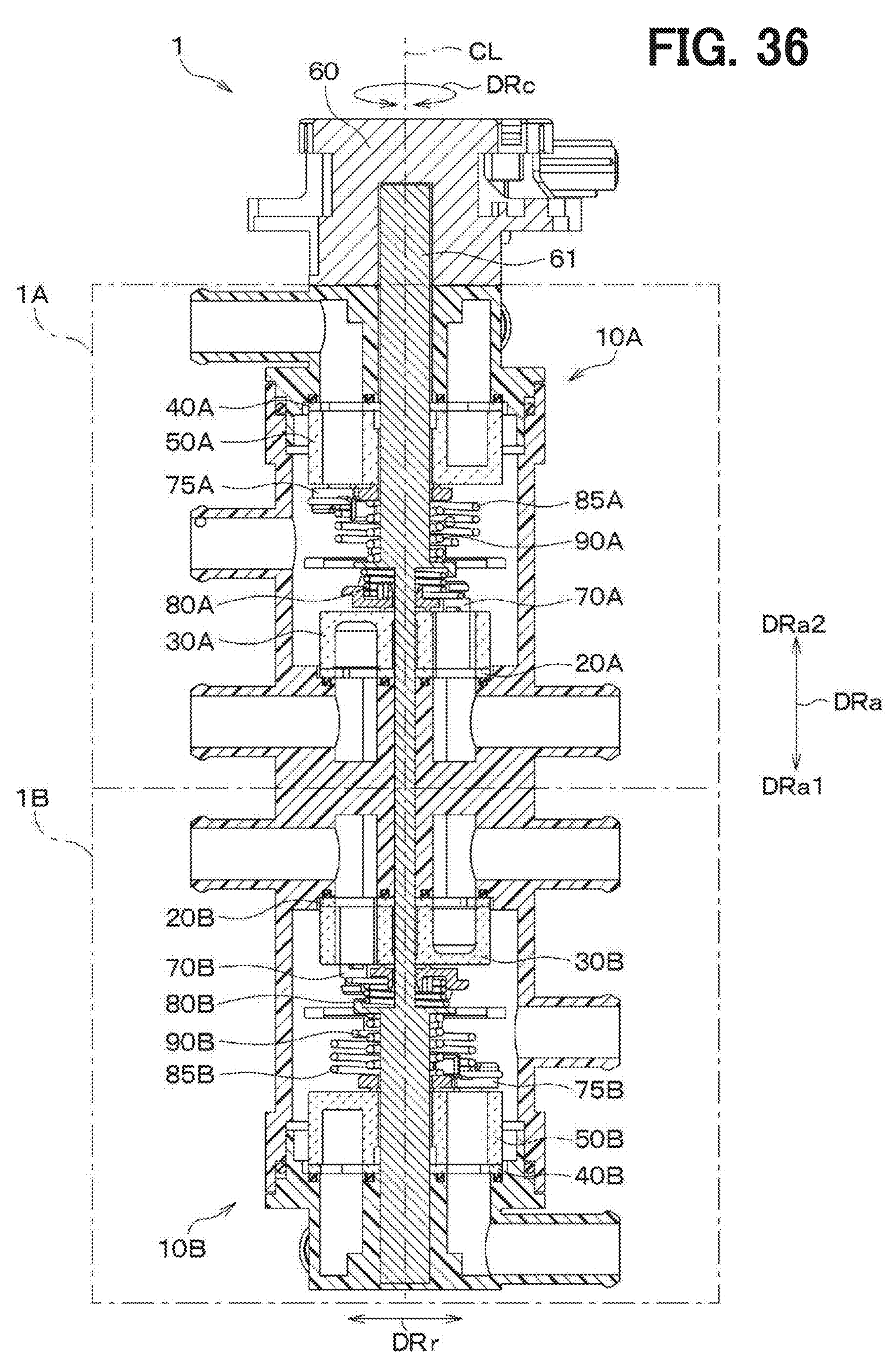
FIG. 36 is a cross-sectional view of a valve device according to a seventh embodiment.

In the present embodiment, as illustrated in FIG. 36, the first flow passage unit 1A, the second flow passage unit 1B, and the drive unit 60 are provided. Each of the first flow passage unit 1A and the second flow passage unit 1B includes corresponding components, except the drive unit 60, of the components of the valve device 1 described in the first embodiment.

Specifically, the first flow passage unit 1A includes a first housing 10A, a first lower stationary disk 20A, a first lower movable disk 30A, a first upper stationary disk 40A, a first upper movable disk 50A, a first lower lever 70A, a first upper lever 75A, a first lower torsion spring 80A, a first upper torsion spring 85A, a first compression spring 90A, and the like.

The second flow passage unit 1B includes a second housing 10B, a second lower stationary disk 20B, a second lower movable disk 30B, a second upper stationary disk 40B, a second upper movable disk 50B, a second lower lever 70B, a second upper lever 75B, a second lower torsion spring 80B, a second upper torsion spring 85B, a second compression spring 90B, and the like.

The first flow passage unit 1A, the second flow passage unit 1B, and the drive unit 60 are provided along the direction in which the axis CL of the shaft 61 extends. The first flow passage unit 1A and the second flow passage unit 1B are provided such that the arrangement orientation of the components of the first flow passage unit 1A and the arrangement orientation of the components of the second flow passage unit 1B are opposite to each other in the axial direction DRa. The shaft 61 of the drive unit 60 is disposed to be passed through the first flow passage unit 1A and the second flow passage unit 1B.

Each of the first housing 10A and the second housing 10B corresponds to the housing 10 in the first embodiment. Each of the first lower stationary disk 20A and the second lower stationary disk 20B corresponds to the lower stationary disk 20 in the first embodiment. Each of the first lower movable disk 30A and the second lower movable disk 30B corresponds to the lower movable disk 30 in the first embodiment. Each of the first upper stationary disk 40A and the second upper stationary disk 40B corresponds to the upper stationary disk 40 in the first embodiment. Each of the first upper movable disk 50A and the second upper movable disk 50B corresponds to the upper movable disk 50 in the first embodiment.

Each of the first lower lever 70A and the second lower lever 70B corresponds to the lower lever 70 in the first embodiment. Each of the first upper lever 75A and the second upper lever 75B corresponds to the upper lever 75 in the first embodiment. Each of the first lower torsion spring 80A and the second lower torsion spring 80B corresponds to the lower torsion spring 80 in the first embodiment. Each of the first upper torsion spring 85A and the second upper torsion spring 85B corresponds to the upper torsion spring 85 in the first embodiment. Each of the first compression spring 90A and the second compression spring 90B corresponds to the compression spring 90 in the first embodiment.

The configurations of the respective components of the first flow passage unit 1A and the second flow passage unit 1B are similar to the configurations of the respective components of the valve device 1 described in the first embodiment. Thus, in the present embodiment, detailed description of each of the respective components of the first flow passage unit 1A and the second flow passage unit 1B is omitted.

In the present embodiment, each of the first lower movable disk 30A, the second lower movable disk 30B, the first upper movable disk 50A, and the second upper movable disk 50B is configured to be rotatable integrally with the shaft 61. Thus, the valve device 1 of the present embodiment can switch the respective operation modes of the first flow passage unit 1A and the second flow passage unit 1B by causing the drive unit 60 to rotate the shaft 61.

Specifically, the drive unit 60 causes the first lower movable disk 30A and the first upper movable disk 50A to rotate integrally with the shaft 61, whereby the operation mode of the first flow passage unit 1A can be switched to any of the first to third operation modes described in the first embodiment. According to this configuration, even when the number of movable disks provided in the first flow passage unit 1A is two, the flow of the fluid flowing through the fluid inlet portions and the fluid outlet portions provided in the first housing 10A can be switched without increasing the size of the first housing 10A.

The drive unit 60 causes the second lower movable disk 30B and the second upper movable disk 50B to rotate integrally with the shaft 61, whereby the operation mode of the second flow passage unit 1B can be switched to any of the first to third operation modes described in the first embodiment. According to this configuration, even when the number of movable disks provided in the second flow passage unit 1B is two, the flow of the fluid flowing through the fluid inlet portions and the fluid outlet portions provided in the second housing 10B can be switched without increasing the size of the second housing 10B.

Further, with the single drive unit 60, the respective operation modes of the first flow passage unit 1A and the second flow passage unit 1B can be switched. Thus, the number of components of the valve device 1 can be reduced as compared with a configuration in which the first flow passage unit 1A and the second flow passage unit 1B are provided with respective power sources that switch the respective operation modes of the flow passage units.

Other Embodiments

The typical embodiments of the present disclosure have been described above. However, the present disclosure is not limited to the embodiments described above, and can be variously modified as follows, for example.

In the embodiments described above, the description has been made in which the valve device 1 is used in the fluid circulation system mounted in, for example, an electric vehicle or a hybrid vehicle. However, the application is not limited thereto. For example, the valve device 1 may be used in a fluid circulation system mounted in a vehicle other than an electric vehicle or a hybrid vehicle. Alternatively, the valve device 1 may be used in an application other than a vehicle.

In the embodiments described above, the description has been made in which the fluid flowing through the flow passage F inside the housing 10 included in the valve device 1 is cooling water. However, the fluid is not limited thereto. For example, the fluid may be a liquid or a gas other than cooling water.

In the embodiments described above, an example has been described in which the valve device 1 is configured to be able to switch the operation mode to the three operation modes or the six operation modes. However, the configuration is not limited thereto. For example, the valve device 1 may be configured to be able to switch the operation mode to two, four, or five operation modes, or may be configured to be able to switch the operation mode to seven or more operation modes.

In the embodiments described above, an example has been described in which the housing 10 has one or two fluid inlet portions communicating with the central flow passage Fc, and has one or two fluid inlet portions and three or four fluid outlet portions communicating with the lower flow passage Fb. In addition, an example has been described in which the housing 10 has one fluid inlet portion and three fluid outlet portions communicating with the upper flow passage Fa. However, the configurations and the number of fluid inlet portions and fluid outlet portions formed in the housing 10 are not limited thereto.

For example, the housing 10 may be configured to have three or more fluid inlet portions communicating with the central flow passage Fc, or may be configured to have a fluid outlet portion communicating with the central flow passage Fc. The housing 10 may be configured to have no fluid inlet portion communicating with the central flow passage Fc and no fluid outlet portion communicating with the central flow passage Fc.

The housing 10 may be configured to have three or more fluid inlet portions communicating with the lower flow passage Fb, or may be configured to have two or less or five or more fluid outlet portions communicating with the lower flow passage Fb. For example, the housing 10 may be configured to have no fluid inlet portion and have only a fluid outlet portion regarding the fluid inlet portion and the fluid outlet portion communicating with the lower flow passage Fb, or may be configured to have no fluid outlet portion and have only a fluid inlet portion regarding the fluid inlet portion and the fluid outlet portion communicating with the lower flow passage Fb.

The housing 10 may be configured to have two or more fluid inlet portions communicating with the upper flow passage Fa, or may be configured to have two or less or four or more fluid outlet portions communicating with the upper flow passage Fa. For example, the housing 10 may be configured to have no fluid inlet portion and have only a fluid outlet portion regarding the fluid inlet portion and the fluid outlet portion communicating with the upper flow passage Fa, or may be configured to have no fluid outlet portion and have only a fluid inlet portion regarding the fluid inlet portion and the fluid outlet portion communicating with the upper flow passage Fa.

In the embodiments described above, an example has been described in which each of the fluid inlet portions provided in the housing 10 functions as an inlet through which the fluid flows into the flow passage F, and in which each of the fluid outlet portions provided in the housing 10 functions as an outlet through which the fluid allowed to flow into the flow passage F flows out to the outside of the valve device 1. However, the configuration is not limited thereto.

For example, the fluid inlet portion may be configured to function either as an inlet through which the fluid flows into the flow passage F or an outlet through which the fluid allowed to flow into the flow passage F flows out to the outside of the valve device 1, depending on the rotational positions of the lower movable disk 30 and the upper movable disk 50. The fluid outlet portion may also be configured to function either as an inlet through which the fluid flows into the flow passage F or an outlet through which the fluid allowed to flow into the flow passage F flows out to the outside of the valve device 1, depending on the rotational positions of the lower movable disk 30 and the upper movable disk 50.

In the embodiments described above, an example has been described in which each of the lower flow passage through-hole 34 and the upper flow passage through-hole 54 is formed to have a size able to span and overlap two flow holes formed in the lower stationary disk 20 in the axial direction DRa. However, the configuration is not limited thereto.

For example, each of the lower flow passage through-hole 34 and the upper flow passage through-hole 54 may be formed to have a size able to span and overlap three or more flow holes in the axial direction DRa.

In the embodiments described above, an example has been described in which each of the lower flow passage communication hole 35 and the upper flow passage communication hole 55 is formed to have a size able to span and overlap two or three flow holes formed in the upper stationary disk 40 in the axial direction DRa. However, the configuration is not limited thereto.

For example, each of the lower flow passage communication hole 35 and the upper flow passage communication hole 55 may be formed to have a size able to span and overlap four or more flow holes in the axial direction DRa.

In the embodiments described above, an example has been described in which the lower movable disk 30 is formed with the lower flow passage communication hole 35, and in which the upper movable disk 50 is formed with the upper flow passage communication hole 55. However, the configuration is not limited thereto.

For example, the lower movable disk 30 may be configured such that the lower flow passage communication hole 35 is not formed in the lower movable disk 30. The upper movable disk 50 may be configured such that the upper flow passage communication hole 55 is not formed in the upper movable disk 50. Further, a configuration may be adopted in which the lower flow passage communication hole 35 is not formed in the lower movable disk 30 while the upper flow passage communication hole 55 is not formed in the upper movable disk 50.

In the embodiments described above, an example has been described in which the one or two lower flow passage through-holes 34 and the one or two lower flow passage communication holes 35 are formed in the lower movable disk 30 and thus the two or three holes in total are formed in the lower movable disk 30. However, the configuration is not limited thereto.

For example, the lower movable disk 30 may be formed with three or more lower flow passage through-holes 34, or may be formed with three or more lower flow passage communication holes 35. The lower movable disk 30 may be configured such that a plurality of lower flow passage through-holes 34 and a plurality of lower flow passage communication holes 35 are formed in the lower movable disk 30 and thus four or more holes in total are formed in the lower movable disk 30.

In the embodiments described above, an example has been described in which the single upper flow passage through-hole 54 and the single upper flow passage communication hole 55 are formed in the upper movable disk 50 and thus two holes in total are formed in the upper movable disk 50. However, the configuration is not limited thereto.

For example, the upper movable disk 50 may be configured such that a plurality of either the upper flow passage through-holes 54 or the upper flow passage communication holes 55 is formed in the upper movable disk 50 and thus three or more holes in total are formed in the upper movable disk 50. The upper movable disk 50 may be configured such that a plurality of upper flow passage through-holes 54 and a plurality of upper flow passage communication holes 55 are formed in upper movable disk 50.

In the first to fifth embodiments and the seventh embodiment described above, an example has been described in which each of the lower stationary disk 20, the lower movable disk 30, the upper stationary disk 40, and the upper movable disk 50 is formed of ceramic. However, the configuration is not limited thereto.

For example, each of the lower stationary disk 20, the lower movable disk 30, the upper stationary disk 40, and the upper movable disk 50 may be formed of a material (for example, phenol, resin, metal, or the like) different from ceramic. Each of the lower stationary disk 20, the lower movable disk 30, the upper stationary disk 40, and the upper movable disk 50 may be formed by containing a plurality of types among ceramic, phenol, resin, metal, or the like.

In the embodiments described above, an example has been described in which the valve device 1 includes at least one of the lower torsion spring 80 or the upper torsion spring 85. However, the configuration is not limited thereto. The valve device 1 may be configured to include none of the lower torsion spring 80 and the upper torsion spring 85.

In the embodiments described above, an example has been described in which the valve device 1 includes at least one of the lower lever 70 or the upper lever 75. However, the configuration is not limited thereto. For example, the valve device 1 may be configured to include none of the lower lever 70 and the upper lever 75.

In the embodiments described above, an example has been described in which the single compression spring 90 presses the lower movable disk 30 against the lower stationary disk 20 and presses the upper movable disk 50 against the upper stationary disk 40. However, the configuration is not limited thereto. For example, the valve device 1 may be configured such that the valve device 1 includes two compression springs 90, and such that one of the two compression springs 90 presses the lower movable disk 30 against the lower stationary disk 20 and the other one of the two compression springs 90 presses the upper movable disk 50 against the upper stationary disk 40.

In the embodiments described above, an example has been described in which the compression spring 90 is a resilient member biasing the lower movable disk 30 and the upper movable disk 50, and is a compression coil spring resiliently deformable in the axial direction DRa. However, the configuration is not limited thereto. For example, the compression spring 90 may be formed of a member different from the resilient member. The compression spring 90 may be formed of a resilient member different from the compression coil spring.

In the embodiments described above, it is understood that the constituent elements of the embodiments are not necessarily indispensable unless otherwise clearly stated or unless otherwise thought to be clearly indispensable in principle.

In the embodiments described above, in a case where a numerical value such as the number, a numerical value, a quantity, or a range of the constituent element of the embodiment is mentioned, the numerical value is not limited to the specified number unless otherwise specified to be indispensable or clearly limited to the specified number in principle.

In the embodiments described above, in a case where a shape, a positional relationship, or the like of the constituent element or the like is mentioned, the shape, the positional relationship, or the like is not limited to that being mentioned unless otherwise specified or limited to a specified shape, a specified positional relationship, or the like in principle.

The control unit of the drive unit 60 of the present disclosure and the method thereof may be implemented by a dedicated computer provided by including a memory and a processor programmed to execute one or more functions embodied by a computer program. The control unit of the present disclosure and the method thereof may be implemented by a dedicated computer provided by including a processor with one or more dedicated hardware logic circuits. The control unit of the present disclosure and the method thereof may be implemented by one or more dedicated computers configured by a combination of a memory and a processor programmed to execute one or more functions and a processor with one or more hardware logic circuits. The computer program may be stored in a computer-readable non-transitory tangible storage medium, as an instruction to be executed by a computer.

Features of Present Invention

The present disclosure described above can be understood, for example, as the following aspects.

<First Aspect>

A valve device includes: a shaft (61) extending along an axial direction (DRa), the shaft being configured to rotate about a predetermined axis (CL); a housing (10) defining a flow passage (F) through which a fluid flows, the housing having a plurality of openings (151, 152, 153, 154, 155, 161, 162, 163, 164, 165, 166, 167) each of which communicates with the flow passage and functions as at least one of an inlet through which the fluid flows into the flow passage or an outlet through which the fluid flows out from the flow passage; and a first movable disk (30) and a second movable disk (50) provided to be aligned with each other in the axial direction while being spaced apart from each other inside the flow passage to divide the flow passage in the axial direction, the first movable disk and the second movable disk being configured to rotate along with rotation of the shaft. In the valve device, the plurality of openings includes a plurality of one-side openings (152, 154, 161, 162, 163, 167) provided on one side in the axial direction with respect to the first movable disk, and a plurality of other-side openings (153, 164, 165, 166) formed on an other side in the axial direction with respect to the second movable disk. The housing includes a one-side partition wall (1124) partitioning the flow passage on the one side in the axial direction with respect to the first movable disk into a plurality of one-side flow passages (Fi2, Fi4, Fo1, Fo2, Fo3, Fo7) communicating with the plurality of one-side openings, and an other-side partition wall (1214) partitioning the flow passage on the other side in the axial direction with respect to the second movable disk into a plurality of other-side flow passages (Fi3, Fo4, Fo5, Fo6) communicating with the plurality of other-side openings. The first movable disk has a first through-hole (34, 341, 342) penetrating through the first movable disk in the axial direction, and the first movable disk is configured to switch a flow passage, within the plurality of one-side flow passages, communicating with the plurality of other-side flow passages, by being caused to rotate along with the rotation of the shaft. In addition, the second movable disk has a second through-hole (54) penetrating through the second movable disk in the axial direction, and the second movable disk is configured to switch a flow passage, within the plurality of other-side flow passages, communicating with the second through-hole, by being caused to rotate along with the rotation of the shaft.

<Second Aspect>

The valve device according to the first aspect further includes: a first seal member (114) provided between a portion of the housing at which the first movable disk is disposed and the first movable disk, the first seal member sealing a gap between the housing and the first movable disk; a second seal member (123) provided between a portion of the housing at which the second movable disk is disposed and the second movable disk, the second seal member sealing a gap between the housing and the second movable disk; and a biasing member (90) configured to press the first movable disk against the first seal member and to press the second movable disk against the second seal member.

<Third Aspect>

The valve device according to the first aspect, further includes: a first stationary disk (20) provided between the housing and the first movable disk to be not rotatable along with the rotation of the shaft, the first stationary disk being provided with a plurality of first flow passage holes (252, 254, 261, 262, 263, 267) respectively communicating with the plurality of one-side flow passages; a second stationary disk (40) provided between the housing and the second movable disk to be not rotatable along with the rotation of the shaft, the second stationary disk being provided with a plurality of second flow passage holes (453, 464, 465, 466) respectively communicating with the plurality of other-side flow passages; and a biasing member (90) configured to press the first movable disk against the first stationary disk and to press the second movable disk against the second stationary disk. In the valve device, the first stationary disk has a friction coefficient smaller than a friction coefficient of the housing, in a surface of the first stationary disk on a side against which the first movable disk is pressed, and the second stationary disk has a friction coefficient smaller than the friction coefficient of the housing, in a surface of the second stationary disk on a side against which the second movable disk is pressed.

<Fourth Aspect>

The valve device according to third aspect further includes: a first seal member (114) provided between a portion of the housing at which the first stationary disk is disposed and the first stationary disk, the first seal member sealing a gap between the housing and the first stationary disk; and a second seal member (123) provided between a portion of the housing at which the second stationary disk is disposed and the second stationary disk, the second seal member sealing a gap between the housing and the second stationary disk.

<Fifth Aspect>

In the valve device according to the third or fourth aspect, at least one of the first stationary disk or the second stationary disk contains at least one of resin, ceramic, or phenol.

<Sixth Aspect>

In the valve device according to at least one of first to fifth aspects, at least one of the first movable disk or the second movable disk contains at least one of resin, ceramic, or phenol.

<Seventh Aspect>

In the valve device according to any one of third to sixth aspects, at least one of the first stationary disk or the first movable disk is coated through coating treatment that improves a slidability, on a surface on which the first stationary disk and the first movable disk are in contact with each other.

<Eighth Aspect>

In the valve device according to at least one of third to seventh aspects, at least one of the second stationary disk or the second movable disk is coated through coating treatment that improves a slidability, on a surface on which the second stationary disk and the second movable disk are in contact with each other.

<Ninth Aspect>

In the valve device according to any one of first to eighth aspects, at least one of the first movable disk or the second movable disk has a communication hole (35, 351, 352, 55), the communication hole is provided to span two or more flow passages of a plurality of flow passages being able to communicate with the communication hole, among the plurality of one-side flow passages and the plurality of other-side flow passages, and the communication hole is configured to allow the two or more flow passages to communicate with each other.

<Tenth Aspect>

In the valve device according to any one of the second to ninth aspects, the biasing member includes a resilient member that is resiliently deformable.

<Eleventh Aspect>

The valve device according to any one of the first to tenth aspects, further includes a pressing member (80, 85) configured to generate a pressing force pressing at least one of the first movable disk or the second movable disk in a circumferential direction (DRc) centered on the predetermined axis.

<Twelfth Aspect>

In the valve device according to eleventh aspect, the valve device further includes at least one of a first transmission part (70) or a second transmission part (75), the first transmission part is fixed to the first movable disk and is configured to transmit the pressing force to the first movable disk, and the second transmission part is fixed to the second movable disk and is configured to transmit the pressing force to the second movable disk.

What is claimed is:

1. A valve device comprising:

a shaft extending along an axial direction, the shaft being configured to rotate about a predetermined axis;

a housing defining a flow passage through which a fluid flows, the housing having a plurality of openings each of which communicates with the flow passage and functions as at least one of an inlet through which the fluid flows into the flow passage or an outlet through which the fluid flows out from the flow passage; and a first movable disk and a second movable disk provided to be aligned with each other in the axial direction while being spaced apart from each other inside the flow passage to divide the flow passage in the axial direction, the first movable disk and the second movable disk being configured to rotate along with rotation of the shaft, wherein the plurality of openings includes a plurality of one-side openings provided on one side in the axial direction with respect to the first movable disk, and a plurality of other-side openings formed on an other side in the axial direction with respect to the second movable disk, wherein the housing includes a one-side partition wall partitioning the flow passage on the one side in the axial direction with respect to the first movable disk into a plurality of one-side flow passages communicating with the plurality of one-side openings, and an other-side partition wall partitioning the flow passage on the other side in the axial direction with respect to the second movable disk into a plurality of other-side flow passages communicating with the plurality of other-side openings, wherein the first movable disk has a first through-hole penetrating through the first movable disk in the axial direction, and the first movable disk is configured to switch a flow passage, within the plurality of one-side flow passages, communicating with the plurality of other-side flow passages, by being caused to rotate along with the rotation of the shaft, and wherein the second movable disk has a second through-hole penetrating through the second movable disk in the axial direction, and the second movable disk is configured to switch a flow passage, within the plurality of other-side flow passages, communicating with the second through-hole, by being caused to rotate along with the rotation of the shaft.

2. The valve device according to claim 1, wherein at least one of the first movable disk or the second movable disk contains at least one of resin, ceramic, or phenol.

3. The valve device according to claim 1, wherein at least one of the first movable disk or the second movable disk has a communication hole, the communication hole being provided to span two or more flow passages of a plurality of flow passages being able to communicate with the communication hole, among the plurality of one-side flow passages and the plurality of other-side flow passages, the communication hole being configured to allow the two or more flow passages to communicate with each other.

4. The valve device according to claim 1, further comprising:

a first seal member provided between a portion of the housing at which the first movable disk is disposed and the first movable disk, the first seal member sealing a gap between the housing and the first movable disk;

a second seal member provided between a portion of the housing at which the second movable disk is disposed and the second movable disk, the second seal member sealing a gap between the housing and the second movable disk; and a biasing member configured to press the first movable disk against the first seal member and to press the second movable disk against the second seal member.

5. The valve device according to claim 4, wherein the biasing member includes a resilient member that is resiliently deformable.

6. The valve device according to claim 1, further comprising a pressing member configured to generate a pressing force pressing at least one of the first movable disk or the second movable disk in a circumferential direction centered on the predetermined axis.

7. The valve device according to claim 6, further comprising at least one of a first transmission part or a second transmission part, the first transmission part being fixed to the first movable disk and being configured to transmit the pressing force to the first movable disk, the second transmission part being fixed to the second movable disk and being configured to transmit the pressing force to the second movable disk.

8. The valve device according to claim 1, further comprising:

a first stationary disk provided between the housing and the first movable disk to be not rotatable along with the rotation of the shaft, the first stationary disk being provided with a plurality of first flow passage holes respectively communicating with the plurality of one-side flow passages;

a second stationary disk provided between the housing and the second movable disk to be not rotatable along with the rotation of the shaft, the second stationary disk being provided with a plurality of second flow passage holes respectively communicating with the plurality of other-side flow passages; and a biasing member configured to press the first movable disk against the first stationary disk and to press the second movable disk against the second stationary disk, wherein the first stationary disk has a friction coefficient smaller than a friction coefficient of the housing, in a surface of the first stationary disk on a side against which the first movable disk is pressed, and wherein the second stationary disk has a friction coefficient smaller than the friction coefficient of the housing, in a surface of the second stationary disk on a side against which the second movable disk is pressed.

9. The valve device according to claim 8, further comprising:

a first seal member provided between a portion of the housing at which the first stationary disk is disposed and the first stationary disk, the first seal member sealing a gap between the housing and the first stationary disk; and a second seal member provided between a portion of the housing at which the second stationary disk is disposed and the second stationary disk, the second seal member sealing a gap between the housing and the second stationary disk.

10. The valve device according to claim 8, wherein at least one of the first stationary disk or the second stationary disk contains at least one of resin, ceramic, or phenol.

11. The valve device according to claim 8, wherein at least one of the first stationary disk or the first movable disk is coated through coating treatment that improves a slidability, on a surface on which the first stationary disk and the first movable disk are in contact with each other.

12. The valve device according to claim 8, wherein at least one of the second stationary disk or the second movable disk is coated through coating treatment that improves a slidability, on a surface on which the second stationary disk and the second movable disk are in contact with each other.

* * * * *